United States Patent
Watts et al.

(10) Patent No.: US 10,540,722 B2
(45) Date of Patent: *Jan. 21, 2020

(54) SYSTEMS, COMPUTER-IMPLEMENTED METHODS, AND COMPUTER MEDIUM TO DETERMINE PREMIUMS FOR SUPPLEMENTAL CROP INSURANCE

(71) Applicant: WATTS AND ASSOCIATES, INC., Billings, MT (US)

(72) Inventors: Tim Watts, Billings, MT (US); Alex Offerdahl, Stevensville, MT (US); Joe Atwood, Bozeman, MT (US); Jim Driscoll, Overland Park, KS (US); Steve Loar, Billings, MT (US); Jeff Stabnow, Billings, MT (US)

(73) Assignee: WATTS AND ASSOCIATES, INC., Billings, MT (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/184,883

(22) Filed: Feb. 20, 2014

(65) Prior Publication Data

US 2014/0172470 A1 Jun. 19, 2014

Related U.S. Application Data

(63) Continuation-in-part of application No. 14/020,119, filed on Sep. 6, 2013, which is a continuation of (Continued)

(51) Int. Cl.
G06Q 40/08 (2012.01)

(52) U.S. Cl.
CPC .................. *G06Q 40/08* (2013.01)

(58) Field of Classification Search
CPC ........ G06Q 40/08; G06Q 50/02; G06Q 10/00; G06Q 40/00; G01N 33/48
See application file for complete search history.

(56) References Cited

U.S. PATENT DOCUMENTS 5,897,619 A   4/1999   Hargrove, Jr. et al.
5,933,355 A   8/1999   Deb
(Continued)

FOREIGN PATENT DOCUMENTS

AT   12270   2/2012
CN   101755281   6/2010
(Continued)

OTHER PUBLICATIONS

Unknown, Monte Carlo method, May 5, 2012, Wikipedia.org.*
(Continued)

*Primary Examiner* — Scott S Trotter
(74) *Attorney, Agent, or Firm* — Womble Bond Dickinson (US) LLP

(57) ABSTRACT

Provided are systems, machines, non-transitory computer medium having computer program instructions stored thereon, and computer-implemented methods for providing a premium for a supplemental crop insurance policy. The methods include identifying policy information for the policy (including a crop type, expected yield, a selected coverage level, and one or more discovery periods), generating simulated potential price trajectories for the crop type over a given time period that includes the one or more discovery periods, determining simulated prices based on the simulated potential price trajectories, generating simulated correlated price-yield realizations for the crop type over the given time period, determining simulated yields based on the simulated correlated price-yield realizations, determining a premium rate as a function of the expected yield, the selected coverage level, the simulated prices and the simulated yields, and providing the premium rate for use in determining a premium amount for the policy.

21 Claims, 36 Drawing Sheets

Related U.S. Application Data application No. 14/016,961, filed on Sep. 3, 2013, now Pat. No. 8,688,483.

(60) Provisional application No. 61/824,732, filed on May 17, 2013, provisional application No. 61/834,753, filed on Jun. 13, 2013, provisional application No. 61/845,132, filed on Jul. 11, 2013, provisional application No. 61/856,425, filed on Jul. 19, 2013, provisional application No. 61/871,726, filed on Aug. 29, 2013.

(56) References Cited

U.S. PATENT DOCUMENTS

| | | | |
|---|---|---|---|
| 5,987,435 | A | 11/1999 | Weiss et al. |
| 6,275,231 | B1 | 8/2001 | Obradovich |
| 6,338,040 | B1 | 1/2002 | Buman et al. |
| 6,339,747 | B1 | 1/2002 | Daly et al. |
| 6,865,542 | B2 | 3/2005 | Cox et al. |
| 6,990,459 | B2 | 1/2006 | Schneider |
| 7,039,592 | B1 | 5/2006 | Yegge et al. |
| 7,343,346 | B2 | 3/2008 | Frankel et al. |
| 7,490,050 | B2 | 2/2009 | Grover et al. |
| 7,657,469 | B1 | 2/2010 | Yegge et al. |
| 7,836,850 | B2 | 11/2010 | Pratt |
| 7,844,475 | B1 | 11/2010 | Murphy |
| 7,898,438 | B2 | 3/2011 | Brosius |
| 7,904,332 | B1 | 3/2011 | Merkley, Jr. et al. |
| 8,156,022 | B2 | 4/2012 | Fell et al. |
| 8,160,952 | B1 | 4/2012 | Fell et al. |
| 8,335,653 | B2 | 12/2012 | Pruett et al. |
| 8,364,506 | B2 | 1/2013 | Munger |
| 8,417,615 | B2* | 4/2013 | Johannes ............ 705/36 R |
| 8,607,154 | B2 | 12/2013 | Watts et al. |
| 8,688,483 | B2 | 4/2014 | Watts et al. |
| 2001/0027437 | A1 | 10/2001 | Turbeville et al. |
| 2002/0004705 | A1 | 1/2002 | Baron et al. |
| 2002/0023052 | A1 | 2/2002 | Remley et al. |
| 2002/0052795 | A1 | 5/2002 | Dines |
| 2002/0059091 | A1 | 5/2002 | Hay et al. |
| 2002/0091550 | A1 | 7/2002 | White et al. |
| 2002/0095317 | A1 | 7/2002 | McCabe |
| 2002/0134868 | A1 | 9/2002 | Hansen |
| 2002/0173980 | A1 | 11/2002 | Daggett et al. |
| 2002/0183867 | A1 | 12/2002 | Gupta et al. |
| 2003/0061075 | A1 | 3/2003 | Heckman et al. |
| 2003/0093302 | A1 | 5/2003 | Quido et al. |
| 2003/0115158 | A1 | 6/2003 | Richardson |
| 2004/0002890 | A1 | 1/2004 | Barker et al. |
| 2004/0024692 | A1 | 2/2004 | Turbeville |
| 2004/0103003 | A1 | 5/2004 | Mayers et al. |
| 2004/0117238 | A1 | 6/2004 | Inman et al. |
| 2004/0119759 | A1 | 6/2004 | Barros |
| 2004/0215556 | A1 | 10/2004 | Merkley, Jr. et al. |
| 2004/0230519 | A1 | 11/2004 | Parker |
| 2004/0243299 | A1 | 12/2004 | Scaer et al. |
| 2005/0024236 | A1 | 2/2005 | Gosdin et al. |
| 2005/0027572 | A1 | 2/2005 | Goshert |
| 2005/0027705 | A1 | 2/2005 | Sadi et al. |
| 2005/0034075 | A1 | 2/2005 | Riegelman et al. |
| 2005/0125260 | A1 | 6/2005 | Green et al. |
| 2005/0151656 | A1 | 7/2005 | Yuen |
| 2006/0015360 | A1 | 1/2006 | Ochs et al. |
| 2006/0015374 | A1 | 1/2006 | Ochs et al. |
| 2006/0282294 | A1 | 12/2006 | McComb et al. |
| 2006/0282295 | A1* | 12/2006 | McComb et al. ............ 705/4 |
| 2006/0282296 | A1 | 12/2006 | Avey et al. |
| 2006/0287896 | A1 | 12/2006 | McComb et al. |
| 2007/0073841 | A1 | 5/2007 | Ryan et al. |
| 2007/0112511 | A1 | 5/2007 | Burfeind et al. |
| 2007/0159355 | A1 | 7/2007 | Kelly et al. |
| 2007/0174095 | A1* | 7/2007 | McComb et al. ............ 705/4 |
| 2007/0174770 | A1 | 7/2007 | Safoutin |
| 2007/0192120 | A1 | 8/2007 | Cowles et al. |
| 2008/0040165 | A1 | 2/2008 | Anderson et al. |
| 2008/0055154 | A1 | 3/2008 | Martucci et al. |
| 2008/0086340 | A1 | 4/2008 | Foresman et al. |
| 2008/0147417 | A1 | 6/2008 | Friedberg |
| 2008/0154786 | A1 | 6/2008 | Friedberg |
| 2008/0167985 | A1 | 7/2008 | Yarnall |
| 2008/0180282 | A1 | 7/2008 | Brosius |
| 2008/0215473 | A1 | 9/2008 | Cashman et al. |
| 2008/0221914 | A1 | 9/2008 | Frankel et al. |
| 2008/0249955 | A1 | 10/2008 | Friedberg |
| 2008/0278311 | A1 | 11/2008 | Grange et al. |
| 2008/0306776 | A1 | 12/2008 | Fell et al. |
| 2008/0306777 | A1 | 12/2008 | Fell et al. |
| 2008/0312987 | A1 | 12/2008 | Damondaran et al. |
| 2009/0094099 | A1* | 4/2009 | Linville ............ 705/10 |
| 2009/0112637 | A1 | 4/2009 | Avey et al. |
| 2009/0153492 | A1 | 6/2009 | Popp |
| 2009/0160873 | A1 | 6/2009 | Kew et al. |
| 2009/0164256 | A1 | 6/2009 | Fisher et al. |
| 2009/0164258 | A1 | 6/2009 | Brookryk |
| 2009/0210256 | A1 | 8/2009 | Upadhyayula et al. |
| 2009/0243852 | A1 | 10/2009 | Haupt et al. |
| 2009/0316671 | A1 | 12/2009 | Rolf |
| 2010/0057362 | A1 | 3/2010 | Schilke et al. |
| 2010/0145862 | A1 | 6/2010 | Chang |
| 2011/0054921 | A1 | 3/2011 | Lynds |
| 2011/0106727 | A1 | 5/2011 | Noyes |
| 2011/0178826 | A1 | 7/2011 | Fell et al. |
| 2011/0196710 | A1 | 8/2011 | Rao |
| 2011/0313795 | A1 | 12/2011 | Phillips et al. |
| 2012/0123817 | A1 | 5/2012 | Hohenberger et al. |
| 2012/0147030 | A1 | 6/2012 | Hankers et al. |
| 2012/0310679 | A1* | 12/2012 | Olson et al. ............ 705/4 |
| 2012/0330690 | A1 | 12/2012 | Goslinga et al. |
| 2012/0330733 | A1 | 12/2012 | Tiller et al. |
| 2013/0014046 | A1 | 1/2013 | Watts et al. |
| 2013/0103593 | A1 | 4/2013 | Watts et al. |
| 2013/0198057 | A1 | 8/2013 | Avey et al. |
| 2013/0332205 | A1 | 12/2013 | Friedberg et al. |
| 2014/0006066 | A1 | 1/2014 | Watts et al. |
| 2014/0012606 | A1 | 1/2014 | Watts et al. |
| 2014/0012732 | A1 | 1/2014 | Lindores |
| 2014/0207495 | A1 | 7/2014 | Watts et al. |

FOREIGN PATENT DOCUMENTS

| | | |
|---|---|---|
| CN | 102236868 | 11/2011 |
| JP | 7168804 | 7/1995 |
| JP | 1995168804 | 7/1995 |
| JP | 2007149013 | 6/2007 |
| JP | 2012003412 | 1/2012 |
| KR | 20020012704 | 2/2002 |
| WO | 2005114513 | 12/2005 |
| WO | 2013022843 | 2/2013 |
| WO | 2013148290 | 10/2013 |
| WO | 2013184811 | 12/2013 |

OTHER PUBLICATIONS

Harvey W. Rubin, Dictionary of Insurance Terms, 2000, Fourth Edition, 495-497.*

Hudson Insurance Group, Application for Named Peril Area Revenue Coverage (ARC) and Declaration Page, Overland, KS, Jan. 2012 (1 page).

Silveus Insurance Group, Corn ARC Coverage Level table, 2011 (1 page).

Notice of Allowance for U.S. Appl. No. 14/016,961 dated Feb. 3, 2014 (9 pages).

ADM Crop Risk Services—Crop Insurance, Products, Copyright 2012 (2 pages).

Armtech Insurance Services, Product Brochures, Copyright 2012 (5 pages).

Armtech Insurance Services, Product Brochures, Copyright 2008 (6 pages).

Armtech Insurance Services, Product Brochures, Copyright 2008 (4 pages).

(56) References Cited

OTHER PUBLICATIONS

Great American Insurance Company, Products, Copyright 2008 Great American Insurance Company (1 page).
NAU Country Insurance Company, Snapshot of Website, Mar. 15, 2004 (1 page).
Rain and Hail, LLC, Crop-Hail Production Plan, General Summary, Mar. 8, 2012 (3 pages).
Rain and Hail, LLC, MPCI, Livestock, Crop-Hail, Private Products and Specialty Lines, Copyright 2000-2012 (3 pages).
Rain and Hail, LLC, Website, Jul. 15, 1997 (1 page).
Rain and Hail, LLC, Website Overview, West Des Moines, IA, Copyright 1996 (10 pages).
American Farm Bureau Insurance Services, Inc., Crop Hail, Copyright 2005 (2 pages).
AgriLogic Insurance Services, LLC, Products, Copyright 2009 (2 pages).
American Farm Bureau Insurance Services, Inc., Crop Hail, Copyright 2005 (1 pages).
Rain and Hail Agricultural Insurance, Rain and Hail Crop-Hail Endorsements, Copyright 2000-2013 Rain and Hail, LLC (2 pages).
Rain and Hail, LLC, Crop-Hail General Summary, Mar. 2, 2011 (1 page).
Global Ag Insurance Services, LLC, Products, Copyright 2012 (2 pages).
Great American Insurance Company, Crop Insurance—Products, Copyright 2012 (1 page).
Heartland Crop Insurance, Inc., Production Plan Hail Coverage, Copyright 2010 (1 page).
Heartland Crop Insurance, Inc., Companion Hail Coverage, Copyright 2010 (1 page).
Heartland Crop Insurance, Inc., Named Peril Coverage, Copyright 2010 (1 page).
Heartland Crop Insurance, Inc., Products, Copyright 2010 (1 page).
Heartland Crop Insurance, Inc., Supplemental Coverage, Copyright 2010 (1 page).
Heartland Crop Insurance, Inc., Traditional Crop-Hail Coverage, Copyright 2010 (1 page).
Hudson Insurance Group, Crop Hail Production Plan, Copyright 2012 (1 page).
Rain and Hail Agricultural Insurance, Private Stand Alone Programs, Copyright 2000-2013 (8 pages).
AFBIS, Inc., Website Screen Shot Showing Date of Brochure and Pasture, Rangeland and Forage Brochure, Nov. 2, 2012 (4 pages).
RCIS, Website Screen Shot Showing Date of RCIS Product Offerings (PDF) and RCIS Product Offerings Document, Apr. 29, 2013 (3 pages).
Deer & Company, John Deere Crop Insurance Policies & Crop Insurance Agents, Crop Insurance, Apr. 11, 2013 (3 pages).
Deere & Company, Private Products, Jul. 20, 2013 (22 pages).
Rain and Hail Agricultural Insurance/ACE Property and Casualty Insurance Company, May 10 and Dec. 12, 2011 (45 pages).
Rain and Hail Agricultural Insurance/ACE Property and Casualty Insurance Company, May 10 and Jun. 5, 2001 (37 pages).
Guide One Specialty Mutual Insurance Co., Citrus Fruit Freeze New Program Filing, Jul. 16, 2007 (63 pages).
Guide One Specialty Mutual Insurance Co., Crop Hail New Program Filing, Mar. 23, 2007 (69 pages).
ARMtech Insurance Services, APH-Based Crop Hail, Jul. 2013 (2 pages).
Guide One Specialty Mutual Insurance Co., Citrus Packers Business Interruption New Program Filing, Aug. 7, 2007 (63 pages).
Guide One Specialty Mutual Insurance Co., Crop-Hail New Filing, Mar. 1, 2002 (39 pages).
Guide One Specialty Mutual Insurance Co., Named Peril Crop Hail New Program Filing, Dec. 20, 2006 (49 pages).
Farmers Mutual Hail Insurance Company, Products and Crop Hail Agent Training Manual 2012 (90 pages).
Farmers Mutual Hail Insurance Company of Iowa, Crop Hail Form Filing, Dec. 4, 2012 (67 pages).
AgriLogic Insurance Services, LLC, Crop Replant Supplemental Insurance Coverage, 2013 (6 pages).
Occidental Fire & Casualty Company of North Carolina/AgriLogic Insurance Services, Crop Replant Option Forms Form Filing, Feb. 10, 2012 (52 pages).
American Agri-Business Insurance Company, Crop Hail Form Filing, Feb. 19, 2009 (18 pages).
North American Elite Insurance Company, Commercial Weather Form Filing, Dec. 27, 2012 (75 pages).
The Climate Corporation, Products, 2013 (7 pages).
Starr Indemnity & Liability Company, 2013 California Crop Hail Rates, Forms, & Rules Form/Rate/Rule Filing, Apr. 16, 2013 (155 pages).
GuideOne Mutual Insurance Company, 2013 GMI WI Form Filing, Dec. 11, 2012 (80 pages).
Diversified Crop Insurance Services, Yield Protection, Sep. 2010 (2 pages).
Diversified Crop Insurance Services, Revenue Protection, Oct. 2010 (2 pages).
Diversified Crop Insurance Services, Policies, 2013 (5 pages).
Singerman, Ariel, et al., Demand for Crop Insurance by Organic Corn and Soybean Farmers in Three Major Producing States, Working Paper No. 10007, May 2010, Iowa State University, Ames, Iowa (27 pages).
Vedenov, Dmitry V., et al, Portfolio Allocation and Alternative Structures of the Standard Reinsurance Agreeement, Journal of Agriculture and Resource Economics 31 (57-73), Copyright 2006 Western Agricultural Economics Association (17 pages).
Shields, Dennis A., Federal Crop Insurance: Background, Congressional Research Service, 7-5700, Dec. 12, 2013 (28 pages).
Babcock, Bruce A., et al., Actuarial Fairness of Crop Insurance Rates with Constant Rate Relativities, Amer. J. Agr. Econ. 86(3), Aug. 2004, 563-575, Copyright 2004 American Agricultural Economics Association (13 pages).
Vedenov, Dmitry V., et al, Efficiency of Weather Derivatives as Primary Crop Insurance Instruments, Journal of Agricultural and Resource Economics 29(3) (387-403), Copyright 2004 Western Agricultural Economics Association (17 pages).
Lubben, Bradley D. et al., Analyzing Federal Farm Program and Crop Insurance Options to Assess Policy Design and Risk Management Implications for Crop Producers, Department of Agricultural Economics, University of Nebraska—Lincoln, Louisville, KY, Oct. 2013 (20 pages).
Coble, Keith H. et al., Implications of Crop Yield and Revenue Insurance for Producer Hedging, Journal of Agricultural and Resource Economics 25(2) (432-452), Copyright 2000 Western Agricultural Economics Association (21 pages).
Cole, Shawn et al., The Effectiveness of Index-Based Micro-Insurance in Helping Smallholders Manage Weather-Related Risks, University of London, Jul. 2012 (84 pages).
ARMtech Insurance Services, PRF Pasture, Rangeland, and Forage, May 25, 2014.

* cited by examiner

Supplemental Crop Insurance Policy Information Entry Page ⌐ 200 http://supplementalcropinsurance.com/supplemenatl_policy_info_entry

Please enter policy information in the corresponding Supplemental Policy Information Fields
When completed, select "SUBMIT" to receive a Premium for the Supplemental Policy

INSURED'S INFORMATION ⌐ 204

| Full Name | John Doe |
| --- | --- |
| Address | 111 FM 333 |
| City | Bouton |
| State | Iowa |
| Zip | 50063 |
| County | Adair |
| Telephone | 515-333-4444 |

INSURED'S CROP/POLICY INFORMATION ⌐ 206

| Crop to be Insured | Corn | ADD |
| --- | --- | --- |
| Est. Acres to be Planted | 1000 | |
| Type | Grain | |
| Practice | Irrigated | |
| Production Database | APH - 1 | |
| Est. of Ant. Actual Yield | 5000 | |
| Share | 100% | |
| Coverage Level | 80% | |
| Insurance Plan | RP | |
| Elected % of Max (If GRIP) | N/A | |
| Liability Adjustment Factor | 60% | |
| Alt. Price Discovery Periods | Dec. 1 – Dec. 31 | |
| | April 1 - April 30 | ADD |
| Max Price Movement Limit | $0.25 | |

SAVE

SUBMIT

Supplemental Crop Insurance Policy Information Entry Page http://supplementalcropinsurance.com/supplemenatl_policy_info_entry

Premium Estimator

Insurance Plan
USP HPO

Crop
Corn

State
US

County
US

Acres

Type
No Type Specified

Practice
Irrigated

Coverage Level
86%

Liability Adjustment Factor
100%

Maximum Price Movement Amount
$0.05

Estimated Acres
1000

Share Percentage (Use this to help your remember this quote)
100%

Quote Alias Name (Use this to help your remember this quote)

Jane Doe Stocks Quote

County Expected Yield
185.4

USDF Max Protection Per Acre
$0.9 x $1,200.18

Average Futures Price This Month
$5.84

Alternative Price Discovery Period (Choose at least one Period)

Select Period 1: December 1 - December 31, 2009
Select Period 2: Select Period

*Supplemental Crop Insurance Indemnity Information Entry Page* — 600 http://supplementalcropinsurance.com/supplemental_policy_indemnity_info_entry

Please enter information in the corresponding Supplemental Policy Loss Data Fields
When completed, select "SUBMIT" to receive an Estimated Indemnity Value under the Supplemental Policy

SUPPLEMENTAL POLICY INFORMATION (POLICY NO. 12456789-A)

| INSURED'S PERSONAL INFORMATION | INSURED'S CROP/POLICY INFORMATION |
|---|---|
| Full Name    John Doe | Crop to be Insured  Corn |
| Address      111 FM 333 | Est. Acres to be Planted  1000 |
| City         Bouton | Type  Grain |
| State        Iowa | Practice  Irrigated |
| Zip          50063 | Production Database  APH - 1 |
| County       Adair | Est. of Ant. Actual Yield  5000 |
| Telephone    515-333-4444 | Share  100% |
|  | Coverage Level  80% |
|  | Insurance Plan  RP |
|  | Liability Adjustment Factor  60% |
|  | Alt. Price Discovery Periods  Dec. 1 – Dec. 31 |
|  |                               April 1 – April 30 |
|  | Max Price Movement Limit  $0.25 |

LOSS INFORMATION

| Date of Loss | 12/31/3013 | Harvest Price | $5.25 |
| Indem. Payable For RP | $123,000 | Highest Proj. Price | $5.50 |
| Production To Count | 100,000 bushels | Projected Price | $5.40 |

— 602

SAVE

SUBMIT

*FIG. 6*

← ↑ ⬡ ○ | http://supplementalcropinsurance.com/supplemenatl_policy_indemnity_est

*Supplemental Crop Insurance Indemnity Estimation Page* ← 800

ESTIMATED INDEMNITY FOR LOSS = $7,200 ← 802

SUPPLEMENTAL POLICY INFORMATION FOR POLICY NO. 12456789-A

INSURED'S PERSONAL INFORMATION

| | |
|---|---|
| Full Name | John Doe |
| Address | 111 FM 333 |
| City | Bouton |
| State | Iowa |
| Zip | 50063 |
| County | Adair |
| Telephone | 515-333-4444 |

INSURED'S CROP/POLICY INFORMATION

| | |
|---|---|
| Crop to be Insured | Corn |
| Est. Acres to be Planted | 1000 |
| Type | Grain |
| Practice | Irrigated |
| Production Database | APH - 1 |
| Est. of Ant. Actual Yield | 5000 |
| Share | 100% |
| Coverage Level | 80% |
| Insurance Plan | RP |
| Liability Adjustment Factor | 60% |
| Alternative Price Discovery Periods | Dec. 1 – Dec. 31<br>April 1 - April 30 |
| Max Price Movement Limit | $0.25 |

LOSS INFORMATION

| | |
|---|---|
| Date of Loss | 12/31/3013 |
| Indem. Payable For RP | $123,000 |
| Production To Count | 100,000 bushels |
| Harvest Price | $5.25 |
| Highest Proj. Price | $5.50 |
| Projected Price | $5.40 |

[ SAVE ]  [ EDIT ]  [ PRINT ]

Nursery Hurricane Named Peril Supplemental Insurance Policy Info. Entry Page — 1300a http://supplementalcropinsurance.com/supplemental_policy_info_entry — 1302a Please enter policy information in the corresponding Supplemental Policy Information Fields
When completed, select "SUBMIT" to receive a Premium for the Supplemental Policy

INSURED'S INFORMATION — 1304a

| Full Name | John Doe |
| Address | 111 FM 333 |
| City | Bouton |
| State | Iowa |
| Zip | 50063 |
| County | Adair |
| Telephone | 515-333-4444 |

Hurricane Supplemental — 1306a

- FCIC anticipated Nursery Liability
- FCIC Nursery Coverage Level
- Hurricane Liability
- Start date (mm/dd/yyyy)
- End Date (mm/dd/yyyy)
- Deductible
- Additional Premium

SAVE

SUBMIT

FIG. 13A

Nursery Production Infrastructure Supplemental Insurance Policy Info. Entry Page ⇦ ⇨ ⟲ ⬠ ⬡ | http://supplementalcropinsurance.com/supplemental_policy_info_entry Please enter policy information in the corresponding Supplemental Policy Information Fields
When completed, select "SUBMIT" to receive a Premium for the Supplemental Policy

INSURED'S INFORMATION

| Full Name | John Doe |
| Address | 111 FM 333 |
| City | Bouton |
| State | Iowa |
| Zip | 50063 |
| County | Adair |
| Telephone | 515-333-4444 |

Infrastructure Supplemental

- FCIC anticipated Nursery Liability
- Irrigation Value
- Ground Cover Value
- Shade Structure Value
- Other Value
- Deductible
- Additional Premium

SAVE

SUBMIT

SYSTEMS, COMPUTER-IMPLEMENTED METHODS, AND COMPUTER MEDIUM TO DETERMINE PREMIUMS FOR SUPPLEMENTAL CROP INSURANCE

RELATED APPLICATIONS

This application is a continuation-in-part U.S. Non-Provisional application Ser. No. 14/020,119, filed on Sep. 6, 2013, and titled "SYSTEMS, COMPUTER-IMPLEMENTED METHODS, AND COMPUTER MEDIUM TO DETERMINE PREMIUMS AND INDEMNITIES FOR SUPPLEMENTAL CROP INSURANCE" which is a continuation of U.S. Non-Provisional application Ser. No. 14/016,961, filed on Sep. 3, 2013, and titled "SYSTEMS, COMPUTER-IMPLEMENTED METHODS, AND COMPUTER MEDIUM TO DETERMINE PREMIUMS AND INDEMNITIES FOR SUPPLEMENTAL CROP INSURANCE" which claims the benefit of and priority to U.S. Provisional Patent Application No. 61/824,732, filed on May 17, 2013, and titled "SYSTEMS, COMPUTER MEDIUM AND COMPUTER-IMPLEMENTED METHODS FOR MANAGING SUPPLEMENTAL CROP INSURANCE POLICIES"; U.S. Provisional Patent Application No. 61/834,753, filed on Jun. 13, 2013, and titled "SYSTEMS, COMPUTER MEDIUM AND COMPUTER-IMPLEMENTED METHODS FOR MANAGING SUPPLEMENTAL CROP INSURANCE POLICIES"; U.S. Provisional Patent Application No. 61/845,132, filed on Jul. 11, 2013, and titled "SYSTEMS, COMPUTER MEDIUM AND COMPUTER-IMPLEMENTED METHODS FOR MANAGING SUPPLEMENTAL CROP INSURANCE POLICIES"; U.S. Provisional Patent Application No. 61/856,425, filed on Jul. 19, 2013, and titled "SYSTEMS, COMPUTER MEDIUM AND COMPUTER-IMPLEMENTED METHODS FOR MANAGING SUPPLEMENTAL CROP INSURANCE POLICIES"; and U.S. Provisional Patent Application No. 61/871,726, filed on Aug. 29, 2013, and titled "SYSTEMS, COMPUTER MEDIUM AND COMPUTER-IMPLEMENTED METHODS FOR MANAGING SUPPLEMENTAL INSURANCE POLICIES", the disclosures of which are each hereby incorporated by reference in their entireties.

BACKGROUND OF THE INVENTION

1. Field of the Invention

This invention relates generally to insurance technology and more particularly to systems, machines, computer-implemented methods, and non-transitory computer medium having computer program instructions stored thereon for determining insurance policy characteristics.

2. Description of the Related Art

Insurance is used to manage risks for uncertain losses. A company or entity selling insurance is often referred to as the "insurer" or "insurance carrier," and the person or entity buying the insurance policy is often referred to as the "insured" or "policyholder." The amount of money to be charged for insurance coverage is referred to as the "premium" for the insurance policy. In a traditional insurance transaction, the insured assumes a guaranteed and known relatively small loss in the form of payment (e.g., the premium payment) to the insurer in exchange for the insurer's promise to compensate, or "indemnify" the insured in the case of a financial loss. A contract, or "insurance policy," details the coverage, or the conditions and circumstances under which the insured will be financially compensated by the insurer.

In the context of auto insurance, for example, a person may purchase an auto insurance policy from an auto insurance carrier and the auto insurance carrier will be responsible for some or all of losses associated with events covered by the auto insurance policy, such as the person being involved in a car wreck. Similar insurance policies are available for any variety of conditions and circumstances. In the context of crop insurance, for example, an agricultural producer, such as a farmer, rancher or the like, may purchase a crop insurance policy from a crop insurance carrier and the crop insurance carrier will be responsible for some or all of losses associated with events covered by the crop insurance policy, such as the loss of crops due to natural disasters, such as hail, drought and floods, or the loss of revenue due to low prices, such as declines in the prices of agricultural commodities.

In some instances, supplemental insurance policies are available to further manage risks for uncertain losses. Supplemental insurance policies may cover losses that fall outside of other insurance policies. For example, where a farmer has a primary crop insurance coverage that covers some of the losses associated with their crops, the farmer may have an additional, supplemental policy that covers some or all of the losses that are not covered by the primary crop insurance. The amounts paid under supplemental insurance policies depend on the conditions and circumstances defined by the policies. These conditions and circumstances can include whether or not payment is due to the insured under the primary insurance policy and how much the payment is under the primary insurance policy. Accordingly, the factors that contribute to payments under insurance policies can be very complex. As premiums for insurance are typically based on the risk associated with the payments, determining premiums can be very complex as well. As a result of these complexities, there is often a delay (e.g., hours, days or weeks) associated with the process for determining a premium and, thus, an insurance agent may not be able to readily provide potential clients with premium amounts, such as while the agent is with the client "at the kitchen table" negotiating with the client. Unfortunately, as a result of these types of delays, clients may become disinterested while waiting for the premium to be provided and may not purchase the insurance policy. Moreover, agents and clients may not be able to quickly determine premium amounts based on edits to the policy terms due to the delays associate with determining the premium amounts. Similar delays and issues may be present when calculating indemnity amounts for a loss under an insurance policy. As a result, existing clients may become frustrated with the indemnity process and may elect to switch to another insurance carrier.

SUMMARY OF THE INVENTION

Applicant has recognized several shortcomings of existing techniques for determining characteristics for supplemental insurance policies and, in view of these shortcomings, has recognized the need for improved techniques for determining premiums and indemnities for supplemental insurance policies. Applicant has recognized that although existing systems may generate premiums or estimate premiums, many techniques do not effectively consider risks associated with the coverage of supplemental insurance policies, do not provide an easy to follow structure for determining insurance policy premiums for supplemental insurance policies and/or do not provide an easy to follow structure for determining estimates of indemnities due under supplemental insurance policies. Thus, existing techniques for determining characteristics for supplemental insurance policies fail to provide a framework for effectively considering risks associated with the coverage of supplemental insurance policies, determining premiums for supplemental insurance policies, or indemnities due under supplemental insurance policies. Applicant has recognized that such shortcomings have failed to be addressed by others, and has recognized that such shortcomings may be addressed by a system that can effectively consider risks associated with the coverage of supplemental insurance policies when determining premiums for supplemental insurance policies and determining indemnities due under supplemental insurance policies. Such a system may reduce the overall complexity of assessing risks for determining reasonable premiums for supplemental insurance policies, and provide confidence to the insured regarding indemnity payments under supplemental insurance policies. Such efficient and effective determinations can assist in securing insurance policies. For example, supplemental crop insurance premiums for supplemental crop insurance policies and indemnity amounts under supplemental crop insurance policies can be determined quickly so that an insurance agent can readily provide them to a client (or prospective client). In view of the foregoing, various embodiments of the present invention advantageously provide systems, machines, non-transitory computer medium having computer program instructions stored thereon, and computer-implemented methods for determining characteristics for supplemental insurance policies.

Various embodiments of methods and apparatus for determining characteristics for supplemental insurance policies are provided herein. In certain embodiments, provided is a system that includes an electronic communications network, a user device, and a supplemental insurance server communicatively coupled to the user device via the electronic communications network. The supplemental insurance server may be adapted to serve, to the user device, a supplemental crop insurance policy information content page including one or more policy parameter fields adapted to be populated by a user with a corresponding set of supplemental crop insurance policy parameters and serve, to the user device, a supplemental crop insurance policy indemnity information content page including one or more loss parameter fields adapted to be populated by a user with a corresponding set of supplemental crop insurance loss parameters. The user device may be further adapted to display the supplemental crop insurance policy information content page, receive a set of supplemental crop insurance policy parameters submitted by a user via populating the one or more policy parameter fields of the supplemental crop insurance policy information content page, and transmit the set of supplemental crop insurance policy parameters to the supplemental insurance server. The user device may be further adapted to display the supplemental crop insurance policy indemnity information content page, receive a set of supplemental crop insurance loss parameters submitted by a user via populating the one or more loss parameter fields of the supplemental crop insurance policy indemnity information content page, and transmit the set of supplemental crop insurance loss parameters to the supplemental insurance server. The supplemental insurance server may be adapted to determine a premium for a supplemental crop insurance policy corresponding to the set of supplemental crop insurance policy parameters, and to serve, to the user device, a supplemental crop insurance policy information content page including the premium for the supplemental crop insurance policy. The supplemental insurance server may be further adapted to determine an estimated indemnity for a loss under the supplemental crop insurance policy based at least in part on the set of supplemental crop insurance loss parameters, and to serve, to the user device, a supplemental crop insurance policy indemnity information content page including the estimated indemnity for the loss under the supplemental crop insurance policy. The user device may be further adapted to display the supplemental crop insurance policy information content page including the premium for the supplemental crop insurance policy, and display the supplemental crop insurance policy indemnity information content page including the estimated indemnity for the loss under the supplemental crop insurance policy.

In certain embodiments, determining a premium for a supplemental crop insurance policy corresponding to the set of supplemental crop insurance policy parameters includes determining the premium for a supplemental crop insurance policy corresponding to the set of supplemental crop insurance policy parameters in real-time using one or more predetermined pricing functions. In certain embodiments, as will be understood by those skilled in the art, determining an estimated indemnity for a loss under the supplemental crop insurance policy can be based, at least in part, for example, on the set of supplemental crop insurance loss parameters in real-time using one or more predetermined indemnity functions.

In some embodiments, determining a premium for a supplemental crop insurance policy corresponding to the set of supplemental crop insurance policy parameters includes: determining a premium amount for each selected coverage of a supplemental policy, summing premium amounts for selected coverages to generate a premium amount, and applying a coverage factor and quantity factor to the premium amount to generate a premium for the supplemental crop insurance supplemental policy. In certain embodiments, determining a premium amount for each selected coverage of a supplemental policy is based at least in part on application of a policy rating algorithm. In some embodiments, summing premium amounts for selected coverages to generate a premium amount includes summing premium amounts per acre for a coverage level for all alternative price discovery periods elected. In certain embodiments, applying a coverage factor and quantity factor to the premium amount to generate a premium for the supplemental policy includes applying a liability adjustment factor, a percentage protection per acre, a number of insured acres and a share to the premium amount to generate a premium for the supplemental crop insurance policy.

In some embodiments, the one or more policy parameter fields include fields for at least one of the following: a crop to be insured, an estimate of a number of acres to be planted by type and practice for a crop year, production databases for an insured crop, an estimate of anticipated actual yield by unit, type and practice for a current crop year, a coverage level elected for a supplemental policy, an insurance plan elected, a liability adjustment factor, an alternative price discovery period, or a maximum price movement limit.

In some embodiments, determining an estimated indemnity for a loss under the supplemental crop insurance policy based at least in part on the set of supplemental crop insurance loss parameters includes: determining a highest alternative projected price, determining whether the highest alternative projected price exceeds a projected price or a harvest price, and in response to determining that the highest alternative projected price does not exceed the projected price or the harvest price, determining that an estimated indemnity for a loss under the supplemental crop insurance policy is zero.

In certain embodiments, determining an estimated indemnity for a loss under the supplemental crop insurance policy based at least in part on the set of supplemental crop insurance loss parameters includes: determining whether the supplemental crop insurance policy is associated with an RP or GRIP/ARP insurance plan, in response to determining that the supplemental crop insurance policy is associated with an RP insurance plan, determining an estimated indemnity for a loss under the supplemental crop insurance policy using one or more predetermined indemnity functions associated with RP insurance plans, and in response to determining that the supplemental crop insurance policy is associated with a GRIP/ARP insurance plan, determining an estimated indemnity for a loss under the supplemental crop insurance policy using one or more predetermined indemnity functions associated with GRIP/ARP insurance plans.

In some embodiments, determining an estimated indemnity for a loss under the supplemental crop insurance policy using one or more predetermined indemnity functions associated with RP insurance plans includes: determining a highest alternative projected price, determining whether the highest alternative projected price exceeds a projected price or a harvest price, and in response to determining that the highest alternative projected price does exceed the projected price or the harvest price: applying a coverage level to an approved yield for each type and practice to generate a yield coverage, applying a highest projected price to the yield coverage to generate a coverage amount, applying the coverage amount to insured acreage to generate an insured coverage amount, applying a production count to a harvest price to generate a production amount, reducing the insured coverage amount by the production amount to generate a production loss, applying a share to the production loss to generate an eligible production loss, determining a RP indemnity, reducing the eligible production loss by the RP indemnity to generate an eligible loss, and applying a liability adjustment factor to the eligible loss to generate the estimated indemnity for the supplemental crop insurance policy.

In certain embodiments, determining an estimated indemnity for a loss under the supplemental crop insurance policy using one or more predetermined indemnity functions associated with GRIP/ARP insurance plans includes: determining a highest alternative projected price, determining whether the highest alternative projected price exceeds a projected price or a harvest price, and in response to determining that the highest alternative projected price does exceed the projected price or the harvest price: determining a policy protection adjustment factor/protection amount election, applying the policy protection adjustment factor/protection amount election to policy protection for each type and practice to generate a coverage amount, determining a trigger revenue for each type and practice based at least in part on expected county yield, highest projected price, and selected coverage level, determining a county ratio based at least in part on the county revenue and the trigger revenue for each type and practice, applying the county ratio and the coverage amount to insured acreage and a share to generate an eligible production loss, determining a GRIP/ARP indemnity, reducing the eligible production loss by the GRIP/ARP indemnity to generate an eligible loss, and applying a liability adjustment factor to the eligible loss to generate an estimated indemnity for the supplemental crop insurance policy.

In some embodiments, determining a premium for a supplemental crop insurance policy corresponding to the set of supplemental crop insurance policy parameters includes acquiring futures data corresponding to the set of supplemental crop insurance policy parameters, and applying a rating algorithm to the futures data to determine a premium for a supplemental crop insurance policy.

In some embodiments, the one or more policy parameter fields include fields for at least one of the following: an indemnity paid under another insurance plan, a projected price, a production to count, a harvest price, a highest projected price or a projected price.

In certain embodiments, provided is a system that includes an electronic communications network, a user device, and a supplemental insurance server communicatively coupled to the user device via the electronic communications network. The supplemental insurance server may be adapted to serve, to the user device, a supplemental crop insurance policy information content page including one or more policy parameter fields adapted to be populated by a user with a corresponding set of supplemental crop insurance policy parameters. The user device may be further adapted to display the supplemental crop insurance policy information content page, receive a set of supplemental crop insurance policy parameters submitted by a user via populating the one or more policy parameter fields of the supplemental crop insurance policy information content page, and transmit the set of supplemental crop insurance policy parameters to the supplemental insurance server. The supplemental insurance server may be adapted to determine a premium for a supplemental crop insurance policy corresponding to the set of supplemental crop insurance policy parameters, and to serve, to the user device, a supplemental crop insurance policy information content page including the premium for the supplemental crop insurance policy. The user device may be further adapted to display the supplemental crop insurance policy information content page including the premium for the supplemental crop insurance policy.

In some embodiments, provided is a system that includes an electronic communications network, a user device, and a supplemental insurance server communicatively coupled to the user device via the electronic communications network. The supplemental insurance server may be further adapted to serve, to the user device, a supplemental crop insurance policy indemnity information content page including one or more loss parameter fields to be populated by a user with a corresponding set of supplemental crop insurance loss parameters. The user device may be further adapted to display the supplemental crop insurance policy indemnity information content page, receive a set of supplemental crop insurance loss parameters submitted by a user via populating the one or more loss parameter fields of the supplemental crop insurance policy indemnity information content page, and transmit the set of supplemental crop insurance loss parameters to the supplemental insurance server. The supplemental insurance server may be further adapted to determine an estimated indemnity for a loss under the supplemental crop insurance policy based at least in part on the set of supplemental crop insurance loss parameters, and to serve, to the user device, a supplemental crop insurance policy indemnity information content page including the estimated indemnity for the loss under the supplemental crop insurance policy. The user device may be further adapted to display the supplemental crop insurance policy indemnity information content page including the estimated indemnity for the loss under the supplemental crop insurance policy.

In certain embodiments, provided is a system that includes one or more processors and one or more memories storing program instruction that are executable by the one or more processors to cause the following steps: providing for display of a supplemental crop insurance policy information content page including one or more policy parameter fields to be populated by a user with a corresponding set of supplemental crop insurance policy parameters, receiving a set of supplemental crop insurance policy parameters submitted by a user via populating the one or more policy parameter fields of the supplemental crop insurance policy information content page, determining, by one or more processors, a premium for a supplemental crop insurance policy corresponding to the set of supplemental crop insurance policy parameters, and providing for display of a supplemental crop insurance policy information content page including the premium for the supplemental crop insurance policy.

In some embodiments, provided is a system that includes one or more processors and one or more memories storing program instruction that are executable by the one or more processors to cause the following steps: providing for display of a supplemental crop insurance policy indemnity information content page including one or more loss parameter fields to be populated by a user with a corresponding set of supplemental crop insurance loss parameters, receiving a set of supplemental crop insurance loss parameters submitted by a user via populating the one or more loss parameter fields of the supplemental crop insurance policy indemnity information content page, determining an estimated indemnity for a loss under the supplemental crop insurance policy based at least in part on the set of supplemental crop insurance loss parameters, and providing for the display of a supplemental crop insurance policy indemnity information content page including the estimated indemnity for the loss under the supplemental crop insurance policy.

In some embodiments, provided is a computer implemented method for presenting a premium for a supplemental crop insurance policy. The method including serving, to a user device for display to a user, a supplemental crop insurance policy information content page including one or more policy parameter fields to be populated by a user with a corresponding set of supplemental crop insurance policy parameters, receiving a set of supplemental crop insurance policy parameters submitted by a user via populating the one or more policy parameter fields of the supplemental crop insurance policy information content page, determining, by one or more processors, a premium for a supplemental crop insurance policy corresponding to the set of supplemental crop insurance policy parameters, and serving, to the user device for display to the user, a supplemental crop insurance policy information content page including the premium for the supplemental crop insurance policy. In certain embodiments, determining a premium for a supplemental crop insurance policy corresponding to the set of supplemental crop insurance policy parameters includes determining a premium for a supplemental crop insurance policy corresponding to the set of supplemental crop insurance policy parameters in real-time using one or more predetermined pricing functions and/or simulation-based calculations.

In some embodiments, determining a premium for a supplemental crop insurance policy corresponding to the set of supplemental crop insurance policy parameters includes: determining a premium amount for each selected coverage of a supplemental policy, summing premium amounts for selected coverages to generate a premium amount, and applying a coverage factor and quantity factor to the premium amount to generate a premium for the supplemental crop insurance supplemental policy. In certain embodiments, determining a premium amount for each selected coverage of a supplemental policy is based at least in part on application of a policy rating algorithm. In some embodiments, summing premium amounts for selected coverages to generate a premium amount includes summing premium amounts per acre for a coverage level for all alternative price discovery periods elected. In certain embodiments, applying a coverage factor and quantity factor to a premium amount to generate a premium for the supplemental policy includes applying a liability adjustment factor, a percentage protection per acre, a number of insured acres and a share to the premium amount to generate a premium for the supplemental crop insurance policy.

In some embodiments, the one or more policy parameter fields include fields for at least one of the following: a crop to be insured, an estimate of a number of acres to be planted by type and practice for a crop year, production databases for an insured crop, an estimate of anticipated actual yield by unit, type and practice for a current crop year, a coverage level elected for a supplemental policy, an insurance plan elected, a liability adjustment factor, an alternative price discovery period, or a maximum price movement limit.

In some embodiments, provided is a computer implemented method for presenting an estimated indemnity for a supplemental crop insurance policy. The method including serving, to a user device for display to a user, a supplemental crop insurance policy indemnity information content page including one or more loss parameter fields to be populated by a user with a corresponding set of supplemental crop insurance loss parameters, receiving a set of supplemental crop insurance loss parameters submitted by a user via populating the one or more loss parameter fields of the supplemental crop insurance policy indemnity information content page, determining, by one or more processors, an estimated indemnity for a loss under the supplemental crop insurance policy based at least in part on the set of supplemental crop insurance loss parameters, and serving, to the user device for display to the user, a supplemental crop insurance policy indemnity information content page including the estimated indemnity for the loss under the supplemental crop insurance policy.

In certain embodiments, determining an estimated indemnity for a loss under the supplemental crop insurance policy based at least in part on the set of supplemental crop insurance loss parameters includes determining an estimated indemnity for a loss under the supplemental crop insurance policy based at least in part on the set of supplemental crop insurance loss parameters in real-time using one or more predetermined indemnity functions.

In some embodiments, determining an estimated indemnity for a loss under the supplemental crop insurance policy based at least in part on the set of supplemental crop insurance loss parameters includes: determining a highest alternative projected price, determining whether the highest alternative projected price exceeds a projected price or a harvest price, and in response to determining that the highest alternative projected price does not exceed the projected price or the harvest price, determining that an estimated indemnity for a loss under the supplemental crop insurance policy is zero.

In some embodiments, determining an estimated indemnity for a loss under the supplemental crop insurance policy based at least in part on the set of supplemental crop insurance loss parameters includes: determining whether the supplemental crop insurance policy is associated with an RP or GRIP/ARP insurance plan, in response to determining that the supplemental crop insurance policy is associated with an RP insurance plan, determining an estimated indemnity for a loss under the supplemental crop insurance policy using one or more predetermined indemnity functions associated with RP insurance plans, and in response to determining that the supplemental crop insurance policy is associated with a GRIP/ARP insurance plan, determining an estimated indemnity for a loss under the supplemental crop insurance policy using one or more predetermined indemnity functions associated with GRIP/ARP insurance plans.

In some embodiments, determining an estimated indemnity for a loss under the supplemental crop insurance policy using one or more predetermined indemnity functions associated with RP insurance plans includes: determining a highest alternative projected price, determining whether the highest alternative projected price exceeds a projected price or a harvest price, and in response to determining that the highest alternative projected price does exceed the projected price or the harvest price: applying a coverage level to an approved yield for each type and practice to generate a yield coverage, applying a highest projected price to the yield coverage to generate a coverage amount, applying the coverage amount to insured acreage to generate an insured coverage amount, applying a production count to a harvest price to generate a production amount, reducing the insured coverage amount by the production amount to generate a production loss, applying a share to the production loss to generate an eligible production loss, determining a RP indemnity, and reducing the eligible production loss by the RP indemnity to generate an eligible loss, and applying a liability adjustment factor to the eligible loss to generate the estimated indemnity for the supplemental crop insurance policy.

In certain embodiments, determining an estimated indemnity for a loss under the supplemental crop insurance policy using one or more predetermined indemnity functions associated with GRIP/ARP insurance plans includes: determining a highest alternative projected price, determining whether the highest alternative projected price exceeds a projected price or a harvest price, and in response to determining that the highest alternative projected price does exceed the projected price or the harvest price: determining a policy protection adjustment factor, applying the policy protection adjustment factor to policy protection for each type and practice to generate a coverage amount, determining a trigger revenue for each type and practice based at least in part on expected county yield, highest projected price, and selected coverage level, determining a county ratio based at least in part on the county revenue and the trigger revenue for each type and practice, applying the county ratio and the coverage amount to insured acreage and a share to generate an eligible production loss, determining a GRIP/ARP indemnity, reducing the eligible production loss by the GRIP/ARP indemnity to generate an eligible loss, and applying a liability adjustment factor to the eligible loss to generate an estimated indemnity for the supplemental crop insurance policy.

In some embodiments, the one or more policy parameter fields include fields for at least one of the following: an indemnity paid under another insurance plan, a production to count, a harvest price, a highest projected price or a projected price.

In certain embodiments, provided is an electronic interface that may be displayed on a display device to permit a user to submit a set of supplemental crop insurance policy parameters for use in determining a premium for a supplemental crop insurance policy corresponding to the set of supplemental crop insurance policy parameters. The electronic interface may include: a first display region visualizing a set of personal information fields for the entry of information relating to a producer, a second display region visualizing a set of crop/policy information fields for the entry of information relating to crops and requested policy terms, a third display region visualizing a first control element that when selected causes the crop/policy information fields to correspond to either an RP plan or a GRIP/ARP plan, a fourth display region visualizing a second control element for selecting an alternative price discovery period, that when selected causes the display of an additional control element for selecting an additional alternative price discovery period, and a fifth display region visualizing a third control element that when selected initiates real-time calculation of a premium for the supplemental crop insurance policy based at least in part on the information relating to the producer submitted via the set of personal information fields and the information relating to crops and requested policy terms submitted via the set of crop/policy information fields.

In some embodiments, the set of personal information fields include fields for entry of at least one of the following: a full name, an address, a city, a state, a zip code, a county, and a telephone. In certain embodiments, the set of crop/policy information fields include fields for entry of at least one of the following: a crop to be insured, an estimate of a number of acres to be planted by type and practice for a crop year, production databases for an insured crop, an estimate of anticipated actual yield by unit, type, and practice for a current crop year, a coverage level elected for a supplemental policy, an insurance plan elected, a liability adjustment factor, an alternative price discovery period, and a maximum price movement limit. In some embodiments, the electronic interface further includes a fifth display region visualizing the premium amount calculated in response to selection of the third control element.

In certain embodiments, provided is an electronic interface that may be displayed on a display device to permit a user to submit a set of supplemental crop insurance loss parameters for use in determining an estimated indemnity under a supplemental crop insurance policy corresponding to the set of supplemental crop insurance loss parameters. The electronic interface including: a first display region visualizing a set of loss parameter fields for the entry of information relating to a loss by a producer, and a second display region visualizing a control element that when selected initiates real-time calculation of an estimated indemnity under the supplemental crop insurance policy based at least in part on the information relating to the loss by the producer submitted via the loss parameter fields.

In some embodiments, the set of loss parameter fields include fields for entry of at least one of the following: an indemnity paid under another insurance plan, a production to count, a harvest price, a highest projected price and a projected price. In some embodiments, the electronic interface further includes a fourth display region visualizing the estimated indemnity calculated in response to selection of the control element.

In certain embodiments, provided is a system that includes an electronic communications network, a user device, and a supplemental insurance server communicatively coupled to the user device via the electronic communications network. The supplemental insurance server may be adapted to serve, to the user device, a nursery insurance policy information content page including one or more policy parameter fields adapted to be populated by a user with a corresponding set of nursery insurance policy parameters and serve, to the user device, a nursery insurance policy indemnity information content page including one or more loss parameter fields adapted to be populated by a user with a corresponding set of nursery insurance loss parameters. The user device may be further adapted to display the nursery insurance policy information content page, receive a set of nursery insurance policy parameters submitted by a user via populating the one or more policy parameter fields of the nursery insurance policy information content page, and transmit the set of nursery insurance policy parameters to the supplemental insurance server. The user device may be further adapted to display the nursery insurance policy indemnity information content page, receive a set of nursery insurance loss parameters submitted by a user via populating the one or more loss parameter fields of the nursery insurance policy indemnity information content page, and transmit the set of nursery insurance loss parameters to the supplemental insurance server. The supplemental insurance server may be further adapted to determine a premium for a nursery insurance policy corresponding to the set of nursery insurance policy parameters, and to serve, to the user device, a nursery insurance policy information content page including the premium for the nursery insurance policy. The supplemental insurance server may be further adapted to determine an estimated indemnity for a loss under the nursery insurance policy based at least in part on the set of nursery insurance loss parameters, and to serve, to the user device, a nursery insurance policy indemnity information content page including the estimated indemnity for the loss under the nursery insurance policy. The user device may be further adapted to display the nursery insurance policy information content page including the premium for the nursery insurance policy, and display the nursery insurance policy indemnity information content page including the estimated indemnity for the loss under the nursery insurance policy.

In certain embodiments, determining a premium for a nursery insurance policy corresponding to the set of nursery insurance policy parameters includes determining a premium for a nursery insurance policy corresponding to the set of nursery insurance policy parameters in real-time using one or more predetermined pricing functions.

In some embodiments, the user device is further adapted to display a nursery pre-acceptance content page including one or more pre-acceptance parameter fields of the nursery pre-acceptance content page, and receive a set of pre-acceptance parameters submitted by a user via populating the one or more pre-acceptance parameter fields of the nursery pre-acceptance content page, and transmit the set of pre-acceptance parameters to the supplemental insurance server. The supplemental insurance server may be further adapted to generate a pre-acceptance score based at least in part on the set of pre-acceptance parameters, determine whether the pre-acceptance score satisfies a pre-acceptance threshold score, and in response to determining that the pre-acceptance score satisfies a pre-acceptance threshold score, serve, to the user device, the nursery insurance policy information content page comprising one or more policy parameter fields configured to be populated by a user with a corresponding set of nursery insurance policy parameters.

BRIEF DESCRIPTION OF THE DRAWINGS

FIG. 2 is an illustration of an exemplary supplemental policy information page in accordance with one or more embodiments of the present invention.

FIGS. 2A-2J are illustrations of exemplary supplemental policy information pages in accordance with one or more embodiments of the present invention.

FIGS. 4A and 4B are illustrations of exemplary supplemental policy information pages including display of a determined premium in accordance with one or more embodiments of the present invention.

FIG. 6 is an illustration of an exemplary supplemental policy indemnity information page in accordance with one or more embodiments of the present invention.

FIG. 8 is an illustration of an exemplary supplemental policy indemnity estimation page including display of an estimated indemnity in accordance with one or more embodiments of the present invention.

FIG. 12A is an illustration of an exemplary Private Area Revenue (PAR) supplemental policy information page in accordance with one or more embodiments of the present invention.

FIG. 12B is an illustration of an exemplary PAR supplemental policy information page including display of a determined premium in accordance with one or more embodiments of the present invention.

FIGS. 13A-13C are illustrations of exemplary nursery supplemental policy information pages in accordance with one or more embodiments of the present invention.

FIGS. 15A and 15B are illustrations of exemplary pre-acceptance pages in accordance with one or more embodiments of the present invention.

Figure 1:
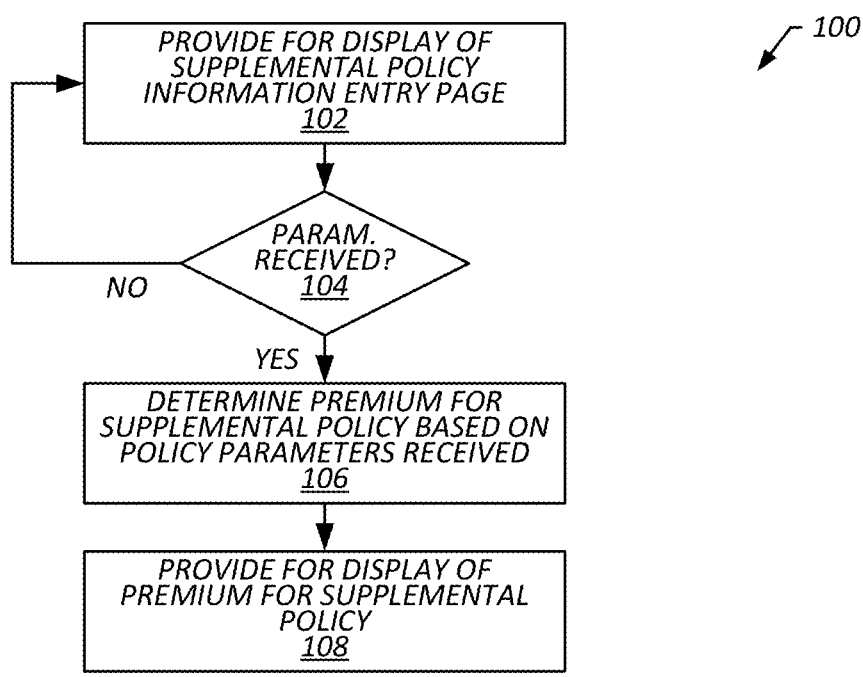
FIG. 1 is a flowchart that illustrates a method for presenting premium for a supplemental policy in accordance with one or more embodiments of the present invention.

While the invention is susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION OF THE PREFERRED EMBODIMENTS

Glossary of Terms

Supplemental Policy—a non-reinsured supplemental (NRS) insurance product, e.g., a supplemental crop insurance revenue protection coverage, that provides additional coverage for other insurance policies, such as Revenue Protection (RP) and Group Risk Income Protection-Harvest Revenue Option (GRIP/ARP) policies.

Alternative price discovery period—the period of time that begins on the calendar date chosen from those offered and that ends on the calendar date that is the specified number of days later.

Alternative projected price—the value determined for an alternative price discovery period. The alternative projected price may be determined by the insurer based on procedures specified in the supplemental policy.

Current crop year—the crop currently growing or the crop that has been most recently harvested.

Decision date—the last day by which the insured may elect an alternative price discovery period.

Eligible County—a county identified as a county in which the supplemental policy is offered.

Expected county yield—an estimate of the average yield likely to be achieved by all producers in a county or Crop Reporting District (CRD) for the crop year.

Final county yield—an estimate of the average yield actually achieved by all producers in a county or CRD for the crop year.

Harvest price—a harvest price as defined for RP and the GRIP/ARP insurance plans.

Highest alternative projected price—the greatest value determined among the alternative price discovery periods selected by the insured, but not greater than the maximum price movement amount selected by the insured plus the projected price.

Insured acres—the number of net planted acres for the crop year that are not disallowed by the "Insured Crops and Acreage" section of the supplemental policy and that are greater than or equal to the minimum number of net acres, but less than or equal to the maximum number of net acres insured under the supplemental policy.

Liability adjustment factor—the percentage of any indemnity (and premium) that the insured selects. For example, if the insured would have been entitled to an indemnity of $10 per acre under the supplemental policy but the insured chose a liability adjustment factor of 80%, the insured may receive an indemnity of $8.00 per acre. The insured may choose an offered liability adjustment factor (e.g., between 50% and 150% in ten percentage point increments).

Maximum price movement amount—a value chosen by the insured that limits the dollar amount by which the highest alternative projected price can exceed the projected price released by RMA. The maximum price movement amount may be less than or equal to maximum specific limits.

MPCI policy—any plan of insurance offered on the crop that is reinsured by the Federal Crop Insurance Corporation.

Net acres—the result of multiplying the planted acreage insured under the supplemental policy by the insured's share in the income or production from those acres.

Policy Protection Adjustment Factor/Policy Protection Amount Election—the term as defined in Group Risk Income Protection ("GRIP") Plan—Harvest Revenue Option Endorsement (or successors) as redefined in the section "Indemnity" of the supplemental policy.

Price discovery—a process whereby the daily closing prices on the commodity exchange stipulated in the Commodity Exchange Price Provisions are summed for an alternative price discovery period and then divided by the number of daily closing prices included in the sum. All results may be rounded to whole cents using the "5/4" rounding rule (e.g., $0.1250 rounds to $0.13 and $0.1249 rounds to $0.12).

Projected price—the projected price as defined for the RP insurance plan or the expected price as defined for the GRIP/ARP insurance plan (or successors). The projected price may be the projected price announced by RMA for the RP insurance policy and the expected price announced by RMA for the GRIP/ARP insurance policy.

Total acres—the sum of the net planted acres insured under the supplemental policy.

Underwriting Guide—a document that contains specific information about the supplemental policy. An underwriting guide may be issued by the insurer.

Discussion of Certain Exemplary Embodiments:

As discussed in more detail below, provided in some embodiments are systems and methods for determining characteristics for supplemental insurance policies, such as supplemental crop and/or nursery insurance policies. In certain embodiments, systems and methods employ financial engineering to provide users with information such as insurance premium quotes and indemnity amounts. Financial engineering may include the use of statics, simulations and/or similar data to determine values for the various types of information. In the context of crop insurance, for example, financial engineering may include calculating the risk associated with giving a grower an option to design his own coverage and putting that coverage on top of the existing RMA coverage. Such calculations may involve a multi-variable analysis, e.g., taking into account a variety of relevant variables, such as probabilities and risks, that can impact a premium rate, a premium amount, or the like. Financial engineering may enable real-time determinations of premium quotes and/or indemnity amounts. For example, an insurance agent may submit a set of premium parameters to an insurance system, the system may employ financial engineering techniques (e.g., use of futures market information) to determine a premium amount, and the resulting premium amount may be provided to the agent in real-time (e.g., within seconds or minutes of the submission) to allow the agent to provide the client with a quote almost instantly. A real-time quote may be valid for only a short period of time and, thus, an agent may have to refresh the quote before submitting a request to purchase the policy to ensure the quote is still valid. Such a process may enable the premium quoting and the indemnity estimation processes to be customized to the needs of the insured while dynamically providing corresponding pricing and indemnity information.

In some embodiments, a financial engineering system includes a simulation processor that utilizes one or more of the following to determine a premium for a policy: RMA premium rates, current market price, implied volatility from options measured based on sales of Puts and Calls for the commodity, the number of days prior to the discovery of projected price, harvest price, the likelihood that these prices may exceed any given additional month's price as selected by the grower, and the likelihood than any outcome may reach or exceed price movement limits.

In some embodiments, a supplemental insurance system is capable of determining a supplemental insurance premium based on a number of policy parameters. For example, the system may calculate a premium for supplemental crop insurance based on identification of the following policy parameters: a crop to be insured, an estimate of the number of acres to be planted by type and practice for the crop year, each production database for the insured crop, an estimate of the anticipated actual yield by unit/type/practice for the current crop year (e.g., if a production report is not available), a coverage level elected for the supplemental policy, an insurance plan elected for determining the right to an indemnity (RP, GRIP/ARP, or successor plans) (and if the insured elects GRIP/ARP, the percentage of the maximum amount of insurance elected), a liability adjustment factor, one or more alternative price discovery periods, and/or a maximum price movement limit.

In some embodiments, premium estimates are provided through an interactive web-based agent portal. Such a portal may be employed to help a producer/grower and/or an agent get a quote, customize coverage, and even complete applications. A portal may include for example, a user interface that prompts a user to enter policy parameters, thereby facilitating collection of the policy parameters needed for generating a quote. For example, a supplemental policy information page may display a number of interactive policy parameter fields that can be filled in by an agent while he/she is talking with a prospective client (e.g., a producer) that is interested in a supplemental policy (e.g., a supplemental crop insurance policy). In some embodiments, the system's ability to calculate a premium based on a set of policy parameters enables the premium to be calculated and provided to the agent and/or the prospective client almost instantly. For example, upon the agent entering the policy parameters via the supplemental policy information page, the system may process the policy parameters to calculate a premium for the supplemental insurance policy in a matter of seconds or minutes, and display the premium to the agent. Such a system may, thus, enable an agent to acquire policy information from a perspective client and provide an estimated a premium for a supplemental policy while the agent is "at the kitchen table" with the client.

In some embodiments, a supplemental insurance system is capable of determining an estimated indemnity under a supplemental insurance policy based on a number of loss parameters. For example, the system may calculate an estimated indemnity for a loss under a supplemental crop insurance policy based on existing policy terms (e.g., the policy parameters used to generate the policy) along with identification of some or all of the following loss parameters: an indemnity paid under other insurance (RP, GRIP/ARP, or successor plans), a production to count, a harvest price, a highest projected price and/or a projected price. In some embodiments, acquisition of the loss parameters is facilitated by a user interface that prompts a user to enter the loss parameters. For example, a supplemental policy indemnity information page may display a number of interactive loss parameter fields that can be filled in by an agent while he/she is talking with the insured. In some embodiments, the system's ability to calculate an indemnity based on a set of loss parameters enables the estimated indemnity to be calculated and provided to the agent and/or the prospective client almost instantly. For example, upon the agent submitting the parameters via the supplemental policy indemnity information page, the system may process the loss parameters to calculate an estimated indemnity for the loss under the supplemental insurance policy in a matter of seconds or minutes, and display the estimated indemnity to the agent. Such a system, thus, may enable an agent to acquire loss information from the insured and provide an estimated indemnity for a loss under the supplemental insurance policy while the agent is "at the kitchen table" with the client.

Although certain embodiments are described in the context of supplemental crop insurance, the techniques described herein may be employed in a variety of applications, such as Private Area Revenue (PAR) Supplemental Insurance, Nursery Crop Insurance (e.g., Nursery Hurricane Named Peril Supplemental Insurance, Nursery Production Infrastructure Supplemental Insurance, and Nursery Grafted Fruit Stock Supplemental Insurance), PRF Supplemental Insurance, Customized Revenue Supplemental Insurance, Regional Top Up Supplemental Insurance, Personal Yield Assurance Supplemental Insurance, and County Yield Assurance Supplemental Insurance. For example, an agent selling these types of coverage may gather policy parameters from the insured, submit the policy parameters to an insurance system via an interactive portal, the insurance system may employ financial engineering techniques to generate a quote, and the quote may be provided in real-time to the agent via the portal. Similarly, an agent may gather loss parameters from the insured for the respective coverage, submit the loss parameters to an insurance system via an interactive portal, the insurance system may determine an estimated indemnity, and the estimated indemnity may be provided in real-time to the agent via the portal.

Crop Insurance Policies:

Crop insurance policies are typically purchased by agricultural producers, including farmers, ranchers, and others to protect themselves against either the loss of their crops due to natural disasters, (e.g., hail, drought, and floods), or the loss of revenue due to declines in the prices (e.g., declines in the prices of agricultural commodities). Two general categories of crop insurance include (1) crop-yield insurance and (2) crop-revenue insurance. Two main classes of crop-yield insurance include (a) crop-hail insurance and (b) Multi-peril crop insurance (MPCI). Crop-hail insurance generally covers losses due to the occurrence of hail storms. Multi-peril crop insurance (MPCI) covers losses dues to multiple risks, and is typically not limited to one risk, such as hail damage. Multi-peril crop insurance typically offers coverage for hail, excessive rain, drought, insect or bacteria-related diseases and/or the like in a combined package. MPCI coverage is typically offered by a government insurer and premiums are usually partially subsidized by the government. In the United States, a subsidized multi-peril federal insurance program, administered by the Risk Management Agency (RMA), is available to most farmers. The RMA has been active in calculating the premiums based on individual risk factors since 1996. Crop-revenue insurance is based on deviation of farmer's revenues from the mean revenue. Crop-revenue is typically calculated as the crop-yield multiplied by the crop price. RMA uses the futures prices on planting and harvest-times listed in the commodity exchange markets, to determine the crop price. Estimated revenue for a farmer can be determined by multiplying the farmer's average crop-yield (or production) by the future (expected) price. Crop-revenue insurance may cover a decline in price that occurs during the crop's growing season, but not declines that may occur from one growing season to another. In some instances, a crop-revenue insurance policy includes a guarantee value that is the same as (or at least based on) the estimated revenue, and pays an indemnity if the combination of the actual revenue is less than the guarantee.

Private Area Revenue (PAR) Insurance Policies:

Private Area Revenue (PAR) is a non-reinsured supplemental (NRS) product that may offer additional coverage for individual MPCI policies by allowing producers to purchase additional coverage for area level revenue risk that supplements the individual level coverage they receive from an MPCI policy. Coverage may be offered in "bands" that are defined by upper and lower coverage levels selected by a grower. PAR is available in many counties and crop reporting districts for: corn, cotton, grain sorghum soybeans, and wheat and may be expanded to include additional crops. PAR may be available in two forms: the base policy, which offers area coverage with the liability established on the projected price, and the Optional Price Coverage, which offers area coverage with the liability established on the greater of the projected price or the harvest price.

The liability/amount of insurance may reside entirely between the coverage levels. As an example, if Grower A is a corn farmer in Champaign County, Ill., he buys RP coverage at the 75% coverage level, he buys PAR for his corn and he selects 90% as the upper coverage level, 75% as lower coverage level, Champaign County has an Expected County Yield of 170 bu/ac and the Projected Price is $5.88/bu, then the amount of Insurance is determined as follows:

Coverage Band=90% Upper−75% Lower=15%
Expected Revenue=170×$5.88=$1,000/ac
Amount of insurance=15% Coverage Band×$1000/ac Expected Revenue=$150/acre If Champaign County, Ill. Yield is reported by NASS as 150 bu/ac. Harvest Price is reported by RMA at $5.70/bu, then:

Area revenue per acre=150 bu×$5.70=$855/ac;
Trigger revenue per acre=170 bu×$5.88×0.90=$900/ac;
Loss Factor=($900−$855)/$900=5%
Nominal Loss=$1000×5%=$50/ac
Indemnity=Min ($150/ac, $50/ac)

Nursery Crop Insurance Policies:

a. Nursery Hurricane Named Peril Supplemental Insurance:

Nursery Hurricane Named Peril Supplemental may be additional coverage placed on top of an underlying Nursery Insurance product. Nursery Hurricane Named Peril Supplemental Coverage may allow producers to target specific intervals of time when exposure to hurricane risk is perceived to be greatest, increasing the value of nursery coverage to the grower. It may provide the opportunity to choose additional coverage for hurricane damage. Producers may be able to add one or more hurricane risk periods for their underlying nursery insurance policy and a higher price election for those selections to establish the Nursery Hurricane Named Peril Supplemental guarantee loss adjustment in the event of a hurricane.

Hurricane Named Peril Nursery Supplemental coverage may allow producers to target specific intervals of time when exposure to hurricane risk is perceived to be greatest based on their production schedule. Hurricane Named Peril Nursery Supplemental coverage can provide protection for nursery crops in areas prone to hurricane damage, thereby giving producers greater control over their covered financial risk. It may allow growers to buy up their liability for a limited period under which they face hurricane risk, it may match coverage to grower perception of meaningful risk, offering coverage where/when the grower thinks it is needed most, it may incentivize participation in FCIC programs by producers with very limited risk periods and it may incentivize participation at higher buy-up levels to avoid a "donut hole" in coverage. This can be a particularly valuable tool to sell to growers who historically participated in the FCIC program, but have dropped out based on perceived differences between the coverage provided by the nursery policy and the coverage they feel they need.

a. Nursery Production Infrastructure Supplemental Insurance:

Nursery Production Infrastructure Supplemental Insurance may have no impact on the liability or indemnity associated with an underlying Nursery Insurance policy, producers can be afforded greater independence to insure their high value production resources (drip irrigation systems, automated cold protection, shade cloth structures, glasshouses, etc.). Nursery Production Infrastructure Coverage may provide producers expanded flexibility in risk transfer by allowing them to choose insurance for multiple production inputs that are essential to their business model. Producers can add one or more input coverages to their underlying Nursery Insurance policy. Producers can cover both product and production risks, insuring the possibility to reopen a business closed by a catastrophic weather event. Freedom to select capital risks of concern is a potential benefit of the Nursery Production Infrastructure Coverage program.

Nursery Production Infrastructure Supplemental Insurance coverage may allow producers to insure the critical infrastructure that may be damaged and/or lost to the same sorts of events that damage inventories (e.g., drip irrigation systems, Ground Covers, Shade Structures, Cold Damage Mitigation Systems). These production infrastructures may not be covered well under casualty and property insurance. It may incentivize participation in FCIC programs from high-end producers with substantial capital investments. The Nursery Production Infrastructure elements of the coverage can address highly correlated losses. Coverage and loss determination may be bundled with underlying nursery coverage, keeping complexity down.

a. Nursery Grafted Fruit Stock Supplemental Insurance:

The Grafted Nursery (Food-stocks) Non-reinsured Supplemental Insurance may provide producers expanded flexibility in electing the value per plant for their nursery stock throughout the production cycle, from rootstock, to graft to cutting back the rootstock to aftercare, the value of the stock is in flux, and the producer costs are constantly increasing. Food-stocks Non-reinsured Supplemental Insurance may be a customizable non-reinsured supplemental offering additional coverage for producers of grafted fruit and nut nursery stocks. The Grafted Nursery Food-stocks Non-reinsured Supplemental Insurance may be additional coverage that is placed on top of the underlying Nursery Insurance product; indemnity payments, like the premium payments, may be separate. A producer may experience a loss that triggers an indemnity payment from the underlying Nursery Insurance policy without receiving an indemnity from Grafted Nursery Food-stocks Non-reinsured Supplemental Insurance. Alternatively, a producer who does not choose to buy-up the nursery coverage may experience a "doughnut hole" before the Grafted Nursery Food-stocks Non-reinsured Supplemental kicks in. The additional coverage producers purchase through Grafted Nursery Food-stocks Non-reinsured Supplemental Insurance may pay an indemnity in this instance, helping to offset the financial losses suffered by the producer. Without the buy-up protection from the underlying FCIC insurance, portions of the loss may not be covered.

The Grafted Fruit Stock Nursery Supplemental Insurance coverage may allow producers to insure the added value of grafted stock, which RMA systemically undervalues. It may incentivize participation from highly-qualified producers with relatively limited risk periods, and incentivize participation at higher buy-up levels to provide appropriate coverage blending the subsidized and open market elements.

PRF Insurance Policies:

Pasture, Rangeland, and Forage (PRF) Supplemental Insurance may offer producers coverage for both minimal and near total loss scenarios. It may provide producers both top and bottom expansion of the RMA Rainfall Index coverage, and may be fashioned to provide producers risk management more congruent with their risk tolerance. When a producer's rainfall index overestimates the potential for grazing, the Under element of PRF-RI Over/Under Coverage may indemnify losses of access to forage to recognize the catastrophic loss; a grower may receive the full value of coverage if an index value of less than 50 or some other value designated by the insured is incurred. The Over element of PRF-RI Over/Under Coverage may expand the coverage to accommodate producers with low risk tolerance, offering 100% coverage level by interval.

Customized Revenue Insurance Policies:

Customized Revenue Insurance can be a companion product to supplemental crop insurance. Customized Revenue may multiply the producer's flexibility in revenue risk transfer by allowing even more producer choices for creation of price discovery points. It may be proposed for producers with extraordinary marketing knowledge and understanding, providing virtually limitless opportunities for risk transfer. It may be an exceedingly customizable non-reinsured supplemental offering additional coverage for Revenue Protection (RP) and Group Risk Income Protection-Harvest Revenue Option (GRIP HRO—or successor) policies. The precise alternatives for price discovery can be virtually limitless and may be selected by the insurer.

Regional Top Up Insurance Policies:

Regional Top Up insurance can increase the producer's risk management involvement by customizing the price discovery periods for the individual MPCI and the supplemental policy offering area revenue coverage. It may be provided for top producers interested in additional control of their "buy-up" insurance product. It may be an expansion of the highly customizable non-reinsured supplemental to encourage top producer involvement in the selection of their additional risk management opportunities. It may provide a guarantee based on the interaction between the expected county yield and the producer selected price discovery approach. When the actual county yield, the projected price, or some combination of the two, falls below the guarantee, the grower may receive an indemnity regardless of their actual individual yield.

Personal Yield Assurance Insurance Policies:

Personal Yield Assurance Insurance may allow producers to buy PAR-like area coverage backstopped by their individual MPCI coverage. Coverage may be established based on selected area expected yield and projected price in a band (upper and lower) selected by the producer. When the producer receives an individual MPCI indemnity, that indemnity may be counted against the Personal Yield Assurance indemnity until the backstop indemnity reaches zero. Personal Yield Assurance coverage may provide the producer with area coverage and a higher probability of indemnity while keeping the cost of coverage down.

County Yield Assurance Insurance Policies:

County Yield Assurance Insurance may provide a supplemental policy for GRIP-HRO (or successor) for producers who are eligible for enterprise units. It may allow producers to buy individual yield revenue coverage backstopped by their GRIP/ARP-HRO MPCI coverage. If the Grower has a GRIP/ARP indemnity, it may be counted against any County Yield Assurance (CYA) indemnity, reducing premium rates. It may offer the inverse of coverage offered under area backstop. It may be individual coverage that fits under an area MPCI plan rather than area coverage that fits over an individual MPCI plan. Both concepts may assure the grower the greater of an individual or area indemnity.

Exemplary Embodiments of Supplemental Insurance Policies:

In some embodiments, provided is a supplemental insurance policy (e.g., a supplemental crop insurance policy) that includes a non-reinsured supplemental (NRS) insurance product. The supplemental policy may provide additional coverage on top of other insurance policies. For example, the supplemental policy may include revenue protection coverage that provides additional coverage for other insurance policies, such as Revenue Protection (RP) and Group Risk Income Protection-Harvest Revenue Option (GRIP or successor) policies. The supplemental policy coverage may be available for various crops, including, for example, corn, cotton, soybeans, and wheat. In some embodiments, the supplemental policy coverage allows producers (e.g., farmers) to choose alternative price discovery periods, including, for example, selecting periods before and after the period defined by the Commodity Exchange Price Provisions (CEPP). An alternative price discovery period may be longer or shorter than those established by the CEPP. The highest projected price for these alternative price discovery periods, as determined by the insurer, can be used to establish the revenue guarantee for loss purposes if that price exceeds the projected and harvest prices released by RMA. Otherwise, the liability of the supplemental crop insurance revenue protection coverage may be zero. That is, no indemnity may result from the supplemental policy revenue protection coverage. In some instances, these options may have no impact on the liability or indemnity for the federally reinsured RP or GRIP/ARP coverage. That is, the liability for RP and GRIP/ARP may continue to be set on the basis of the price discovery periods defined by the CEPP.

The supplemental policy may allow the producer to choose price discovery periods before and after the period defined by the CEPP. The liability for the supplemental policy may vary based on liability of other insurance policies. For example, the liability for the coverage as it relates to RP may be the positive difference between the supplemental policy revenue protection coverage liability price (the highest of the producer's selected discovery period values) and the RP liability price multiplied by the producer's expected yield multiplied by a chosen coverage level. The liability for the supplemental policy revenue protection coverage as it relates to GRIP/ARP may be the positive difference between the amount of policy protection using the supplemental crop insurance revenue protection coverage price (the highest of the producer's selected discovery period values) and the GRIP/ARP liability price. The projected and harvest prices established under CEPP may be greater than any of the prices selected by the producer under supplemental policy revenue protection coverage. In this situation, the premium may still be due, but no indemnity will be paid under the supplemental policy revenue protection coverage. In some instances, although the supplemental policy revenue protection coverage price is higher than the projected or harvest prices established under the CEPP, no indemnity may be owed because the value of the production to count exceeds the revised revenue guarantee. In some instances, the supplemental policy revenue protection coverage is available in certain locations and/or closing dates. For example, for the 2013 crop year, the supplemental policy revenue protection coverage may be available for corn, cotton, soybeans, and wheat in all counties where there are either GRIP/ARP or RP offers for spring sales closing dates. In some instances, the supplemental policy revenue protection coverage imposes a limit on the difference in price between the highest supplemental policy revenue protection coverage additional price discovery price designated and the price determined by the CEPP. These limits may be, for example, $1.50/bu. for corn, $0.25/lb. for cotton, $1.50/bu. for grain sorghum, $2.00/bu. for wheat, and $3.00/bu. for soybeans. In some embodiments, producers may choose from several options for price caps that are less than these policy limits.

A supplemental policy may provide the insured with an opportunity to effectively "lock" a potentially higher revenue protection guarantee than the level established under the RP insurance policy) or the policy protection under the GRIP/ARP insurance policy (the terms "revenue protection guarantee" and "policy protection" will be referenced collectively as "revenue protection" unless specified otherwise). However, if the projected price determined for any selected alternative price discovery period (the "alternative projected price") is not higher than either the projected price or the harvest price (e.g., announced by RMA), the insured may not have any rights to a payment under the supplemental policy, but may still owe the determined premium for the supplemental policy.

In some embodiments, the insured must select either the RP or the GRIP/ARP insurance plan reinsured by FCIC on the insured crop when they apply for the policy (e.g., when they choose their first alternative price discovery period). The manner in which any indemnity is calculated may be based on the plan that is selected. The insured may be required to purchase a MPCI insurance policy for the crop to be insured to establish insurable interest, but they may not be required to buy it from the insurer. In some embodiments, failure to purchase any MPCI insurance coverage on or before the sales closing date established by RMA may result in cancellation of the supplemental policy for the crop year, but the insured may still owe the determined premium determined premium for the supplemental policy.

Insured Crops and Acreage:

The insured may choose the supplemental policy for any crop for which coverage is offered in their county. All types and practices for which the RP or GRIP/ARP insurance plans are offered in an eligible county may be insurable under the supplemental policy. High Risk or some specialty types may be excluded as specified in the policy. In the case of organic types, or any other type for which the projected and harvest prices are derived from the CEPP projected and harvest prices, the same adjustment factors as used by RMA may be applied to the prices determined during an alternative price discovery period.

The insured may not be allowed to insure more planted acreage than they reported for the MPCI insurance plan, and all planted acreage in the county may be required to be reported as insurable under the supplemental policy except, for example, the following:

(1) any acreage for which a prevented planting payment was claimed;
(2) for corn, acreage insured as the silage type;
(3) any acreage designated as "High Risk Land";
(4) any acreage insured under a written agreement; and
(5) any acreage that would be uninsurable under the terms of the MPCI policy.

In some embodiments, the insured is required to provide the insurer with an acreage report separate from the acreage report that the insured files for the MPCI policy that they purchased. In some instances, an application to ensure less than fifty net acres will be rejected.

When the insured selects an alternative price discovery period, the insured may be required to provide the following to the insurer:

(a) the insured's estimate of the intended planted acres of the crop in the county for the crop year for each type and practice (the insured's estimate may be required to be at least fifty net acres and may not be greater than the net acres the insured has insured under any MPCI policy for the crop in any one of the most recent four calendar years. The insurer may require the insured to provide evidence to support the insured's estimate);
(b) the complete production history for all APH databases whether planted or not planted for the current crop year;
(c) the anticipated actual yield for all insured units for the current crop year if the final production is not yet known;
(d) the coverage level the insured elects for the supplemental policy (this may be required to be a value between fifty percent and eighty-five percent in five percentage point increments);
(e) the MPCI policy (RP or GRIP/ARP) the insured selects/designates to use to determine any indemnity under the supplemental policy;
(f) if the insured elects GRIP/ARP, the percentage of the maximum amount of insurance the insured elects;
(g) the insured's selected maximum price movement amount; and
(h) the insured's selected liability adjustment factor.

The insured may be required to provide the insurer with the actual production and insured acres for the current crop year by type and practice and by unit not later than a given period of time, e.g., 30 days, after the earlier of the date the insured completes harvesting for the current crop year or the end of the insurance period for the RP insurance policy in the insured's county.

The insured's selection/designation of the MPCI policy (RP or GRIP/ARP) may be used to determine any indemnity under the policy, but may not obligate the insured to purchase that specific policy. The insurer may use the information to determine the amount of any indemnity to which the insured may be entitled under the supplemental policy and/or to calculate the amount of premium that the insured owes for the supplemental policy in the event the insured does not have acreage insured under a MPCI policy. The insured may be required to provide the insurer with the data needed to determine the applicable MPCI indemnity irrespective of the insured's choices of the MPCI coverage. For example, if the insured elects to use the RP insurance plan as the basis of their coverage under the supplemental policy but purchased the GRIP/ARP insurance plan for their MPCI insurance coverage for the crop year, the insured may be required to provide the insurer with complete production reports for the types and practices of the insured crop the insured planted for the crop year. The insured's failure to provide the required information may result in a determination that no indemnity is due under the policy Limitations on Liability:

In some instances, the insurer may reserve the right to refuse liability or to restrict the amount of liability that they will accept in any county for any crop due to capacity constraints that affect their ability to accept liability. The insured may be notified in writing on or before a decision date if such refusal or restriction will apply to further sales. The insurer may also limit the amount of liability they will assume for prices of alternative price discovery periods that exceed the projected price released by RMA. The maximum specific limits may be, for example, the following: corn, $1.50 per bushel; cotton, $0.25 per pound; grain sorghum, $1.50 per bushel; soybeans, $3.00 per bushel; and wheat, $2.00 per bushel. The insurer may, at their option, reduce the maximum specific limits to satisfy capacity constraints. The insured may select a maximum price movement amount that is less than or equal to the maximum specified limit for a crop from among the choices the insurer provide to the insured.

The insurer may suspend or restrict sales if trading on the applicable futures exchange is disrupted by events such as movement of prices by the maximum amount allowable by the exchange that prevents trading at the end of a session, or there is lack of trading.

Right to Purchase the Supplemental Policy and Cancellation:

The insured may be required to purchase the supplemental policy by agreeing in writing on or before the sales closing date for the RP or GRIP/ARP insurance policy for the crop in their county. Sales of the supplemental policy for a crop year may not be allowed after the sales closing date for the RP or GRIP/ARP insurance policy. A new application may be required for each crop year. A separate application for each sales closing date may be required if the insured wish to insure acreage in a county with two sales closing dates for a crop. The insured's application may not be accepted if they have not paid premium to the insurer for a prior crop year for any crop insurance policy they have purchased from the insurer.

The insured may be required to elect at least one alternative price discovery period for the crop year when they make application for the supplemental policy. The application may become part of the supplemental policy. Insurance may attach for all alternative price discovery periods the insured has selected and all premiums for such alternative price discovery periods may be earned by the insured. The insured may cancel coverage for any alternative price discovery period they have selected in accordance with the section "Provision and Acceptance of Offers for Alternative Price Discovery Periods."

The insured may cancel the supplemental policy with respect to all future alternative price discovery periods that they have not previously elected by returning the original supplemental policy to the insured or by providing written notice to the insured. Such cancellation may be effective on the later of the date the returned policy or written request is received by the insurer, our duly authorized agent, or the date the insured specifies in the written request. The insured may owe the premium for any alternative price discovery period for which a premium has been determined.

The insurer may cancel the supplemental policy for non-payment of the premium of if they find that the insured has materially misrepresented any facts (e.g., by giving the insured written notice by mail at least ten days prior to the effective date of such cancellation if the supplemental policy has been in effect for fewer than sixty days, or not later than forty-five days prior to the effective date of such cancellation if the supplemental policy has been in effect for sixty days or more). Cancellation may not waive the insured's obligation to pay any premium that is owed. The insured may be required to repay any indemnity if the insurer cancels the supplemental policy due to the insured's material misrepresentation. A material misrepresentation may be deemed to have occurred if the information the insured provides to the insurer results in payment of an indemnity greater than 105% of the amount which the insurer determines the insured was entitled to receive.

The insured may be allowed to select any alternative price discovery period which the insurer offers on any specific date. The alternative price discovery periods offered by the insurer may be limited by the insurer's ability to obtain the information needed to establish a premium rate. The insured may not be allowed to select an alternative price discovery period until the insurer is able to establish a premium rate. Alternative price discovery periods may be offered for multiple future crop years. The incurred may be required to make application for that future crop year to be eligible to select those alternative price discovery periods.

Right to Choose MPCI Insurance Plan and Coverage Level:

The supplemental policy may not restrict or infringe on the insured's rights under the MPCI insurance program. The insured may be allowed to choose any available insurance plan, coverage level, or other aspect of the MPCI insurance program that is offered to them. Failure to have a MPCI insurance policy in effect for the crop year or failure to plant the crop may result in no indemnity being due under the supplemental policy because the insured will be deemed to have no insurable interest, however, the insured may still be required to pay the premium owed for the alternative price discovery periods they have selected (e.g., to pay the required premium in accordance with the terms of the supplemental policy). The insured may be required to provide the insurer with evidence that the insured has a MPCI insurance policy in effect for the crop year on or before the acreage reporting date, which will be the date applicable to the MPCI insurance policy the insured has designated for the insurer to use for the purpose of determining any indemnity under the supplemental policy.

Insurance Period:

The supplemental policy may attach for a crop year on the first day of the first alternative price discovery period selected by the insured. The supplemental policy may end for a crop year with respect to the RP insurance policy on the date RMA announces or publishes the harvest price applicable to the crop in the insured's county. The supplemental policy may end for a crop year with respect to the GRIP/ARP insurance policy on the date RMA announces or publishes the county revenue.

Alternative Price Discovery Periods:

The insured may be required to select at least one alternative price discovery period when they apply for the supplemental policy. The insured may be allowed to select additional alternative price discovery periods at that time or until the MPCI sales closing date applicable to the crop included in the insured's application for the supplemental policy. The insured may be required to advise the insurer of their selection(s) in writing on or before the decision date of each alternative price discovery period that the insured elects. Alternative price discovery periods may be defined using a premium quoting tool (e.g., a supplemental crop insurance quoting page/application as described herein). In some instances, only alternative price discovery periods available for selection in the premium quoting tool are offered for purchase.

Insurance Guarantees and Coverage Levels:

The supplemental policy may compensate the insured for their insured portion of the difference in any indemnity payable with the highest alternative projected price and the indemnity payable to the insured under the MPCI insurance plan designated for the acres insured under the supplemental policy. If either the projected price or the harvest price announced or published by RMA exceeds the insured's highest alternative projected price, no indemnity may be payable under the supplemental policy.

The number of insured acres may be established from the acreage report the insured files for the supplemental policy. The coverage level for the supplemental policy may be specified by the insured. The approved yields may be the approved yields applicable to the RP insurance plan. For the GRIP/ARP insurance plan, the insurer may increase the insured's policy protection and trigger revenue as described with regard to indemnity. In some instances, the supplemental policy may be restricted to a minimum and/or maximum size.

Premium:

A premium amount per acre may be determined for each type and practice at the time the insured selects the insured's alternative price discovery periods. The premium may be based on the insured's approved yield for the type and practice for the RP insurance plan or the expected county yield for the type and practice for the GRIP/ARP insurance plan. The annual premium, if the insured has designated the RP insurance plan, may be determined for each type and practice using the following steps:

1. Summing the premium amount per acre for the insured's selected coverage level for all alternative price discovery periods they have elected;
2. Multiplying the result of step 1 by the liability adjustment factor the insured has selected; and
3. Multiplying the result of step 2 by the number of insured acres, and by the insured's share.

The annual premium, if the insured has designated the GRIP/ARP insurance plan, may be determined using the following steps:

1. Summing the premium amounts per acre for the insured's selected coverage level for all alternative price discovery periods they have elected;
2. Multiplying the result of step 1 by the percentage represented by the protection per acre the insured has selected, and by the liability adjustment factor the insured has selected; and
3. Multiplying the result of step 2 by the number of insured acres and by the insured's share.

The total premium may be the sum of the premium amounts for all types and practices the insured planted.

If the insured fails to purchase MPCI insurance coverage, the insurer may use the following to calculate the amount of premium that the insured owes:

For the RP insurance plan:
1. The insurer will sum the premium amounts per acre for the insured's select coverage level for all alternative price discovery periods they have elected;
2. The intended acreage the insured declared;
3. 100% share;
4. The crop's maximum price movement limit; and
5. 100% liability adjustment factor.

For the GRIP/ARP insurance plan:
1. Protection per acre equivalent to 70% of the maximum protection per acre;
2. The expected county yield;
3. The greater of the current crop year acreage planted to the crop or the intended acreage the insured declared;
4. The crop's maximum price movement limit;
5. 100% liability adjustment factor; and
6. 100% share.

The insured may be billed for the premium on a given date, e.g., November $1^{st}$ of the crop year. The insured may be required to pay their premium not later than a given time period, e.g., 30 calendar days, after the date they are billed to avoid interest charges. Interest may be charged at a given rate, e.g., 1.25% simple interest, per calendar month or any portion thereof on unpaid balances. The amount of any unpaid premium may be offset from any indemnity owed to the insured.

Provision and Acceptance of Offers for Alternative Price Discovery Periods:

The premium rates per acre for the insurer's offers may be based in part on the information the insured has provided to the insurer. Some information the insured provides to the insurer may rely on expectations of final yields by unit for the current crop year. The insurer's quoted premium rates may be considered provisional until the final production and acreage for the current crop year are provided by the insured. After the insured provides these final results to the insurer, the insurer may notify the insured of the final premium rate applicable for the alternative price discovery period. The insurer may accept the provisional premium rate/amount if the approved yield and rate yield for a type and practice does not increase or decrease by more than a given percentage, e.g., 2%. The insured may have the right to cancel the supplemental policy for an alternative price discovery period if the final premium rate the insurer quotes to the insured is more than a given percentage, e.g., 10%, higher than the initial quoted premium amount. If the insured does not accept the final premium amount, they may be required to advise the insurer in writing not later than ten calendar days after the insurer notifies the insured of the premium rate/amount. The insurer's offer may be considered final if the insured does not provide the required production and acreage information to the insurer by the earlier of a given period, e.g., 30 days, after the insured completes harvesting or the calendar date for the end of insurance period for the current crop year for the RP insurance plan. The insured may still owe the premium to the insurer.

The insured's agent may not have the authority to bind the insurer for coverage. Coverage may attach upon the insurer's notification to the insured that the insured's request for insurance for an alternative price discovery period has been accepted by the insurer. Notification may be made by electronic means to the insured's agent and/or to the insured, e.g., via electronic mail ("e-mail").

Notices:

The insured may be required to notify the insurer of the amount of any indemnity the insured has received under the MPCI insurance program. In addition, for the RP insurance plan, the insured may be required to provide the insurer a notice of loss if the insured anticipates any loss under the supplemental policy and with the production to count (production report) from each unit. Failure to provide notice and any required data may result in denial of the insured's claim. If the insured specifies the GRIP/ARP plan for the supplemental policy, the insured may not be required to meet any notice requirements.

Indemnity:

Any indemnity owed to the insured may be paid by the insurer within a given period, e.g., 30 days, after the insured has provided the required information and the insurer reaches agreement with the insured on the amount of any indemnity due for the RP insurance plan or within a given period, e.g., 30 days, after RMA releases the county revenue for the GRIP/ARP insurance plan. In addition, the insured may be required to provide the insurer with a completed IRS Form, e.g., IRS W-9 "Request for Taxpayer Identification Number and Certification," before any indemnity is to be paid.

The insurer may employ the following steps to determine the amount of any indemnity due to the insured under the supplemental policy for the RP insurance plan:
1. Determine if the highest alternative projected price exceeds the projected price or harvest price established by RMA. If it does not, no indemnity may be due and no further calculations may be necessary.
2. Multiply the approved yield for each type and practice by the coverage level and round the result to the nearest tenth of a bushel or the nearest whole pound, as appropriate;
3. Multiply each result of step 2 by the highest projected price (subject to the maximum price movement limit selected by the insured) and round the result to the nearest whole dollar;
4. Multiply each result of step 3 by the applicable number of insured acres;
5. Sum all results of step 4;
6. Multiply the production to count of each type and practice by the harvest price;
7. Sum the results of step 6;
8. Subtract the result of step 7 from the result of step 5;
9. Multiply the result of step 8 by the insured's share;
10. Determine the amount of any indemnity that would be payable to the insured under the RP insurance plan on the acres insured under the supplemental policy with all acres insured as a single unit and the coverage level the insured chose for the supplemental policy;
11. Subtract the result of step 10 from the result of step 9; and
12. Multiply the result of step 11 by the liability adjustment factor.

The insurer may employ the following steps to determine the amount of any indemnity due to the insured under the supplemental policy for the GRIP/ARP insurance plan:
1. Determine if the highest alternative projected price exceeds the projected price or harvest price established by RMA. If it does not, no indemnity may be due and no further calculations may be necessary.
2. Determine the supplemental policy Protection Adjustment Factor as the greater of 1.00 or the ratio of the highest alternative projected price to the RMA expected price;
3. Multiply the policy protection for each type and practice elected by the insured by the result of step 2;
4. Determine the trigger revenue for each type and practice as the product of the expected county yield, the highest projected price (subject to the maximum price movement limit selected by the insured), and the coverage level selected by the insured;
5. Subtract the county revenue from the result of step 4 and divide that result by the result of step 4 for each type and practice;
6. Multiply the result of step 3 for each type and practice by the result of step 5, the number of insured acres, and by the insured's share;
7. Sum the results of step 6;
8. Determine the amount of any indemnity that would be payable to the insured for each type and practice under the GRIP/ARP insurance plan with the coverage level and percent of the maximum amount of insurance the insured chose for the supplemental policy;
9. Sum the results of step 8;
10. Subtract the result of step 9 from the result of step 7; and
11. Multiply the result of step 10 by the liability adjustment factor.

Limit on Amount of Indemnity:

The amount of any indemnity payable to the insured by the insurer for the RP insurance plan may not be allowed to cause the total crop value to exceed the amount determined by multiplying each approved yield by the highest alternative projected price, number of insured acres, and the insured's share, and summing those results. If the sum of the insured's share of the value of production to count, any indemnity paid to the insured under the MPCI insurance program, and the amount of the insurer's indemnity is greater than this total value, the insurer's indemnity may be reduced accordingly.

The amount of any indemnity payable to the insured by the insurer for the GRIP/ARP insurance plan may not be allowed to cause the total crop value to exceed the amount determined by multiplying the maximum protection per acre for each type and practice by the number of insured acres and the insured's share, and summing those results. If the final county yield for each type and practice multiplied by the highest alternative projected price, the insured acres, and the insured's share, plus any indemnity paid to the insured under the MPCI insurance program, plus the amount of the insurer's indemnity is greater than this value, the insurer's indemnity may be reduced accordingly.

Exemplary Premium and Indemnity Calculations:

The following provides an exemplary listing of crops, states, and counties for which a supplemental policy may be offered.

Corn: All states and counties where RP and GRIP-HRO (or successor) insurance plans are offered.

Cotton: All states and counties where RP and GRIP-HRO (or successor) insurance plans are offered. Grain Sorghum: All states and counties where RP and/or GRIP-HRO (or successor) insurance plans are offered.

Soybeans: All states and counties where RP and GRIP-HRO (or successor) insurance plans are offered.

Wheat: All states and counties where RP and GRIP-HRO (or successor) insurance plans are offered.

Additional crops and regions may be offered. Producers may purchase coverage in all states and counties for which they are eligible for MPCI coverage and for which there is an offer in the premium quotation tool (e.g., a supplemental crop insurance quoting page/application as described herein).

The following provides an exemplary listing of alternative price discovery periods for the 2013 crop year. It will be appreciated that these listings of alternative price discovery periods are exemplary, and are provided for the purpose of illustration as will be understood by those skilled in the art. These periods are not intended to limit the scope of the invention. For example, 13 or more discovery periods could be offered in future years. Embodiments may include any suitable period(s) to accommodate relevant circumstances.

TABLE 1

Jan. 31, 2013 Sales Closing Date for Corn, Cotton, and Soybeans

| Period Number | Alternative Price Discovery Periods |
|---|---|
| 1 | Aug. 15-Sep. 14, 2012 |
| 2 | Sep. 15-Oct. 14, 2012 |
| 3 | Oct. 15-Nov. 14, 2012 |
| 4 | Nov. 15-Dec. 14, 2012 |
| CEPP Projected Price Period | Dec. 15-Jan. 14, 2013 |
| 5 | Jan. 15-Feb. 14, 2013 |
| 6 | Feb. 15-Mar. 14, 2013 |
| 7 | Mar. 15-Apr. 14, 2013 |
| 8 | Apr. 15-May 14, 2013 |
| 9 | May 15-Jun. 14, 2013 |

TABLE 2

Feb. 15, 2013 Sales Closing Date for Corn

| Period Number | Alternative Price Discovery Periods |
|---|---|
| 1 | Sep. 1-Sep. 30, 2012 |
| 2 | Oct. 1-Oct. 31, 2012 |
| 3 | Nov. 1-Nov. 30, 2012 |
| 4 | Dec. 1-Dec. 31, 2012 |
| CEPP Projected Price Period | Jan. 1-Jan. 31, 2013 |
| 5 | Feb. 1-Feb. 28, 2013 |
| 6 | Mar. 1-Mar. 31, 2013 |
| 7 | Apr. 1-Apr. 30, 2013 |
| 8 | May 1-May 31, 2013 |
| 9 | Jun. 1-Jun. 30, 2013 |

TABLE 3

Feb. 28, 2013 Sales Closing Date for Corn, Cotton, and Soybeans

| Period Number | Alternative Price Discovery Periods |
|---|---|
| 1 | Aug. 15-Sep. 14, 2012 |
| 2 | Sep. 15-Oct. 14, 2012 |
| 3 | Oct. 15-Nov. 14, 2012 |
| 4 | Nov. 15-Dec. 14, 2012 |
| 5 | Dec. 15-Jan. 14, 2013 |

TABLE 3-continued

Feb. 28, 2013 Sales Closing Date for Corn, Cotton, and Soybeans

| Period Number | Alternative Price Discovery Periods |
|---|---|
| CEPP Projected Price Period | Jan. 15-Feb. 14, 2013 |
| 6 | Feb. 15-Mar. 14, 2013 |
| 7 | Mar. 15-Apr. 14, 2013 |
| 8 | Apr. 15-May 14, 2013 |
| 9 | May 15-Jun. 14, 2013 |

TABLE 4

Mar. 15, 2013 Sales Closing Date for Corn, Cotton, Soybeans, and Wheat

| Period Number | Alternative Price Discovery Periods |
|---|---|
| 1 | Sep. 1-Sep. 30, 2012 |
| 2 | Oct. 1-Oct. 31, 2012 |
| 3 | Nov. 1-Nov. 30, 2012 |
| 4 | Dec. 1-Dec. 31, 2012 |
| 5 | Jan. 1-Jan. 31, 2013 |
| CEPP Projected Price Period | Feb. 1-Feb. 28, 2013 |
| 6 | Mar. 1-Mar. 31, 2013 |
| 7 | Apr. 1-Apr. 30, 2013 |
| 8 | May 1-May 31, 2013 |
| 9 | Jun. 1-Jun. 30, 2013 |

Exemplary Calculations of Premium:

Premium may be stated as a dollar rate per acre insured. In an exemplary embodiment, assume that the insured selects two alternative price discovery periods for the March 15 sales closing date: December 1 to December 31 and April 1 to April 30. The insured selected 80% coverage, the RP insurance plan at the first alternative price discovery period, a $0.25 maximum price movement limit, and a liability adjustment factor equal to 60%. The premium rates for these alternative price discovery periods are $2.34 per acre (the premium rates reflect the maximum price movement limit chosen by the insured). The approved yield is 150 bushels per acre and a rate yield of 144 bushels per acre. The acreage report includes 1,000 planted acres that is consistent with the definition of insured acres and reported at a 100% share (premium amounts are illustrative only and are not intended to indicate the relative magnitude of actual premiums determined for the supplemental policy). Finally, assume that there is one insured type and practice.

In this instance, the premium amount may be calculated as follows:

1. $2.34×1,000 acres×1.000 share=$2,340.

Thus, the premium is determined to be $2,340

Alternatively, assume that the insured selected the GRIP/ARP insurance plan, chose 80% of the maximum protection per acre, $0.25 maximum price movement limit, and a liability adjustment factor of 60%. The expected county yield is 140 bushels per acre. Finally, assume that all other parameters are the same as in the previous example.

1. Quoted Rate=$6.83 per acre;
2. $6.83×0.80×0.60=$3.28 per acre; and
3. $3.28 per acre×1,000 acres×1.000 share=$3,280.

Thus, the premium is determined to be $3,280.

Exemplary Calculations of Indemnity:

In an exemplary embodiment, assume the projected prices for the alternative price discovery periods as determined by the insurer are as follows:

December 1-December 31=$5.25 per bushel
February 1-February 28/29=$5.40 per bushel
April 1-April 30=$5.50 per bushel The projected price for the February 1-February 28/29 period may be the determination made under the CEPP, and the insured is entitled to this value with no additional premium. The highest projected price for these three periods is $5.50 per bushel.

Exemplary Calculations of Indemnity for the RP Insurance Plan:

Exemplary Situation 1:

RMA announces the harvest price is $5.60 per bushel. Following the steps shown in the supplemental policy, any indemnity may be determined as follows:

1. $5.60 harvest price is greater than $5.50 highest projected price. No further calculations are necessary. No indemnity is payable under the supplemental policy.

Exemplary Situation 2:

RMA announces the harvest price is $5.25 per bushel. The indemnity payable for the RP insurance plan is $123,000. Following 12 steps defined by the supplemental policy provisions, any indemnity may be determined as follows:

1. Determine if the highest alternative projected price exceeds the projected price or harvest price established by RMA. If it does not, no indemnity is due and no further calculations are necessary.

$5.50 highest projected price is greater than the greater of the projected and harvest price ($5.40) and is less than the maximum price movement limit ($5.65). Thus, an indemnity may be payable.

Situation 2a:

Assume the production to count is 100,000 bushels. The indemnity owed for the supplemental policy may be determined using the as follows:

2. Multiply the approved yield for each type and practice by the coverage level and round the result to the nearest tenth of a bushel or the nearest whole pound, as appropriate 150 bushels×0.80=120.0 bushels;

3. Multiply each result of step 2 by the highest projected price (subject to the maximum price movement limit selected by the insured) and round the result to the nearest whole dollar 120.0 bushels×$5.50 highest projected price=$660;

4. Multiply each result of step 3 by the applicable number of insured acres $660×1,000 acres=$660,000;

5. Sum all results of step 4

Σ=$660,000;

6. Multiply the production to count of each type and practice by the harvest price 100,000 bushels×$5.25=$525,000;

7. Sum the results of step 6

Σ=$525,000;

8. Subtract the result of step 7 from the result of step 5

$660,000−$525,000=$135,000;

9. Multiply the result of step 8 by the insured's share $135,000×1.000 share=$135,000;

10. Determine the amount of any indemnity that would be payable to the insured under the RP insurance plan on the acres insured under the supplemental policy with all acres insured as a single unit and the coverage level the insured chose for the supplemental policy $123,000;

11. Subtract the result of step 10 from the result of step 9

$135,000−$123,000=$12,000; and

12. Multiply the result of step 11 by the liability adjustment factor $12,000×0.60=$7,200.

Thus, the indemnity for the supplemental policy is determined to be $7,200.

Exemplary calculations underlying the effect of limits on the amount of indemnity may be illustrated, as follows:

Total value of crop=150 bu.×1,000 acres×$5.50=$825,000;

Value of production to count=100,000 bu.×$5.50=$550,000;

Value of MPCI indemnity=$123,000;

Value of the supplemental policy indemnity=$7,200

$550,000+$123,000+$7,200=$680,200

The indemnity may not be limited as the total value of the crop exceeds the total value of production to count and all indemnities received.

Situation 2b:

Assuming the production to count is 123,500 bushels. No indemnity is owed for the RP insurance plan because the value of the production to count exceeds the revenue guarantee by $112. The indemnity owed for the supplemental policy may be determined as follows using steps similar to those outlined in situation 2a:

2. 150 bushels×0.80=120.0 bushels;
3. 120.0×$5.50 highest projected price=$660;
4. $660×1,000 acres=$660,000;
5. Σ=$660,000;
6. 123,500 bushels×$5.25=$648,375;
7. Σ=$648,375
8. $660,000−$648,375=$11,625;
9. $11,625×1.000 share=$11,625;
10. $0
11. $11,625−$0=$11,625; and
12. $11,625×0.60=$6,975.

Thus, the indemnity for the supplemental policy is determined to be $6,975. However, if the production to count had exceeded 125,714.28 bushels, no indemnity would have been payable under the supplemental policy despite the fact that the highest alternative price exceeded both the projected and harvest price.

Situation 3:

Assuming the highest alternative projected price from April was $5.80/bu. The RMA projected price was $5.40 and the Harvest price was $5.25. Based on the producer's selected maximum price movement limit of $0.25/bu, the highest projected price is restated as the higher of the RMA projected and harvest prices plus the producer's selected price movement limit.

1. Highest projected price is restated as $5.40+$0.25=$5.65. As the $5.65 (adjusted) highest projected price is greater than the greater of the projected and harvest prices ($5.40), an indemnity may be payable.

Assuming the production to count is 100,000 bushels. The indemnity payable for the RP insurance plan is $123,000. The indemnity owed for the supplemental policy may be determined as follows using steps similar to those outlined in situation 2a:

2. 150 bushels×0.80=120.0 bushels;
3. 120.0 bushels×$5.65 highest projected price=$678;
4. $678×1,000 acres=$678,000;
5. Σ=$678,000
6. 100,000 bushels×$5.25=$525,000;
7. Σ=$525,000
8. $678,000−$525,000=$153,000;
9. $153,000×1.000 share=$153,000;
10. $123,000
11. $153,000−$123,000=$30,000; and
12. $30,000×0.60=$18,000.

Thus, the indemnity for the supplemental policy is determined to be $18,000.

Situation 4:

Assuming the producer planted 1,100 acres, which is greater than the maximum acreage the insurer will insure (1,000) because this number of acres exceeds the maximum insured under any MPCI insurance plan during the most recent four calendar years. In this case, the producer must report 1,000 acres insured under the policy and 100 acres uninsured. The production to count (100,000 bushels) will be allocated pro-rata to the acres insured under PF. This calculation will be 1,000 acres divided by 1,100 acres times 100,000 bushels=90,909 bushels. This value would be substituted in step 6 in the above calculations resulting in a value of production to count equal to $477,272. The actual indemnity paid on 1,100 acres insured under the RP insurance plan would be $170,728 with 90,909 bushels of production to count. Under the terms of the supplemental, this may be reduced to $123,000 for 1,000 insured acres.

The indemnity owed for the supplemental policy may be determined as follows using steps similar to those outlined in situation 2a
1. Highest projected price is restated as $5.40+ $0.25=$5.65. As the $5.65 (adjusted) highest projected price is greater than the greater of the projected and harvest prices ($5.40), an indemnity may be payable.

Assuming that the pro-rated production to count is 90,909 bushels, the indemnity payable for the RP insurance plan on 1,000 insured acres is determined to be $123,000
2. 150 bushels×0.80=120.0 bushels;
3. 120.0 bushels×$5.65 highest projected price=$678;
4. $678×1,000 acres=$678,000;
5. Σ=$678,000
6. 90,909 bushels×$5.25=$477,272;
7. Σ=$477,272
8. $678,000−$477,272=$200,278;
9. $200,278×1.000 share=$200,278;
10. $200,278
11. $200,278−$170,728=$29,550; and
12. $29,550×0.60=$17,730.

Thus, the indemnity for the supplemental policy is determined to be $17,730.

Exemplary Calculations of Indemnity for the GRIP/ARP Insurance Plan:

The projected and harvest prices announced by RMA may apply to both RP and GRIP/ARP. Hence, a highest alternative projected price may be $5.50 for both the GRIP/ARP and the RP insurance plans. Assume the maximum amount of insurance per acre published by RMA is $1,215.00. The producer chose 80% of the maximum amount of insurance and the 90% coverage level. Finally, assume that the policy protection per acre is $972.00 per acre (80% of $1,215.00 per acre maximum amount of insurance).

Situation 1:

RMA announces the harvest price is $5.60 per bushel. Following the steps shown in the supplemental policy, any indemnity may be determined as follows:
1. $5.60 harvest price is greater than $5.50 highest alternative projected price. No further calculations are necessary. No indemnity is payable under the supplemental policy.

Situation 2:

RMA announces the harvest price is $5.25 per bushel. Following the 12 steps from the supplemental policy provisions, any indemnity is determined as follows:
1. Determine if the highest alternative projected price exceeds the projected price or harvest price established by RMA. If it does not, no indemnity is due and no further calculations are necessary.
    $5.50 highest projected price is greater than the $5.25 harvest price and is less than the price cap of $5.65. Thus, an indemnity may be payable.

Situation 2a:

The final county yield is 100 bushels per acre, resulting in county revenue of $525 per acre. The indemnity that would have been paid for the GRIP/ARP insurance plan the insured selected at contract inception is $271,970 (this calculation is based on a supplemental policy Protection Adjustment Factor of 1.0, policy protection of $972.00 per acre, and a trigger revenue of $729 per acre, resulting in a payment calculation factor of 0.2798×$972.00=$271.97 per acre). The indemnity owed for the supplemental policy may be determined as follows:
2. Determine the supplemental policy Protection Adjustment Factor as the greater of 1.00 or the ratio of the highest alternative projected price to the RMA expected price
    The supplemental policy Protection Adjustment Factor is max(1.00, $5.50/$5.40=1.0185)=1.0185;
3. Multiply the policy protection for each type and practice elected by the insured by the result of step 2
    $972.00×1.0185=$989.98 per acre;
4. Determine the trigger revenue for each type and practice as the product of the expected county yield, the highest projected price (subject to the maximum price movement limit selected by the insured), and the coverage level selected by the insured
    150×$5.50×0.90=$742.50 per acre;
5. Subtract the county revenue from the result of step 4 and divide that result by the result of step 4 for each type and practice
    ($742.50−$525.00)/$742.50=0.2929;
6. Multiply the result of step 3 for each type and practice by the result of step 5, the number of insured acres, and by the insured's share
    $989.98×0.2929×1,000 acres×1.000 share=$289,965.14;
7. Sum the results of step 6
    Σ=$289,965.14;
8. Determine the amount of any indemnity that would be payable to the insured for each type and practice under the GRIP/ARP insurance plan with the coverage level and percent of the maximum amount of insurance the insured chose for the supplemental policy
    $271,970.00;
9. Sum the results of step 8
    Σ=$271,970.00
10. Subtract the result of step 9 from the result of step 7
    $289,965.14−$271,970.00=$17,995.14; and
11. Multiply the result of step 10 by the liability adjustment factor
    $17,995.14×0.60=$10,797.08.

Thus, the indemnity for the supplemental policy is determined to be $10,797.08.

Situation 2b:

The final county yield is 140 bushels per acre, resulting in county revenue of $735.00 per acre. This exceeds the GRIP/ARP trigger revenue of $729.00 per acre. No indemnity is owed for the GRIP/ARP insurance plan the insured specified at contract inception. Any indemnity owed for the supplemental policy may be determined as follows:
2. The supplemental policy Protection Adjustment Factor is max(1.00, $5.50/$5.40=1.0185)=1.0185;
3. $972.00×1.0185=$989.98 per acre;

4. 150×$5.50×0.90=$742.50 per acre;
5. ($742.50−$735.00)/$742.50=0.0101;
6. $989.98×0.0101×1,000 acres×1.000 share=$9,998.80;
7. Σ=$9,998.80
8. $0
9. Σ=$0
10. $9,998.80−$0=$9,998.80; and
11. $9,998.80×0.60=$5,999.28.

Thus, the indemnity for the supplemental policy is determined to be $5,999.28.

Exemplary Data Collected by the Agent and Exemplary Actions Taken by the Agent:

The following describes information that may be collected and the actions that may be taken by an agent to initiate the supplemental policy.

1. The following information may be entered into an electronic data manager to initiate an insurance offer/quote for a prospective insured person (e.g., an agent or producer may submit this information to the electronic data manager via a supplemental policy information page as described in more detail herein with regard to at least FIGS. 1-3).
   a. Complete name
   b. Address
   c. State and County
   d. Telephone number
   e. Insured crop
   f. Estimated acres to be planted by type and practice for the crop year
   g. Each production database for the insured crop
   h. The insured's estimate of the anticipated actual yield by unit/type/practice for the current crop year if a production report is not available
   i. The coverage level the insured elects for the supplemental policy
   j. The insurance plan the insured elects for determining the right to an indemnity (RP or GRIP/ARP)
   k. If the insured elects GRIP/ARP, the percentage of the maximum amount of insurance elected
   l. The liability adjustment factor
   m. The alternative price discovery periods the insured has chosen
   n. The maximum price movement limit the insured has chosen
2. Upon receipt of the premium offer for the selected alternative price discovery period(s), prepare the offer sheet, obtain the insured's signature to indicate acceptance, and input the data into the electronic data manager not later than the business day following receipt. Send a copy of the signed document (by fax or electronic means) to the insurer and file the original. An application may be required to have all required fields accurately completed and may be required to include a copy of the quote, including the unique quote identifier to be accepted by the insurer.
3. Obtain the final production and acreage data (or production to count) for all units for the current crop year and input that information into the electronic data manager if that information was not provided initially.
4. If the insured subsequently elects other alternative price discovery periods, enter the request into the electronic data manager based on the unique quote identifier applicable to the existing policy. Upon receipt of the premium offer for the selected alternative price discovery period(s), prepare the offer sheet, obtain the insured's signature to indicate acceptance, and input the data into the electronic data manager not later than the business day following receipt. Send a copy of the signed document (by fax or electronic means) to the insurer and file the original.

Figure 4:
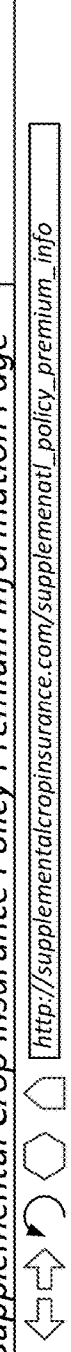
FIG. 4 is an illustration of an exemplary supplemental policy information page including display of a determined premium for a supplemental policy in accordance with one or more embodiments of the present invention.

The following describes information that may be collected and the actions that may be taken by an agent to process an indemnity under the supplemental policy (e.g., for the RP plan). In some embodiments, an agent or producer may submit this indemnity (or loss) information to the electronic data manager system via a supplemental policy indemnity information page as described in more detail herein with regard to at least FIGS. 4-6).

1. Accept the notice of loss and update the electronic data manager.
2. Collect the production reports or the production to count and any MPCI indemnity amount from the insured for all units/types/practices and update the electronic data manager.
3. Obtain a completed IRS Form W-9 from the insured. Update the electronic data manager with the taxpayer identification number. Send a copy of the signed document (by fax or electronic means) to insurer and file the original.

Exemplary Supplemental Crop Insurance Policy Rating:

A supplemental policy may be priced using a multi-variable analysis, e.g., considering a combination of path dependent Asian and look-back option features in conjunction with potential changes in the second correlated variable (i.e. crop yields). The resulting payoff function may be complex and may not be priced using closed form solutions. In some instances, when closed form solutions for pure-risk prices are not available, numerical pricing procedures may be used.

A system for determining characteristics for supplemental insurance policies may include ratemaking processes for use in a revenue-based crop insurance policy, and on both market-derived data and options pricing theory. The yield and revenue crop insurance aspects of supplemental policy pricing may draw particularly upon federal crop insurance procedures and values used under the Revenue Protection (RP) and Group Risk Income Protection-Harvest Revenue Option (GRIP/ARP-HRO) policies. The options pricing theory component may consider the implications of current market values and volatilities implied by options trades for the near-the-money put and call options trading. These two distinct, but related disciplines may then be combined through a simulation process to generate a pure-risk rate estimate, which may then be subjected to loads. Premium rates may be adjusted based on the individual policy's attributes, including, for example, the number of units insured, expected insured acreage, and historical yield data provided. All calculations regarding the NRS's individual rating and underwriting may stand fully independent and apart from the MPCI policy. Futures data (e.g., from future and options markets) can be acquired, as will be understood by those in the art, and this futures data can be used by a rating algorithm. This allows generation of premiums (and indemnities) based on predictions of conditions that may impact crops or other insured items.

A supplemental policy may be priced (e.g., have a premium rate/amount determined therefore) using a combination of the trinomial tree pricing model and Monte Carlo procedures. A standard trinomial tree pricing model may be used to derive the appropriate potential up-down price movement multipliers as well as the risk-adjusted "risk-neutral" price movement probabilities which can be used to generate a large number, N (generally 10,000), of potential price trajectories. Potential payouts along each trajectory may be computed and the premium level may then be computed as the average payout over all N trajectories.

Key Variables:

Supplemental policy premiums may be calculated via a multi-variable analysis, e.g., using the following information: (a) the contract origination day $T_0$, (b) the contract month cmo, (c) the contract expiration day $T_n$, (d) the contract futures price $F_0$ from the most recent trading day prior to date $T_0$, (e) the futures price annualized implied volatility $\sigma_P$ from the most recent five days prior to the contract origination day, (f) the supplemental policy price discovery months (PFmo-j) for j=1, 2, . . . J, (g) RMA's projected and harvest price discovery periods (RPPmo) and (RHPmo), (h) the producers' average or expected yield ($\hat{Y}$), (i) the producers' yield standard deviation $\sigma_Y$, (j) the log price-yield correlation, $\rho_{P,Y}$, and (k) the producers' crop insurance coverage level (CVG).

Price Trajectories:

Price trajectories may be generated using a multi-variable analysis. Letting m=1, the trinomial tree may approximate a series of stochastic price movements by assuming that prices $F_1$ at the end of time period 1 can move from the initial price $F_0$ to 3 possible prices $F_1=$(u $F_0$, m $F_0$, d $F_0$), with "risk neutral" probabilities ($p_u$, $p_m$, $p_d$). The values u, d, $p_u$, $p_d$, and $p_m=1-p_u-p_d$ may be calibrated to approximate potential movements implied by various stochastic processes including, but not limited to, the stochastic process underlying the Black-Scholes stock market model or the Black-76 futures market model. With the Black-76 futures model, the model's parameters are computed as described in Haug2 with a zero carrying cost and no drift.

The numerical values in the following example ($F_0$=6.075 and $\sigma_P$=0.2684) were obtained from the December-2012 corn contract for a simulated supplemental policy quote on Nov. 1, 2011. In this example $T_0$ corresponds to Oct. 31, 2011, $T_1$ to Nov. 1, 2011 and $T_{410}$ corresponds to Dec. 14, 2012, the last day on which the December-2012 corn contract is traded. The "up-down" parameters for the trinomial tree model are computed as provide in equation set (1):

$$u = e^{\sigma_P \sqrt{2\Delta t}}$$

$$d = e^{-\sigma_P \sqrt{2\Delta t}}$$

$$m = 1 \qquad (1)$$

while the "risk-neutral probabilities" of moving u, d, or m are computed as provide in equation set (2):

$$p_u = \left( \frac{1 - e^{-\sigma_P \sqrt{\frac{\Delta t}{2}}}}{e^{\sigma_P \sqrt{\frac{\Delta t}{2}}} - e^{-\sigma_P \sqrt{\frac{\Delta t}{2}}}} \right)^2 \qquad (2)$$

$$p_d = \left( \frac{e^{\sigma_P \sqrt{\frac{\Delta t}{2}}} - 1}{e^{\sigma_P \sqrt{\frac{\Delta t}{2}}} - e^{-\sigma_P \sqrt{\frac{\Delta t}{2}}}} \right)^2$$

$$p_m = 1 - p_u - p_d$$

These "probabilities" may not be actual probabilities in an actuarial sense, but may be "risk adjusted probabilities" that can be used in a "risk-neutral" pricing model. For this example there are 410 days between $T_0$ and the contract closing day $T_{410}$. Although not every day between Nov. 1, 2011 and Dec. 14, 2012 is an actual trading day, the standard assumption and approximate potential price movements can be used as if there were 410 trading days in the period. Assuming daily trading allows specifying $\Delta t$ as $\frac{1}{365}$. The trinomial parameters become those provide in equation sets (3) and (4):

$$u = e^{\sigma_P \sqrt{2\Delta t}} = e^{0.2684 \sqrt{\frac{2}{365}}} \approx 1.020067 \qquad (3)$$

$$d = e^{-\sigma_P \sqrt{2\Delta t}} = e^{-0.2684 \sqrt{\frac{2}{365}}} \approx 0.980328$$

$$m = 1$$

and $$p_u = \left( \frac{1 - e^{-\sigma_P \sqrt{\frac{\Delta t}{2}}}}{e^{\sigma_P \sqrt{\frac{\Delta t}{2}}} - e^{-\sigma_P \sqrt{\frac{\Delta t}{2}}}} \right)^2 = \qquad (4)$$

$$\left( \frac{1 - e^{-0.2684 \sqrt{\frac{1}{2 \cdot 365}}}}{e^{0.2684 \sqrt{\frac{1}{2 \cdot 365}}} - e^{-0.2684 \sqrt{\frac{1}{2 \cdot 365}}}} \right)^2 \approx 0.2475227$$

$$p_d = \left( \frac{e^{\sigma_P \sqrt{\frac{\Delta t}{2}}} - 1}{e^{\sigma_P \sqrt{\frac{\Delta t}{2}}} - e^{-\sigma_P \sqrt{\frac{\Delta t}{2}}}} \right)^2 =$$

$$\left( \frac{e^{0.2684 \sqrt{\frac{1}{2 \cdot 365}}} - 1}{e^{0.2684 \sqrt{\frac{1}{2 \cdot 365}}} - e^{-0.2684 \sqrt{\frac{1}{2 \cdot 365}}}} \right)^2 \approx 0.2524896$$

$$p_m = 1 - p_u - p_d \approx 0.4999877$$

Figure 17:
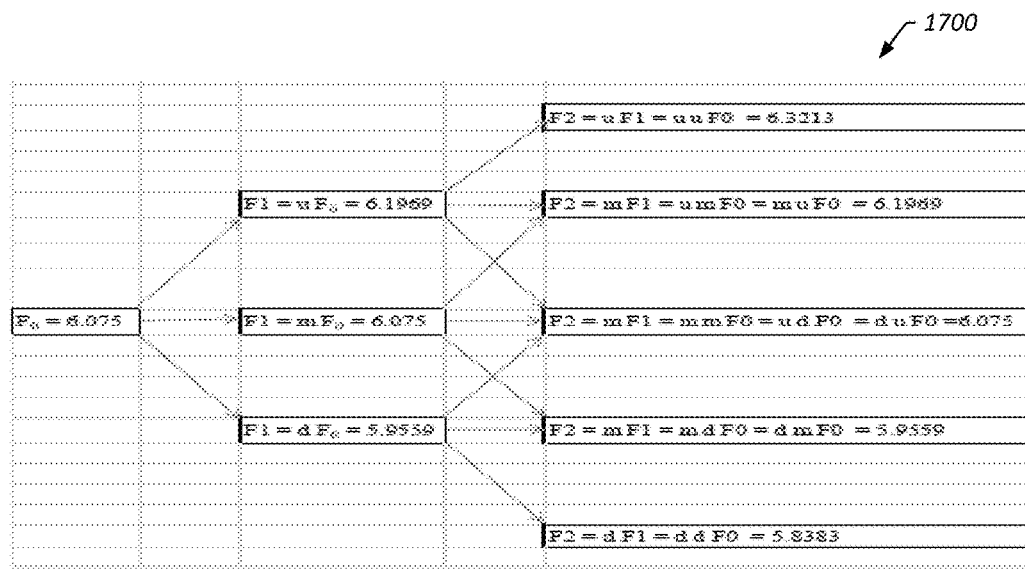
FIG. 17 is an exemplary visualization of the first two stages of a trinomial tree in accordance with one or more embodiments of the present technique.
Figure 18:
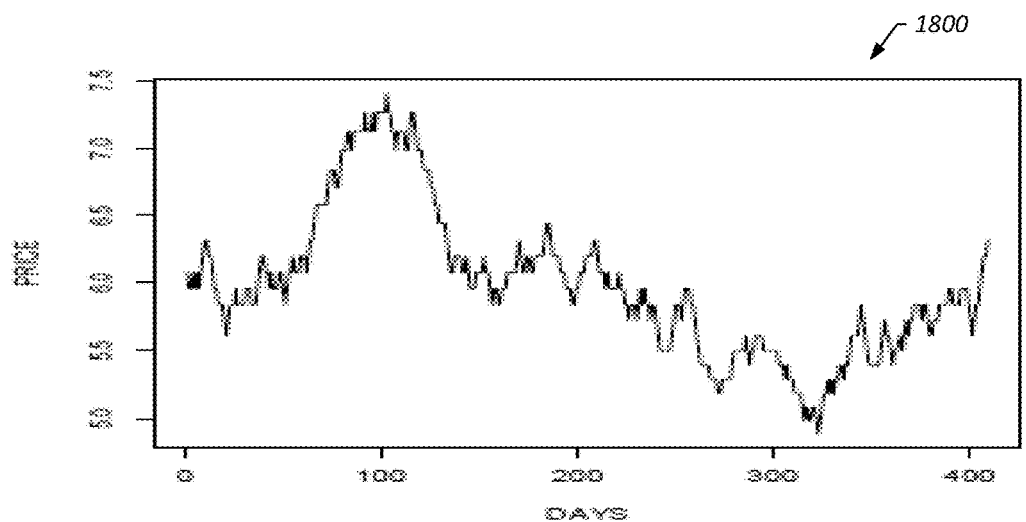
FIG. 18 is a plot of a sample resulting trajectory (Price vs. Days) in accordance with one or more embodiments of the present technique.

FIG. 17 is an exemplary visualization of the first two stages of a trinomial tree 1700 in accordance with one or more embodiments of the present technique. A trinomial tree may not actually be constructed when estimating supplemental policy premiums since supplemental policy payouts may be path dependent rather than merely state dependent. Path dependency may be illustrated using the above figure. The stage 2 node $F_2$=6.075 can be reached along three paths from the original $F_0$=6.075 i.e. $F_2$=6.075=m m $F_0$=u d $F_0$=d u $F_0$. If potential payout depended upon the F1 values passed in arriving at $F_2$=6.075, the option values would be termed "path dependent". Since the number of possible paths grow exponentially with increases in the number of time periods, trees may not be used when pricing path dependent options. However, the values d, u, $p_u$, $p_d$, and $p_m$ can used to efficiently construct a Monte Carlo simulation of a large number of possible price trajectories between times $T_0$ and $T_{410}$. FIG. 18 is a plot 1800 of a sample resulting trajectory (Price vs. Days) in accordance with one or more embodiments of the present technique.

Using vectorized code, a large number (say 10,000 or more) of such potential price trajectories between $T_0$ and $T_{410}$ can be generated. The set of simulated price trajectories may then be applied in pricing the supplemental policy. For example, it may be assumed that a corn producer in DeKalb County, Ill. has a trend adjusted yield of 197.84 bushels per acre and Grower A purchases a supplemental policy contract with price discovery periods of December-2011, April-2012, and July-2012. The RMA price discovery periods for DeKalb County are Feb. 1-28, 2012 and Oct. 1-31, 2012. It may be assumed that Grower A elects 85% coverage. On Nov. 1, 2011 the most recent futures price was $F_0$=$6.075 and $\sigma_P$=0.2684.

Using the procedures described above, 10,000 price trajectories can be simulated. For each of the 10,000 simulated trajectories, the potential December-2011, April-2012, and July-2012 supplemental policy discovery prices may be calculated as well as the RMA Projected Price, RPP, and the Harvest price, RHP.

Figure 19:
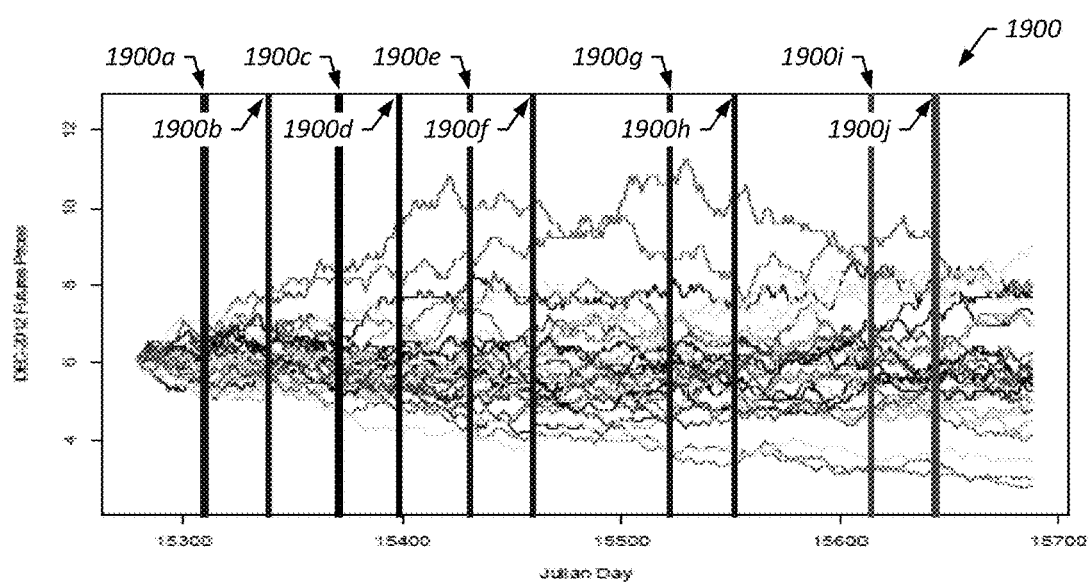
FIG. 19 is a plot of exemplary simulated trajectories in accordance with one or more embodiments of the present technique.

FIG. 19 is a plot 1900 of exemplary simulated trajectories in accordance with one or more embodiments of the present technique. Plot 1900 includes presents a plot of 30 of the 10,000 simulated trajectories between November 2011 and Dec. 14, 2012. The vertical lines 1900a, 1900b, and 1900e-1900h bracket the supplemental policy price discovery periods of December-2011, April-2012, and July-2012. The lines 1900c and 1900d bracket the RMA projected price discovery period February-2012 while the lines 1900i and 1900j bracket the Harvest price discovery period October-2012. For each trajectory i, a monthly supplemental policy price PFP-ji may be calculated as the average of the daily simulated prices between each pair of red brackets. For this example, there may be simulated prices PDP-ji with i=1, . . . 1000 for each of our j=1, 2, 3 supplemental policy discovery periods. For each trajectory i=1, 2, . . . ,10000, the supplemental policy price PFP-i may be computed as the maximum of the 3 monthly averages PFP-ji. Ten thousand potential RMA projected prices RPP-i and potential harvested prices RHP-i may be computed similarly.

Simulating Correlated Yield Realizations:

Simulated correlated yield realizations may be generated using a multi-variable analysis. As a result of the above, there are 10,000 simulated price trajectories and potential supplemental policy and RMA price discovery realizations. To estimate supplemental policy premium rates, 10,000 simulated correlated price-yield realizations can be generated. As neither the price-yield correlation nor the standard deviation of producer yields may be reliably estimated from the producer's reported yield series, both values can be estimated using RMA premium rating data for their revenue and yield insurance products. The log(price)-yield correlation used in calculating RMA's revenue insurance premium rates can be used. For DeKalb County, Ill. the log(price)-yield correlation is approximately $\rho_{P,Y} = -0.399$, for example. The farm's yield standard deviation can be estimated by using the producer's chosen coverage level's (85% in this example) yield insurance premium rate of approximately 0.038. If 0.038 implies a yield standard deviation of 43.5. To generate a yield series Y~N(198,43.5) with COR (Y,log(P))~0.399, the following process that is conditional upon set of 10,000 simulated harvest prices can be used. Let:

$$Y = a + b \log(P) + c\, e \tag{5}$$

with $\mu_Y$, $\sigma_Y^2$, $\mu_{\log(P)}$, $\sigma_{\log(P)}^2$, $\rho_{\log(P),Y}$, $\mu_e = 0$, $\sigma_e^2 = 1$ known and $E(\log(p),e) = 0$, the following can be proven:

$$b = \frac{\rho_{\log(P),Y} \sigma_Y}{\sigma_{\log(P)}} \approx -64.67 \tag{6}$$

$$a = \mu_Y - b\mu_{\log(P)} \approx 314.67$$

$$c = \sqrt{\frac{\sigma_y^2 - b^2 \sigma_{\log(P)}^2}{\sigma_e^2}} \approx 39.89$$

will generate a set of joint log(price)-yield realizations with the desired means, standard deviations, and correlations. When expression (5) is applied to the log of the example's simulated prices, the resulting simulated yields may have a sample mean of about 199 bushels per acre, a standard deviation of 43.2, and a log(price)-yield correlation of −0.40. In the following the simulated yield realizations are denoted as Y-i. At the conclusion of the simulations there may be i=1, 2, . . . ,1000 simulated realizations of potential supplemental policy prices PFP-i, RMA's projected prices RPP-i, RMA's harvest prices RHP-i, and simulated producer yields Y-i.

Supplemental Policy Premium Calculation:

Given the producer's expected yield $\hat{Y}$, selected coverage CVG, and the simulated prices and yields, the pure risk supplemental policy premium rate may be calculated as follows:

10,000 potential RMA RP indemnity triggers are calculated (one for each trajectory) as:

$$RTRIG\text{-}i = CVG \times \max(RPP\text{-}i, RHP\text{-}i) \times \hat{Y} \tag{7}$$

10,000 potential Price-Flex indemnity triggers are calculated (one for each trajectory) as:

$$PFTRIG\text{-}i = CVG \times PFP\text{-}i \times \hat{Y} \tag{8}$$

10,000 potential revenue to count realizations are calculated as:

$$RTC\text{-}i = RHP\text{-}i \times Y\text{-}i \tag{9}$$

10,000 potential RP indemnity realizations are calculated as:

$$RPay\text{-}i = \max(RTRIG\text{-}i - RTC\text{-}i, 0) \tag{10}$$

10,000 preliminary Price-Flex payments are calculated as:

$$PPFPay\text{-}i = \max(PFTRIG\text{-}i - RTC\text{-}i, 0) \tag{11}$$

10,000 Price-Flex payments are calculated as:

$$PFPay\text{-}i = \max((PPFPay\text{-}i) - (Rpay\text{-}i), 0) \tag{12}$$

The pure risk supplemental policy loss cost is then calculated as the mean of the 10,000 simulated supplemental policy payments:

$$PR\text{-}Prem = \frac{1}{10000} \sum_i PFPay\text{-}i \tag{13}$$

Supplemental policy GRIP/ARP loss costs may be computed in a similar manner using county yields, mean yields and RMA-implied standard deviations in lieu of farm level yield parameters while applying standard GRIP/ARP calculations to both the RMA and the supplemental policy simulated payments, reducing the preliminary GRIP/ARP supplemental policy simulated payment by the amount of the simulated RMA GRIP/ARP payments. The GRIP/ARP loss cost may then be computed as the average of the 10,000 simulated GRIP/ARP supplemental policy payments.

Exemplary Embodiments of Interactive Interfaces for Use in Acquiring Supplemental Policy and/or Loss Parameters and Displaying Determined Supplemental Policy Premium and/or Indemnity Values:

FIG. 1 is a flowchart that illustrates a method 100 for presenting a premium for a supplemental policy in accordance with one or more embodiments of the present invention. Method 100 generally includes providing for the display of a supplemental policy information page (block 102), and in response to receiving policy information (e.g., receiving policy parameters submitted via the supplemental policy information page) (block 104), determining a premium for the supplemental policy based at least in part on the received information (block 106) and providing for display of the premium for the supplemental policy (block 108).

In some embodiments, providing for the display of a supplemental policy information page (block 102) includes displaying a graphical user interface that enables a user to enter one or more policy parameters (e.g., a policy parameter set) that may be used to determine a premium for a supplemental insurance policy. For example, providing for the display of a supplemental policy information page may include displaying a web page (or similar application/portal interface) that includes fields for the entry/identification of the following policy parameters: a crop to be insured, an estimate of the number of acres to be planted by type and practice for the crop year, each production database for the insured crop, an estimate of the anticipated actual yield by unit/type/practice for the current crop year (e.g., if a production report is not available), a coverage level elected for the supplemental policy, an insurance plan elected for determining the right to an indemnity (RP or GRIP/ARP) (and if the insured elects GRIP/ARP, the percentage of the maximum amount of insurance elected), a liability adjustment factor, one or more alternative price discovery periods, and/or a maximum price movement limit. In some embodiments, acquisition of the policy parameters is facilitated by a user interface that prompts, or otherwise requests a user to enter the policy parameters. FIG. 2 is an illustration of an exemplary supplemental policy information page 200. Page 200 includes policy parameter fields 202. Fields 202 may include personal information fields 204 (in a first display region) for the entry of information relating to the producer, such as full name, address, city, state, zip code, county, telephone and/or the like. Fields 202 may include crop/policy information fields 206 (in a second display region) for the entry of information relating to crop and requested policy terms, such as a crop to be insured, an estimate of the number of acres to be planted by type and practice for the crop year, each production database for the insured crop, an estimate of the anticipated actual yield by unit/type/practice for the current crop year (e.g., if a production report is not available), a coverage level elected for the supplemental policy, an insurance plan elected for determining the right to an indemnity (RP or GRIP/ARP) (and if the insured elects GRIP/ARP, the percentage of the maximum amount of insurance elected), a liability adjustment factor, one or more alternative price discovery periods, and/or a maximum price movement limit. The interface may include an "ADD" button (control element) displayed adjacent the field for the crop to be insured. The button may be selected in the event the producer is requesting a premium quote that covers more than one crop. Upon selection of the "ADD" button displayed adjacent the field for the crop to be insured, an additional column of crop/policy information fields may be displayed to the right, allowing the agent to enter additional crops to be covered. The interface may also include an "ADD" button (control element) displayed adjacent to the field for alternate price discovery period(s). The button may be selected in the event the producer desires to select additional alternate price discovery periods. Upon selection of the "ADD" button displayed adjacent to the field for alternate price discovery period(s), an additional field may be displayed for selecting an additional alternate price discovery period (e.g., April 1-April 30).

In response to receiving policy information (e.g., receiving policy parameters submitted via the supplemental policy information page), method 100 may proceed to determining a premium for the supplemental policy based at least in part on the received information (blocks 104 and 106). For example, upon the user (e.g., the agent) populating the policy parameter fields 202 and selecting the "SUBMIT" button (control element), the policy parameters may be submitted for use in determining a premium for the requested supplemental policy. In some embodiments, determining a premium for the supplemental policy based at least in part on the received information includes determining a premium using the techniques described herein. For example, the premium may be determined to be $2,340 as described above using parameters that are the same or similar to the policy parameters submitted via page 200.

FIGS. 2A-2I are illustrations of exemplary supplemental policy information pages in accordance with one or more embodiments of the present invention.

Figure 2A:
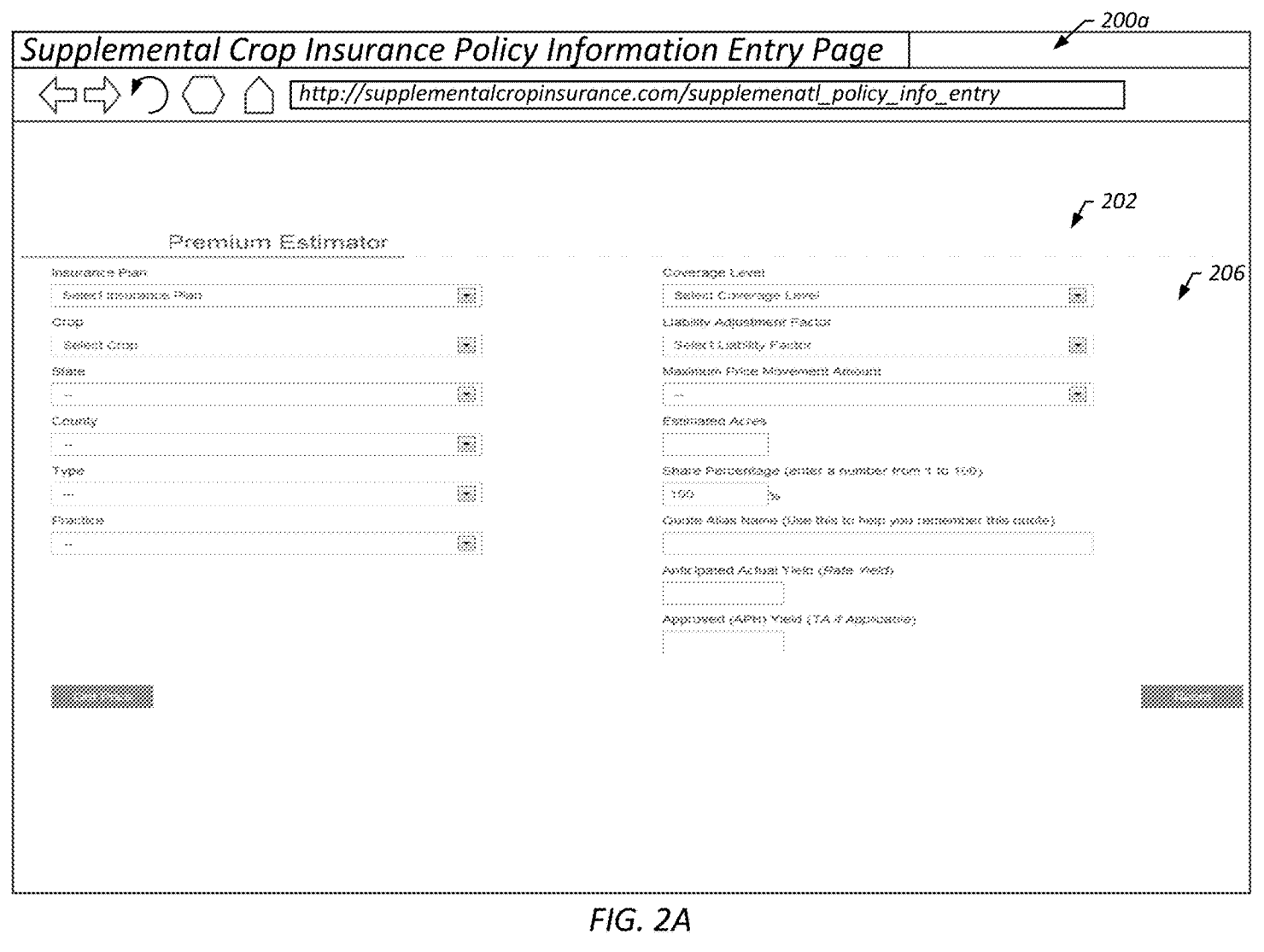

FIG. 2A depicts a screenshot of a policy information page 200a initially displayed to a user for the submission of policy (e.g., quote) information.

Figure 2B:
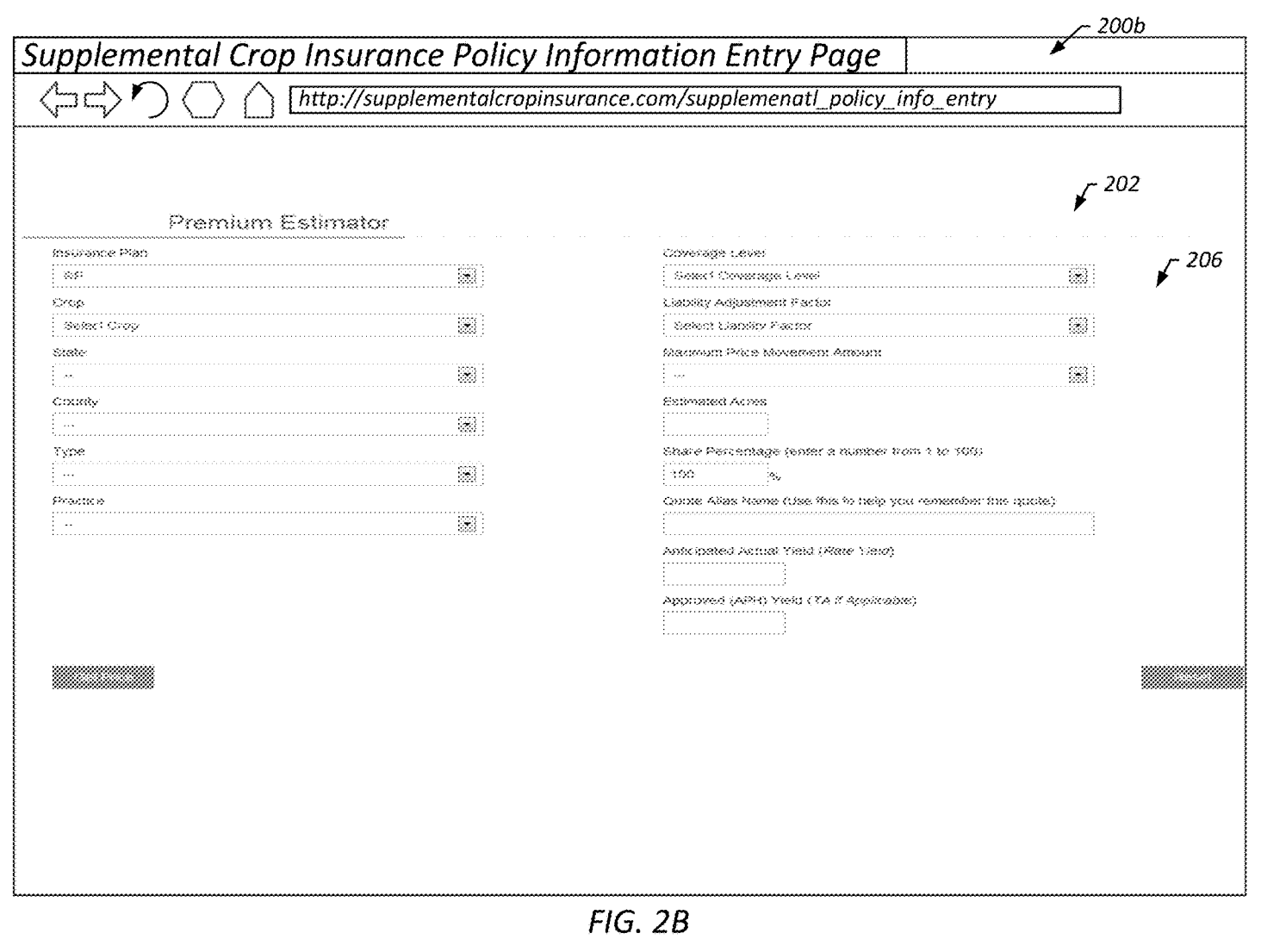

FIG. 2B depicts a screenshot of a policy information page 200b displayed to a user in response to user selection of the RP insurance plan.

Figure 2C:
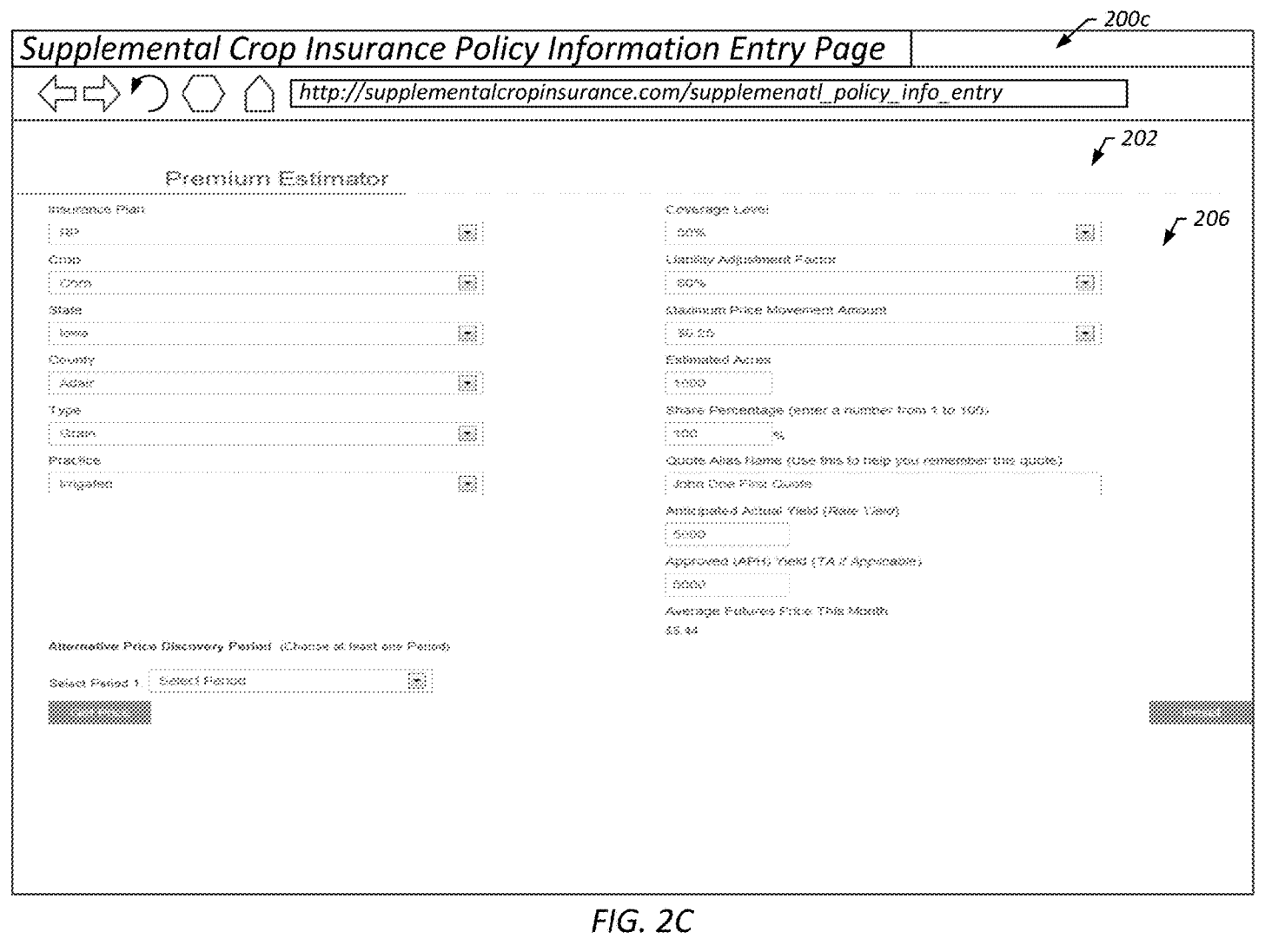

FIG. 2C depicts a screenshot of a policy information page 200c displayed to a user that includes user provided policy (e.g., quote) information for an RP plan prior to selection of alternative price discovery period(s).

Figure 2D:
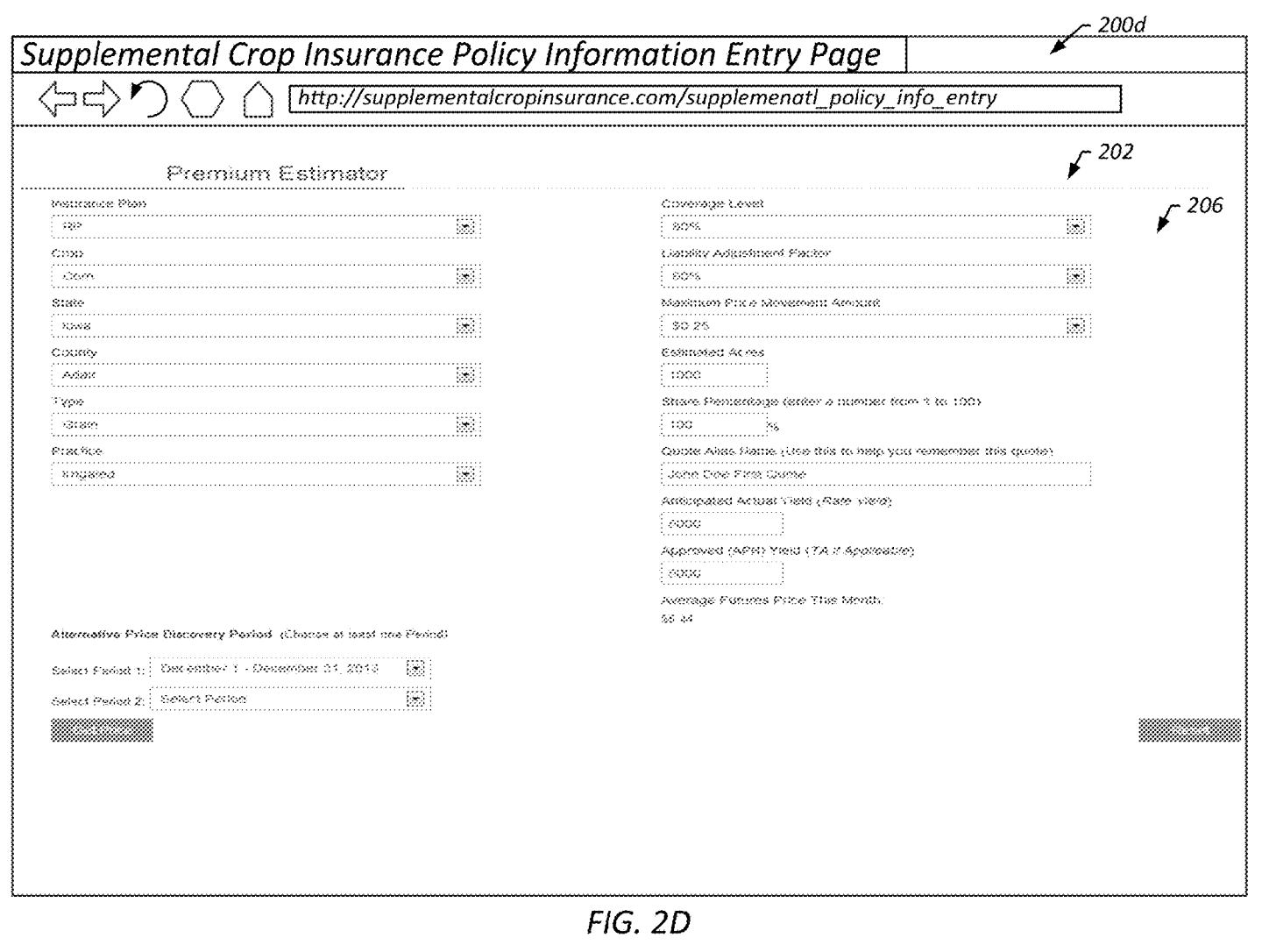

FIG. 2D depicts a screenshot of a policy information page 200d displayed to a user that includes user provided policy (e.g., quote) information for an RP plan after selection of an alternative price discovery period, and including a dynamically generated option to enter an additional alternative price discovery period.

Figure 2E:
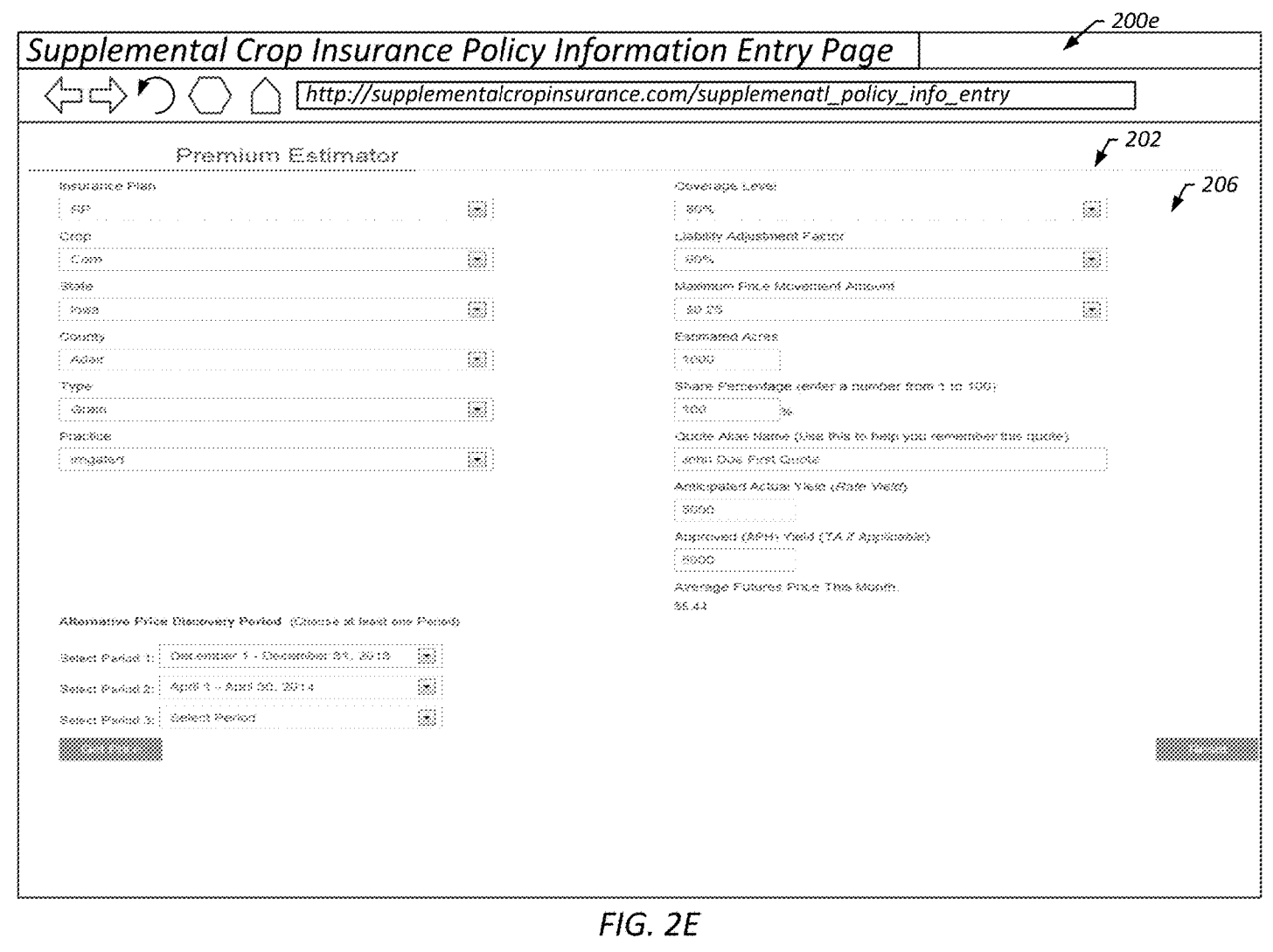

FIG. 2E depicts a screenshot of a completed policy information page 200e for an RP plan that is displayed to a user after selection of two alternative price discovery periods.

Figure 2F:
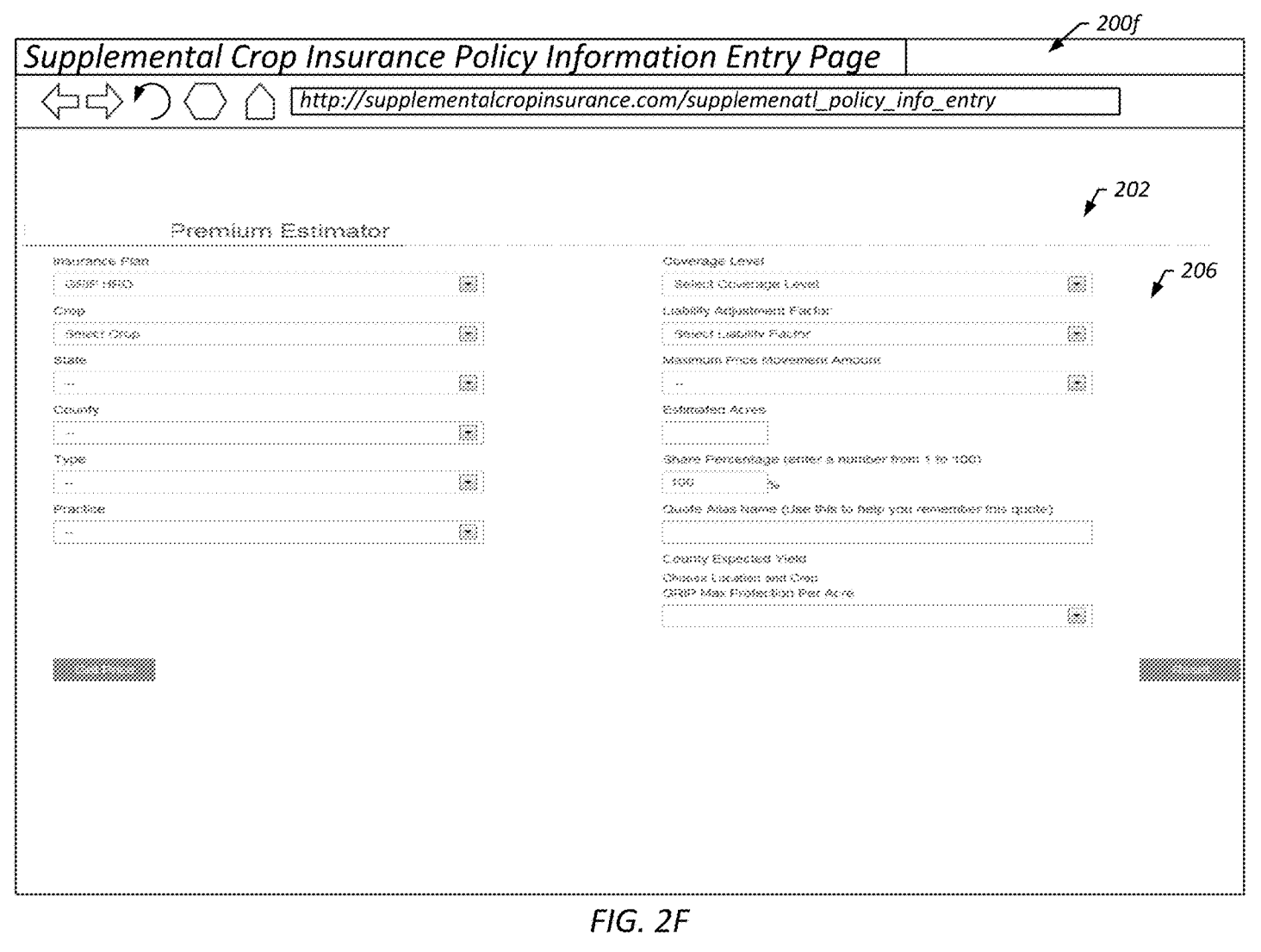

FIG. 2F depicts a screenshot of a policy information page 200f displayed to a user in response to user selection of the GRIP/ARP insurance plan.

Figure 2G:
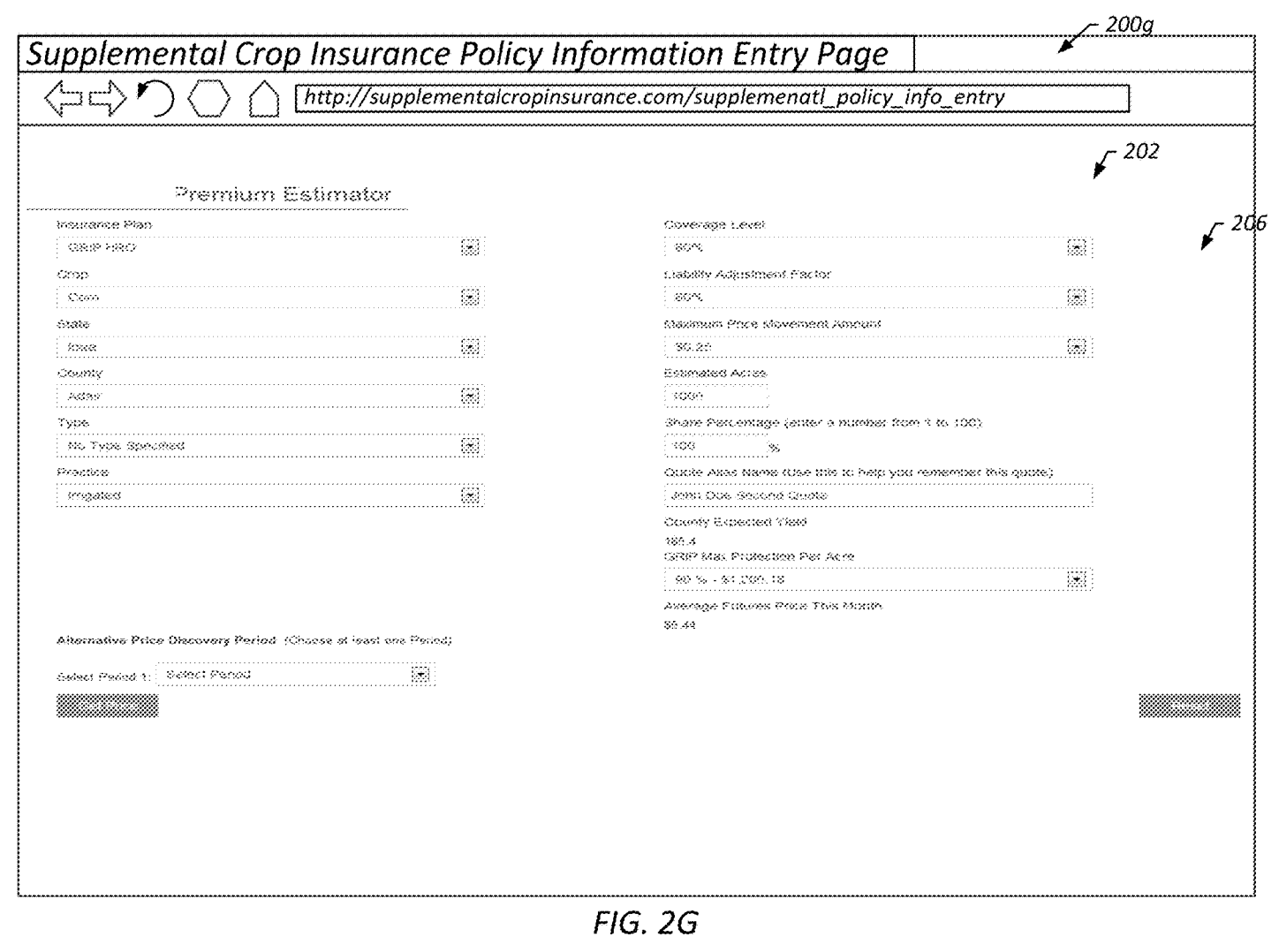

FIG. 2G depicts a screenshot of a policy information page 200g displayed to a user that includes user provided policy (e.g., quote) information for a GRIP/ARP plan prior to selection of alternative price discovery period(s).

FIG. 2H depicts a screenshot of a policy information page 200f displayed to a user that includes user provided policy (e.g., quote) information for a GRIP/ARP plan after selection of an alternative price discovery period, and including a dynamically generated option to enter an additional alternative price discovery period.

FIG. 2I depicts a screenshot of a completed policy information page 200i for a GRIP/ARP plan that is displayed to a user after selection of two alternative price discovery periods.

Figure 2J:
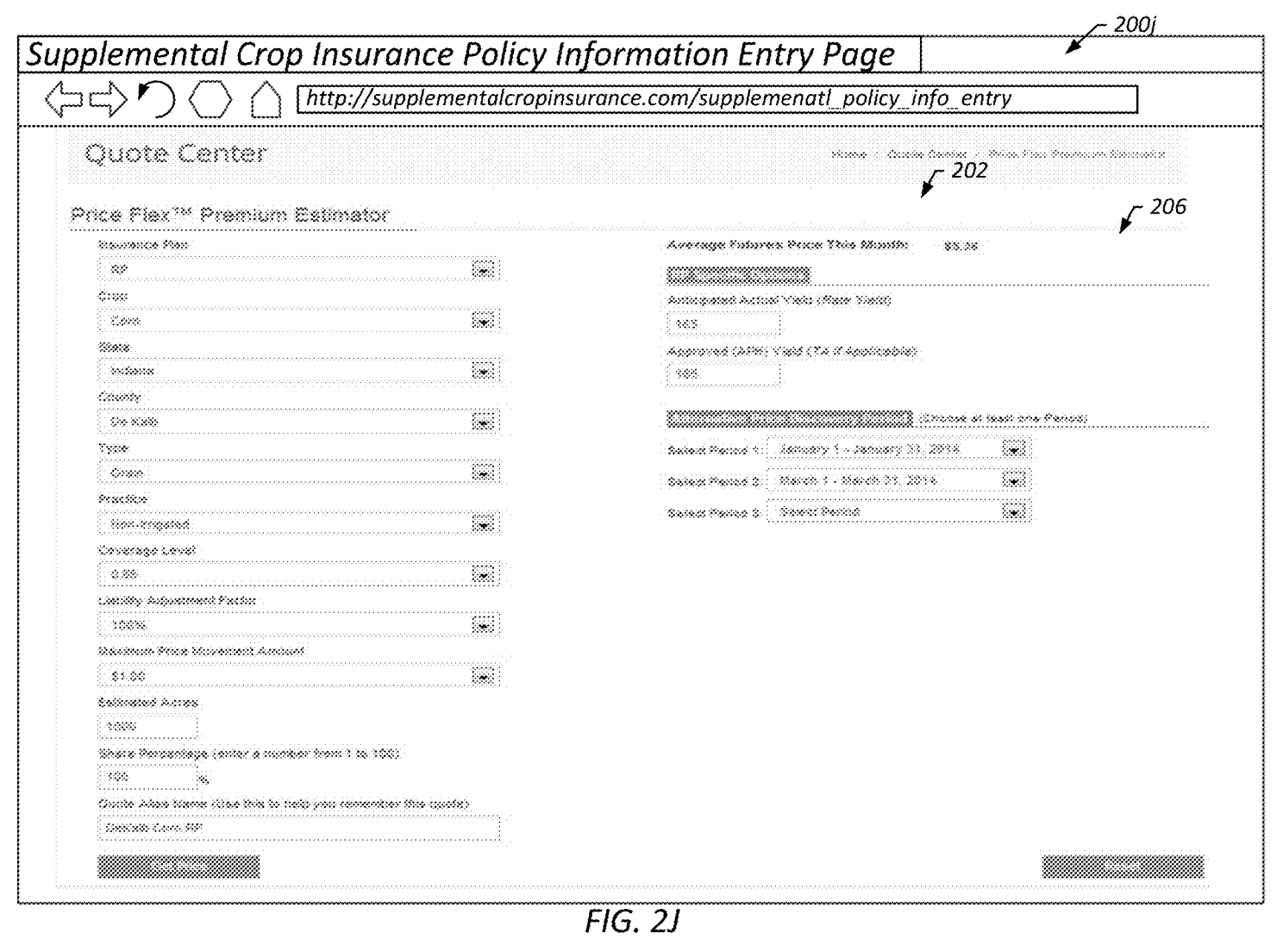

FIG. 2J depicts a screenshot of a completed policy information page 200j for a RP plan that is displayed to a user after selection of two alternative price discovery periods.

Figure 3A:
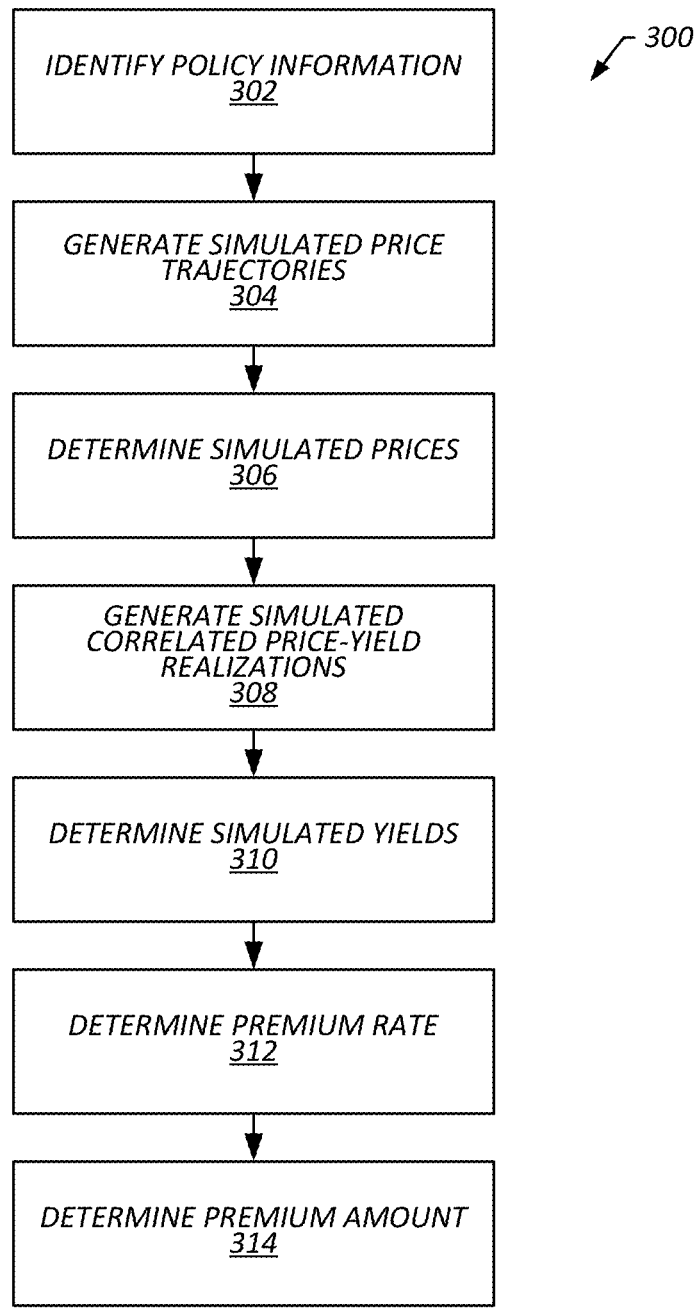
FIG. 3A is a flowchart that illustrates a method for determining a premium for a supplemental policy in accordance with one or more embodiments of the present technique.

In some embodiments, determining a premium for a supplemental policy includes employing financial engineering techniques to determine a premium based on the submitted policy parameters. FIG. 3A is a flowchart that illustrates a method 300 for determining a premium for a supplemental policy in accordance with one or more embodiments of the present technique. Method 300 generally includes identifying policy information (block 302), generating simulated price trajectories (block 304), determining simulated prices (block 306), generating simulated correlated price-yield realizations (block 308), determining simulated yields (block 310), determining a premium rate (block 312), and determining a premium amount (block 314).

In some embodiments, identifying policy information (block 302) includes identifying policy information for a supplemental crop insurance policy. The policy information can include, for example, a crop type, an expected yield, a selected coverage level, one or more discovery periods, a number of acres to be insured, a reported share, and/or the like. The policy information may be received via an interactive user interface, such as the policy information pages described herein with regard to FIGS. 2-2J. In some embodiments, the policy information includes the following: (a) the contract origination day $T_0$, (b) the contract month cmo, (c) the contract expiration day $T_n$, (d) the contract futures price $F_0$ from the most recent trading day prior to date $T_0$, (e) the futures price annualized implied volatility $\sigma_P$ from the most recent five days prior to the contract origination day, (f) the supplemental policy price discovery months (PFmo-j) for j=1, 2, . . . J, (g) RMA's projected and harvest price discovery periods (RPPmo) and (RHPmo), (h) the producers' average or expected yield ($\hat{Y}$), (i) the producers' yield standard deviation $\sigma_Y$, (j) the logprice-yield correlation, $\rho_{P,Y}$, and (k) the producers' crop insurance coverage level (CVG).

Simulated price trajectories can be generated as described herein with regard to "Price Trajectories." For example, price trajectories may be generated using a multi-variable analysis. In some embodiments, generating simulated price trajectories (block 304) includes generating simulated potential price trajectories for the crop type over a given time period that includes the one or more discovery periods (e.g., the one or more discovery periods selected). Generating simulated potential price trajectories may include generating each of the simulated potential price trajectories using trinomial modeling over the given time period. Generating a simulated potential price trajectory using trinomial modeling over a given time period may include, for example, generating a simulated potential price trajectory based on up-down price movement multipliers and up-down price movement probabilities. In some embodiments, generating simulated potential price trajectories for the crop type over a given time period including the one or more discovery periods includes generating about ten-thousand or more simulated potential price trajectories for the crop type over a given time period including the one or more discovery periods.

Simulated prices can be determined using simulated price trajectories as described herein with regard to "Price Trajectories." In some embodiments, determining simulated prices (block 306) includes determining simulated prices based at least in part on the simulated potential price trajectories. In an embodiment in which the one or more discovery periods include a subset of the given time period, the simulated prices may correspond to the simulated potential price trajectories over the subset of the given time period.

Simulated correlated price-yield realizations can be generated as described herein with regard to "Simulating Correlated Yield Realizations." For example, simulated correlated yield realizations may be generated using a multi-variable analysis. In some embodiments, generating simulated correlated price-yield realizations (block 308) includes generating simulated correlated price-yield realizations for the crop type over the given time period. In some embodiments, generating simulated correlated price-yield realizations for the crop type over the given time period includes generating ten-thousand or more simulated correlated price-yield realizations for the crop type over the given time period.

Simulated yields can be determined using correlated price-yield realizations as described herein with regard to "Simulating Correlated Yield Realizations." In some embodiments, determining simulated yields (block 310) includes determining simulated yields based at least in part on the simulated correlated price-yield realizations. In an embodiment in which the one or more discovery periods include a subset of the given time period, the simulated yields may correspond to the simulated correlated price-yield realizations over the subset of the given time period.

Premium rates can be determined as described herein with regard to "Supplemental Policy Premium Calculation." In some embodiments, determining a premium rate (block 312) includes determining a premium rate as a function of the expected yield, the selected coverage level, the simulated prices and the simulated yields. In some embodiments, determining a premium rate as a function of the expected yield, the selected coverage level, the simulated prices and the simulated yields includes the following: determining simulated potential prices, simulated projected prices, and simulated harvest prices based at least in part on the simulated potential price trajectories; determining simulated producer yields based at least in part on the simulated correlated price-yield realizations; and determining a premium rate as a function of the simulated potential prices, the simulated projected prices, the simulated harvest prices, the simulated producer yields, the expected yield, and the selected coverage level. In some embodiments, determining a premium rate as a function of the potential price, the projected price, the harvest price and the simulated producer yield includes the following: determining simulated primary insurance indemnity triggers as a function of the selected coverage level, the simulated projected prices, the simulated harvest prices and the expected yield; determining simulated supplemental insurance indemnity triggers as a function of the selected coverage level, the simulated potential prices and the expected yield; determining simulated potential revenues as a function of the simulated harvest prices and the simulated producer yields; determining simulated potential indemnities as a function of the simulated primary insurance indemnity triggers and the simulated potential revenues; determining simulated preliminary indemnities as a function of the simulated supplemental insurance indemnity triggers and the simulated potential revenues; determining payments as a function of the simulated preliminary indemnities and the simulated potential indemnities; and determining the premium rate as an average of the payments.

In some embodiments, the premium rate is provided for use in determining a premium amount for the supplemental crop insurance policy. For example, a determined premium rate may be provided as an input to an automated calculation (or other process) for determining a premium amount. In some embodiments, the premium rate may be displayed or otherwise provided to a user, and the user may use the provided premium rate to determine a premium amount for the supplemental policy.

In some embodiments, determining a premium amount (block 314) includes determining a premium amount based on the premium rate. For example, the premium amount may be determined as a product of the premium rate, the number of acres to be insured and the reported share. In some embodiments, the premium amount is displayed or otherwise provided to a user. For example, the premium amount may be displayed as described herein with regard to FIGS. 4-4B.

As described herein with regard to "Supplemental Policy Premium Calculation," such techniques can be used for calculating premium rates and premium amounts for RP and GRIP/ARP insurance plans.

Figure 3B:
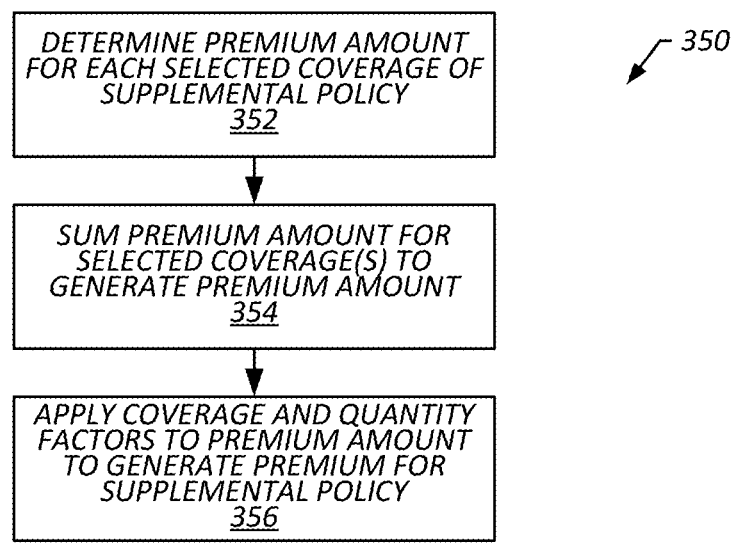
FIG. 3B is a flowchart that illustrates a method for determining a premium for a supplemental policy in accordance with one or more embodiments of the present technique.

FIG. 3B is a flowchart that illustrates a method 350 for determining a premium amount for a supplemental policy in accordance with one or more embodiments of the present technique. Method 350 generally includes determining a premium amount for each selected coverage of a supplemental policy (block 352), summing the premium amounts for the selected coverage(s) to generate a premium amount (block 354), and applying a coverage factor and/or quantity factor to the premium amount to generate a premium for the supplemental policy (block 356).

In some embodiments, determining a premium amount for each selected coverage of a supplemental policy (block 352) includes determining a premium amount for each selected coverage of a supplemental policy using the exemplary supplemental crop insurance policy rating techniques described herein. For example, a per acre premium for a selected coverage level of a supplemental policy may be determined using the following information: (a) the contract origination day $T_0$, (b) the contract month cmo, (c) the contract expiration day $T_n$, (d) the contract futures price $F_0$ from the most recent trading day prior to date $T_0$, (e) the futures price annualized implied volatility $\sigma_P$ from the most recent five days prior to the contract origination day, (f) the supplemental policy price discovery months (PFmo-j) for j=1, 2, . . . J, (g) RMA's projected and harvest price discovery periods (RPPmo) and (RHPmo), (h) the producers' average or expected yield ($\hat{Y}$), (i) the producers' yield standard deviation $\sigma_Y$, (j) the logprice-yield correlation, $\rho_{P,Y}$, and (k) the producers' crop insurance coverage level (CVG). Although certain exemplary ratemaking techniques are described for the purpose of illustration, embodiments may include any suitable rate making techniques for use in determining a premium amount for a coverage level of a supplemental policy. Futures data (e.g., from future and options markets) can be acquired, as will be understood by those in the art, and this futures data can be used by a rating algorithm. This allows generation of premiums (and indemnities) based on predictions of conditions that may impact crops or other insured items.

In some embodiments, summing the premium amounts for the selected coverage(s) to generate a premium amount (block 354) includes summing the premium amount per acre for a coverage level for all alternative price discovery periods elected by the insured. For example, where the insured selects two alternative price discovery periods for the March 15th sales closing date, e.g., December 1 to December 31 and April 1 to April 30, having premium rates of $2.00 and $1.90 per acre, respectively, the premium amount may be determined to be $3.90 per acre (e.g., $2.00 per acre+$1.90 per acre).

In some embodiments, applying a coverage factor and/or quantity factor to the premium amount to generate a premium for the supplemental policy (block 356) includes applying a liability adjustment factor, a percentage protection per acre, a number of insured acres and/or a share. If, for example, the insured selects the RP plan having a premium amount per acre of $3.90, a liability adjustment factor of 60%, 1000 acres and a share of 100%, the premium may be determined to be $2,340 (e.g., $3.90 per acre*0.60*1000 acres*1.0=$2,340). If, for example, the insured selects the GRIP/ARP plan having a premium amount per acre of $6.83, an 80% protection per acre, a liability adjustment factor of 60%, 1000 acres and a share of 100%, the premium may be determined to be $3,280 (e.g., $6.83 per acre*0.80*0.60*1000 acres*1.0=$3,280).

In some embodiments, the determined premium may be provided for display to the user (block 108). For example, the premium may be displayed to the user (e.g., the agent) via a supplemental policy information page 400 of FIG. 4. Page 400 includes display of a premium amount 402 that corresponds to the submitted policy parameters 202. Page 400 may allow the user (e.g., the agent) to print the information as a quote (or an offer for contract) including the policy terms (e.g., including the policy parameters and premium amount) listed on page 400. The agent and the producer may be able to sign/execute the contract. Thus, where the premium determination is done in a matter of minutes or seconds, the agent may be able to provide a premium quote and execute a contract while the agent is "at the kitchen table" with the producer. In some embodiments, page 400 may include display of a premium rate 403. For example, a premium rate may be displayed in place of or along with premium amount 402.

Figure 4A:
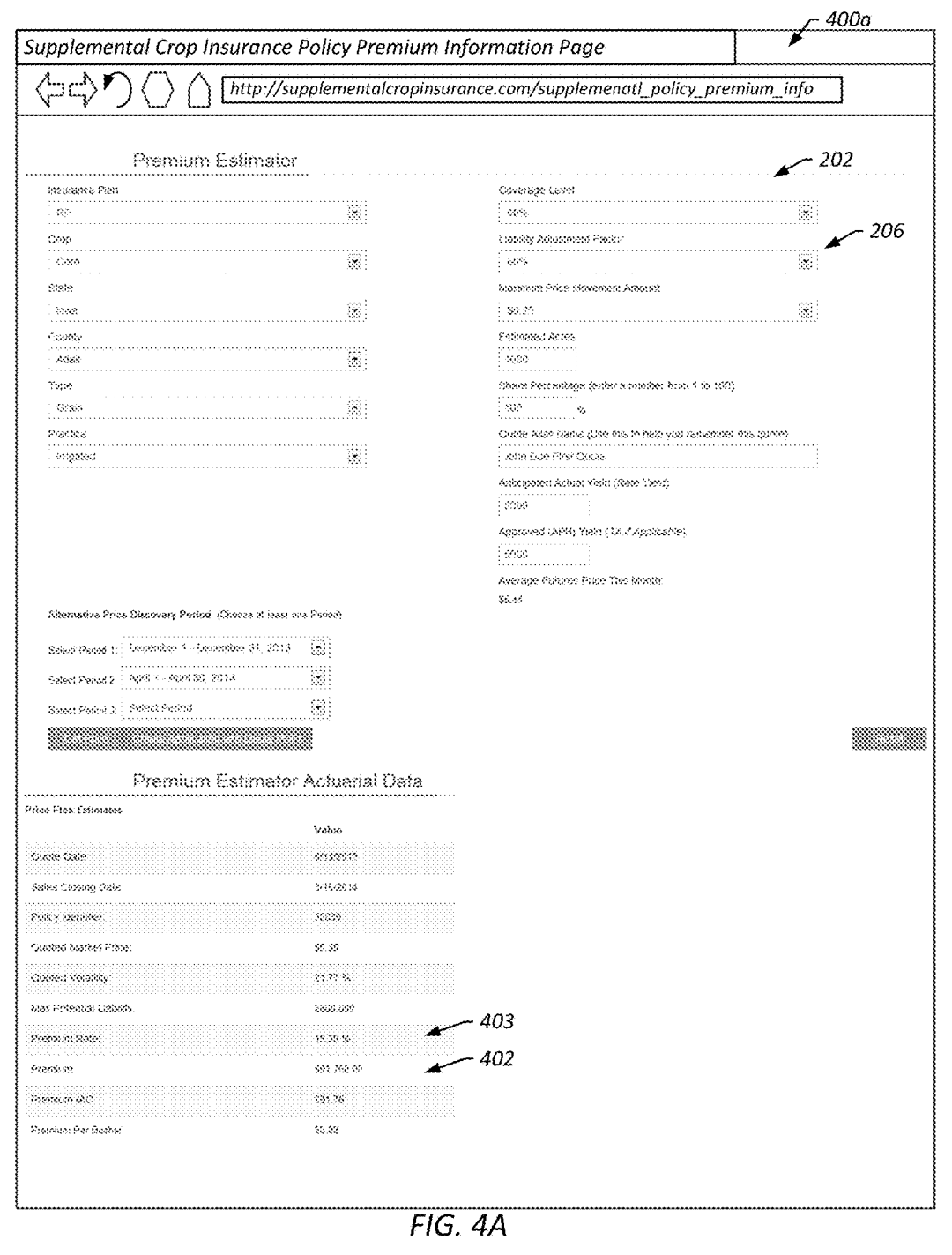
Figure 4B:
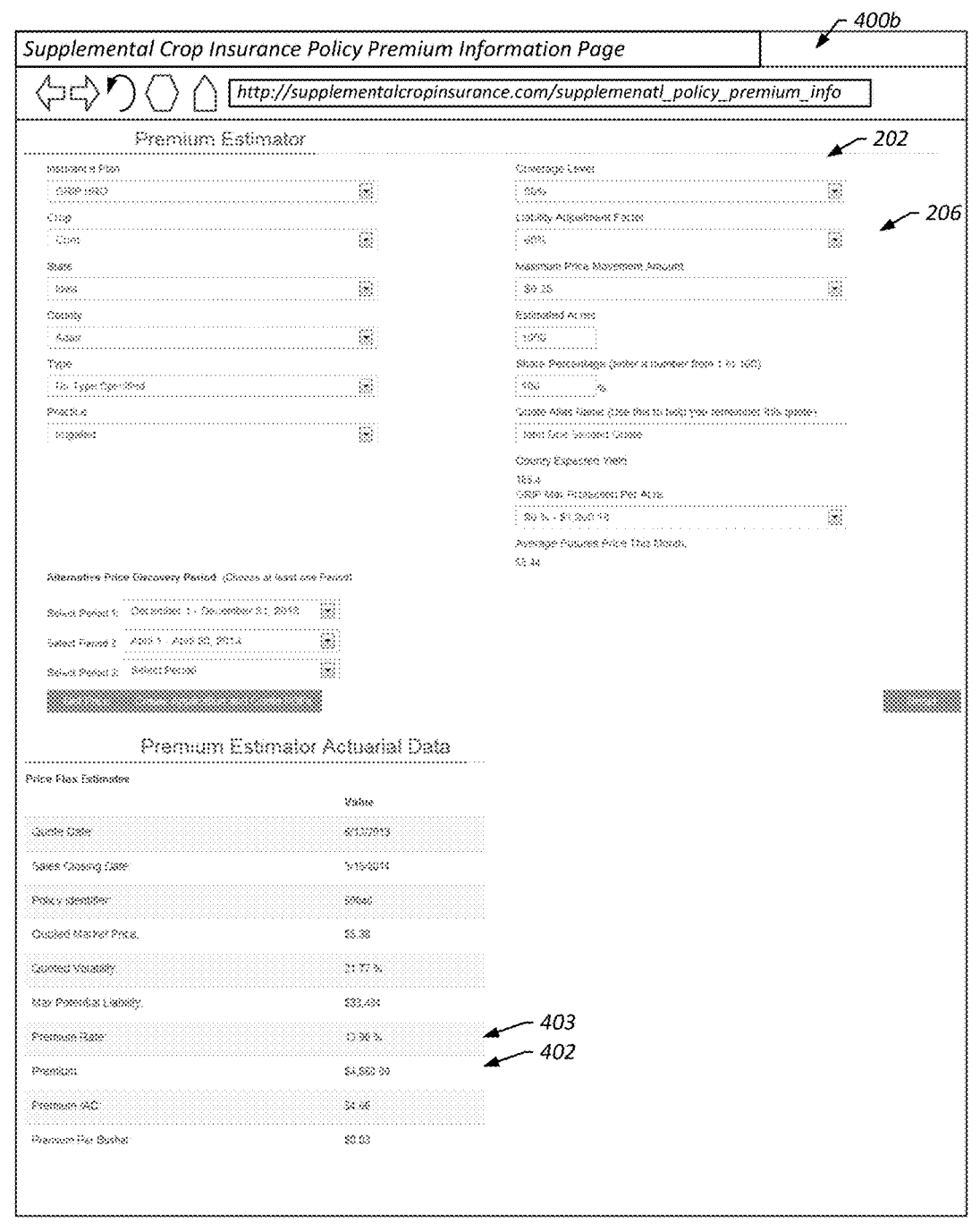

FIGS. 4A and 4B are illustrations of an exemplary supplemental policy information pages including display of a determined premium in accordance with one or more embodiments of the present invention. FIG. 4A depicts a screenshot of a policy quote page 400a for an RP plan after user submission of the quote information via selection of the "Get Price" button (control element). FIG. 4B depicts a screenshot of a policy quote page 400b for a GRIP/ARP plan after user submission of the quote information via selection of the "Get Price" button (control element).

Figure 5:
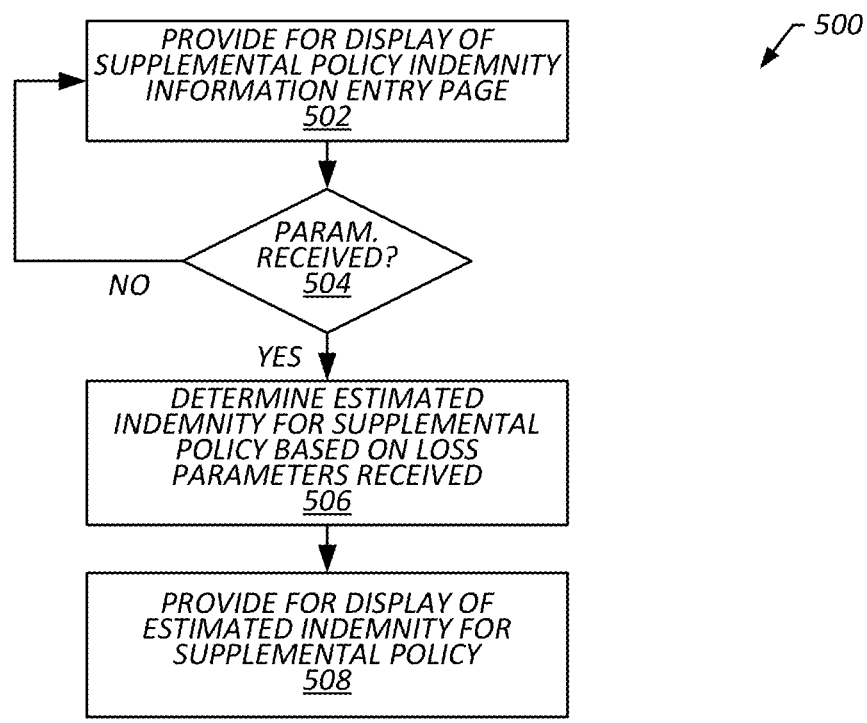
FIG. 5 is a flowchart that illustrates a method for presenting an estimated indemnity for a supplemental policy in accordance with one or more embodiments of the present invention.

FIG. 5 is a flowchart that illustrates a method 500 for providing an estimated indemnity for a supplemental policy in accordance with one or more embodiments of the present invention. Method 500 generally includes providing for the display of a supplemental policy indemnity information page (block 502), and in response to receiving loss information (e.g., receiving loss parameters submitted via the supplemental policy indemnity information page) (block 504), determining an estimated loss for the supplemental policy based at least in part on the received information (block 506) and providing for display of the estimated indemnity for the supplemental policy (block 508).

In some embodiments, providing for the display of a supplemental policy indemnity information page (block 502) includes displaying a graphical user interface that enables a user to enter one or more loss parameters (e.g., a loss parameter set) that may be used to determine an estimated indemnity for a supplemental insurance policy. For example, providing for the display of a supplemental policy indemnity information page may include displaying a web page (or similar application/portal interface) that includes fields for the entry/identification of the following loss parameters: a date of loss, indemnity payable for RP or GRIP/ARP (depending on the insurance plan elected in the supplemental policy terms), production to count, harvest price, highest projected price, and/or projected price. In some embodiments, acquisition of the loss parameters is facilitated by a user interface that prompts, or otherwise requests a user to enter the loss parameters. FIG. 6 is an illustration of an exemplary supplemental policy indemnity information page 600. Page 600 may be accessed by an agent logging into a data management site for the insurer and entering a policy number (e.g., 123456789-A). Page 600 includes loss parameter fields 602 for the entry of information relating to the claimed loss by the insured. The fields may include a date of loss, indemnity payable for RP or GRIP/ARP (depending on the insurance plan elected in the supplemental policy terms), production to count, harvest price, highest projected price, and/or projected price.

In response to receiving loss information (e.g., receiving loss parameters submitted via the supplemental policy indemnity information page), method 500 may proceed to determining an estimated indemnity for the supplemental policy based at least in part on the received information (blocks 504 and 506). For example, upon the user (e.g., the agent) populating the loss parameter fields 602 and selecting the "SUBMIT" button (control element), loss parameters may be submitted for use in determining an estimated indemnity for the supplemental policy. In some embodiments, determining an estimated indemnity for the supplemental policy based at least in part on the received information includes determining an estimated indemnity for the supplemental policy using the techniques described herein. For example, the estimated indemnity may be determined to be $7,200 as described above using parameters that are the same or similar to the loss parameters submitted via page 600.

Figure 7A:
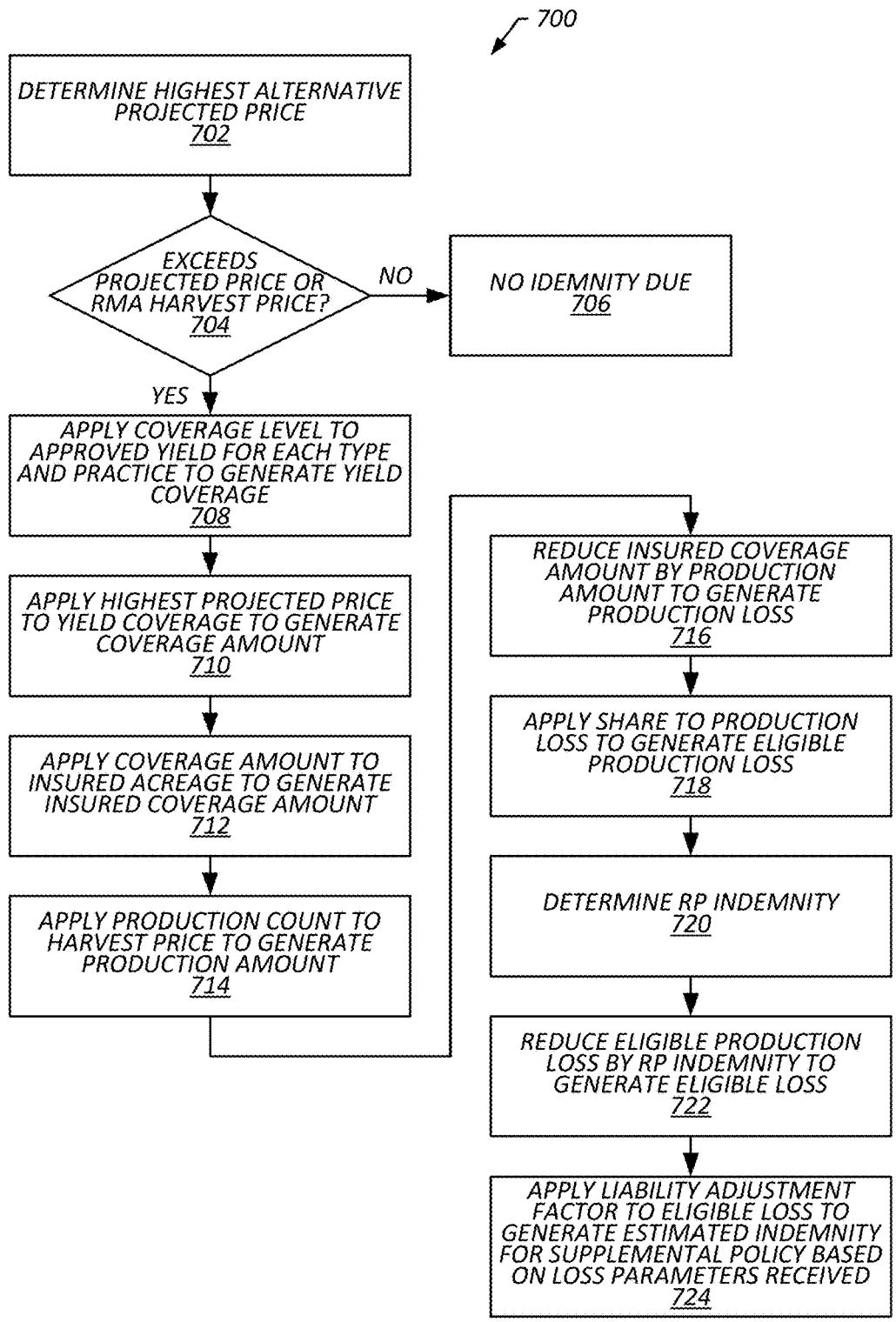
FIG. 7A is a flowchart that illustrates a method for determining an estimated indemnity owed under a supplemental policy for an RP insurance plan in accordance with one or more embodiments of the present technique.

FIG. 7A is a flowchart that illustrates a method 700 for determining an estimated indemnity owed under a supplemental policy for an RP insurance plan in accordance with one or more embodiments of the present technique. Method 700 may generally include determining a highest alternative projected price (block 702), determining whether the highest alternative projected price exceeds a projected price or a Harvest price (block 704), and, if the highest alternative projected price does not exceed the projected price or the Harvest price, determining that no indemnity is due (block 706). Method 700 may include, if the highest alternative projected price does exceed the projected price or the Harvest price, applying a coverage level to an approved yield for each type and practice to generate a yield coverage (block 708), applying a highest projected price to the yield coverage to generate a coverage amount (block 710), applying the coverage amount to insured acreage to generate an insured coverage amount (block 712), applying a production count to a harvest price to generate a production amount (block 714), reducing the insured coverage amount by the production amount to generate a production loss (block 716), applying a share to the production loss to generate an eligible production loss (block 718), determining a RP indemnity (block 720), reducing the eligible production loss by the RP indemnity to generate an eligible loss (block 722), and applying a liability adjustment factor to the eligible loss to generate the estimated indemnity for the supplemental policy (block 724).

In some embodiments, determining a highest alternative projected price (block 702) includes identifying the highest price projected for one or more alternative price discover periods. For example, the highest alternative projected price may be determined to be $5.50 as discussed above.

In some embodiments, determining whether the highest alternative projected price exceeds a projected price or a harvest price (block 702) includes comparing the highest alternative price to the projected price and the harvest price. For example, the highest alternative projected price of $5.50 may be determined to exceed a projected price or a harvest price when $5.25 is the greater of the projected and harvest prices.

In some embodiments, applying a coverage level to an approved yield for each type and practice to generate a yield coverage (block 708) includes multiplying the approved yield (e.g., 150 bushels) for each type and practice by the coverage level (e.g., 0.80) and rounding the result to the nearest tenth of a bushel or the nearest whole pound, as appropriate (e.g., 150 bushels×0.80=120.0 bushels). Thus, for example, a yield coverage may be determined to be 120.0 bushels.

In some embodiments, applying a highest projected price to the yield coverage to generate a coverage amount (block 710) includes multiplying the yield coverage for each type and practice by the highest projected price (subject to the maximum price movement limit selected by the insured) and rounding the result to the nearest whole dollar (e.g., 120.0 bushels×$5.50 highest projected price=$660). Thus, for example, a coverage amount for a type and practice may be determined to be $600.

In some embodiments, applying the coverage amount to insured acreage to generate an insured coverage amount (block 712) includes multiplying the coverage amount for each type and practice by the applicable number of insured acres (e.g., $660×1,000 acres=$660,000). The insured coverage amount may be a sum of the individual coverage amounts for all of the types and practices. Thus, for example, an insured coverage amount may be determined to be $660,000.

In some embodiments, applying a production count to a harvest price to generate a production amount (block 714) includes multiply the production to count (e.g., 100,000 bushels) of each type and practice by the harvest price (e.g., 100,000 bushels×$5.25=$525,000). The insured production amount may be a sum of the individual production amounts for all of the types and practices. Thus, for example, a production amount may be determined to be $525,000.

In some embodiments, reducing the insured coverage amount by the production amount to generate a production loss (block 716) includes subtracting the production amount from the insured coverage amount (e.g., $660,000−$525,000=$135,000). Thus, for example, a production loss may be determined to be $135,000.

In some embodiments, applying a share to the production loss to generate an eligible production loss (block 718) includes multiplying the production loss by the insured's share (e.g., $135,000×1.000 share=$135,000). Thus, for example, an eligible production loss may be determined to be $135,000.

In some embodiments, determining a RP indemnity (block 720) includes determining the amount of any indemnity that would be payable to the insured under the RP insurance plan on the acres insured under the supplemental policy with all acres insured as a single unit and the coverage level the insured chose for the supplemental policy. Thus, for example, a RP indemnity may be determined to be $123,000.

In some embodiments, reducing the eligible production loss by the RP indemnity to generate an eligible loss (block 722) includes subtracting the RP indemnity from the eligible production loss (e.g., $135,000−$123,000=$12,000). Thus, for example, an eligible loss may be determined to be $12,000.

In some embodiments, applying a liability adjustment factor to the eligible loss to generate the estimated indemnity for the supplemental policy (block 724) includes multiplying the eligible loss by a liability adjustment factor (e.g., $12,000×0.60=$7,200). Thus, for example, an estimated indemnity may be determined to be $7,200.

Figure 7B:
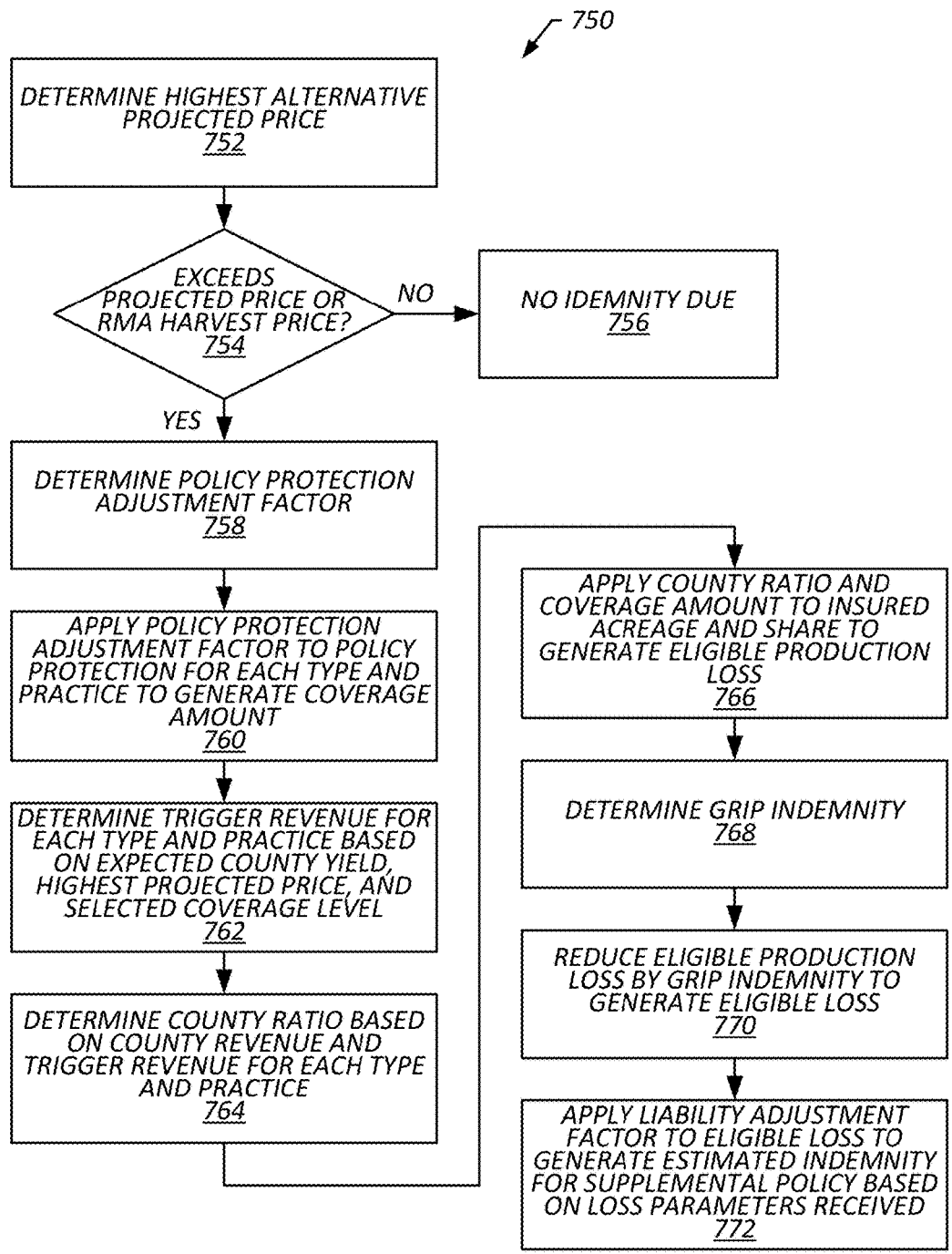
FIG. 7B is a flowchart that illustrates a method for determining an estimated indemnity owed under a supplemental policy for a GRIP/ARP insurance plan in accordance with one or more embodiments of the present technique.

FIG. 7B is a flowchart that illustrates a method 750 for determining an estimated indemnity owed under a supplemental policy for a GRIP/ARP insurance plan in accordance with one or more embodiments of the present technique. Method 750 may generally include determining a highest alternative projected price (block 752), determining whether the highest alternative projected price exceeds a projected price or a harvest price (block 754), and, if the highest alternative projected price does not exceed the projected price or the harvest price, determining that no indemnity is due (block 756). Method 750 may include, if the highest alternative projected price does exceed the projected price or the harvest price, determining a policy protection adjustment factor (block 758), applying the policy protection adjustment factor to policy protection for each type and practice to generate a coverage amount (block 760), determining a trigger revenue for each type and practice based on expected county yield, highest projected price, and selected coverage level (block 762), determining a county ratio based on the county revenue and the trigger revenue for each type and practice (block 764), applying the county ratio and the coverage amount to insured acreage and a share to generate an eligible production loss (block 766), determining a GRIP/ARP indemnity (block 768), reducing the eligible production loss by the GRIP/ARP indemnity to generate an eligible loss (block 770), and applying a liability adjustment factor to the eligible loss to generate an estimated indemnity for the supplemental policy (block 772).

In some embodiments, determining a highest alternative projected price (block 702) includes identifying the highest price projected for one or more alternative price discover periods. For example, the highest alternative projected price may be determined to be $5.50 as discussed above.

In some embodiments, determining whether the highest alternative projected price exceeds a projected price or a harvest price (block 702) includes comparing the highest alternative price to the projected price and the harvest price. For example, the highest alternative projected price of $5.50 may be determined to exceed a projected price or a harvest price when $5.25 is the greater of the projected and harvest prices.

In some embodiments, determining a policy protection adjustment factor (block 758) includes determining the supplemental policy protection adjustment factor as the greater of 1.00 or the ratio of the highest alternative projected price to the RMA expected price (e.g., SPPAF=max (1.00,$5.50/$5.40=1.0185)=1.0185). Thus, for example, a policy protection adjustment factor may be determined to be 1.0185.

In some embodiments, applying the policy protection adjustment factor to policy protection for each type and practice to generate a coverage amount (block 760) includes multiplying the policy protection for each type and practice elected by the insured by the policy protection adjustment factor (e.g., $972.00×1.0185=$989.98 per acre). Thus, for example, a coverage amount may be determined to be $989.98 per acre.

In some embodiments, determining a trigger revenue for each type and practice based on expected county yield, highest projected price, and selected coverage level (block 762) includes determining the trigger revenue for each type and practice as the product of the expected county yield, the highest projected price (subject to the maximum price movement limit selected by the insured), and the coverage level selected by the insured (e.g., 150×$5.50×0.90=$742.50 per acre). Thus, for example, a trigger revenue may be determined to be $742.50 per acre.

In some embodiments, determining a county ratio based on the county revenue and the trigger revenue for each type and practice (block 764) includes subtracting the county revenue from the trigger revenue and dividing that result by the trigger revenue for each type and practice (e.g., $742.50−$525.00)/$742.50=0.2929). Thus, for example, a county ratio may be determined to be 0.2929.

In some embodiments, applying the county ratio and the coverage amount to insured acreage and a share to generate an eligible production loss (block 766) includes multiplying the coverage amount for each type and practice by the county ratio, the number of insured acres, and by the insured's share (e.g., $989.98×0.2929×1,000 acres×1.000 share=$289,965.14). The eligible production loss may be a sum of the individual eligible production losses for all of the types and practices. Thus, for example, an eligible production loss may be determined to be $289,965.14.

In some embodiments, determining a GRIP/ARP indemnity (block 768) includes determining the amount of any indemnity that would be payable to the insured for each type and practice under the GRIP/ARP insurance plan with the coverage level and percent of the maximum amount of insurance the insured chose for the supplemental policy (e.g., $271,970.00). Thus, for example, a GRIP/ARP indemnity may be determined to be $271,970.00.

In some embodiments, reducing the eligible production loss by the GRIP/ARP indemnity to generate an eligible loss (block 770) includes subtracting the GRIP/ARP indemnity from the eligible production loss (e.g., $289,965.14−$271,970.00=$17,995.14). Thus, for example, an eligible loss may be determined to be $17,995.14.

In some embodiments, applying a liability adjustment factor to the eligible loss to generate an estimated indemnity for the supplemental policy (block 772) includes multiplying the eligible loss by the liability adjustment factor (e.g., $17,995.14×0.60=$10,797.08). Thus, for example, an estimated indemnity for the supplemental policy may be determined to be $10,797.08.

In some embodiments, the estimated indemnity may be provided for display to the user (e.g., the agent) (block 508). For example, the estimated indemnity may be displayed to the user (e.g., the agent) via a supplemental policy indemnity estimation page 800 of FIG. 8. Page 800 includes display of an estimated indemnity value 802 that corresponds to the submitted loss parameters. Thus, where the estimated indemnity determination is done in a matter of minutes or seconds, the agent may be able to provide an estimated indemnity for a loss under the supplemental policy while he/she is "at the kitchen table" with the producer.

Figure 9:
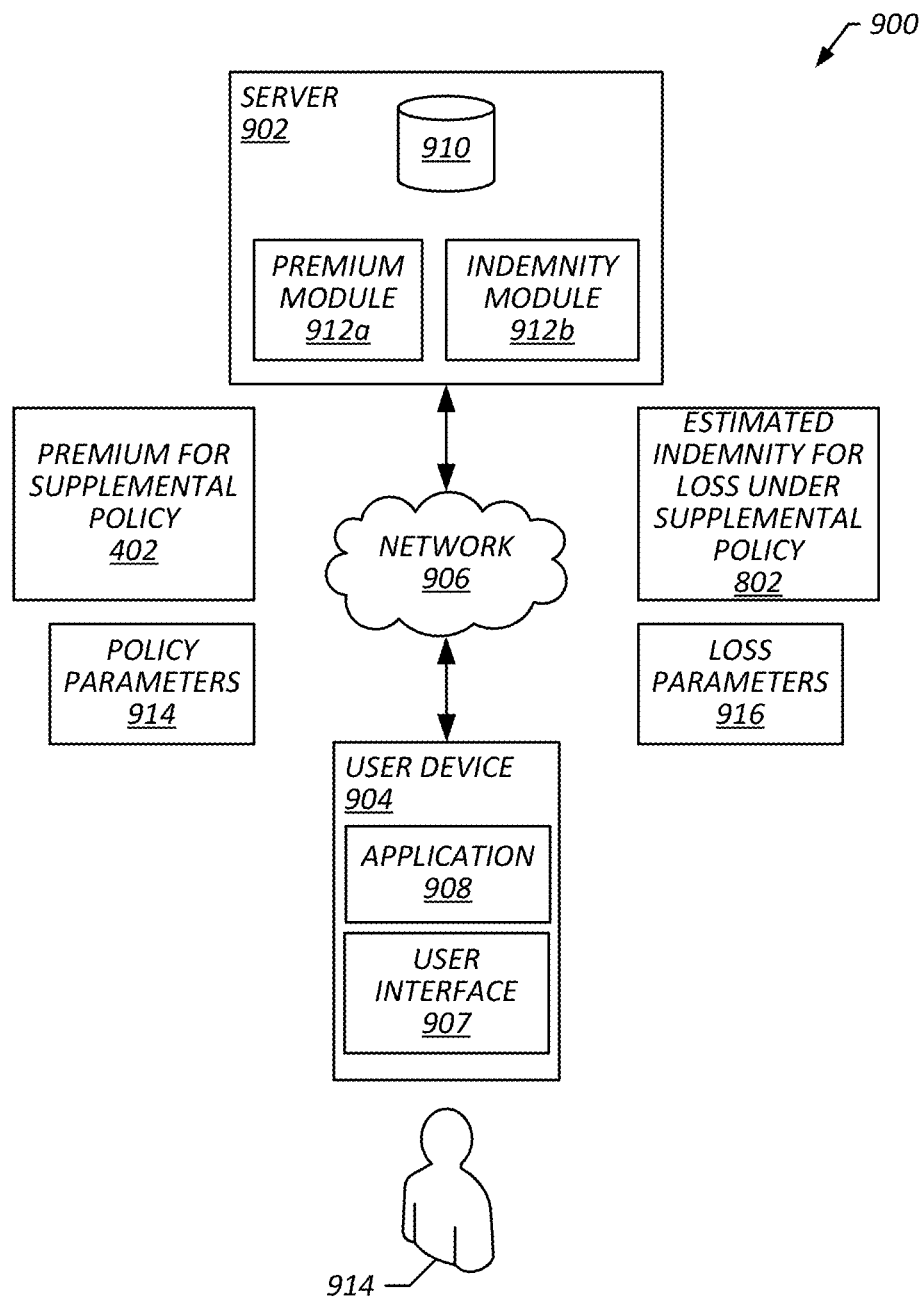
FIG. 9 is a block diagram that illustrates a supplemental policy management environment in accordance with one or more embodiments of the present invention.

FIG. 9 is a block diagram that illustrates a supplemental policy management environment 900. Environment 900 includes a server 902 and a user device 904 communicatively coupled via a network 906. Network 906 may include an electronic communications network, such as the Internet, a local area network (LAN), a wide area network (WAN), a cellular communications network or the like. Network 906 may include a single network or combination of networks.

Device 904 may include any variety of electronic devices. For example, device 904 may include a desktop computer, a laptop computer, a tablet computer, a cellular phone, a personal digital assistant (PDA), and/or the like. In some embodiments, device 904 includes various input/output (I/O) interfaces, such as a graphical user interface (e.g., a display screen) 907, an image acquisition device (e.g., a camera), an audible output user interface (e.g., a speaker), an audible input user interface (e.g., a microphone), a keyboard, a pointer/selection device (e.g., a mouse, a trackball, a touchpad, a touchscreen, a stylus, etc.), a printer, or the like. In some embodiments, device 904 includes general computing components and/or embedded systems optimized with specific components for performing specific tasks. Device 904 may include an application 908. Application 908 may include one or more modules having program instructions that are executable by a computer system to perform some or all of the functionality described herein with regard to device 904. For example, application 908 may include program instructions that are executable by a computer system to perform some or all of the steps of method 100 and/or method 500. In some embodiments, device 904 includes a computer system similar to that of computer system 1000 described below with regard to at least FIG. 10.

Server 902 may include a network entity that serves requests by client entities, such as requests by device 904. In some embodiments, server 902 hosts a content site, such as a website, a file transfer protocol (FTP) site, an Internet search website or other source of network content. In some embodiments, server 902 includes a supplemental insurance data manager system for processing request relating to supplemental insurance policies. In some embodiments, server 902 includes or otherwise has access to data store 910. Data store 910 may include a database or similar data repository. Data store 910 may include an image repository for storing supplemental policy information and/or related information.

In some embodiments, server 902 includes a premium module 912*a* and/or an indemnity module 912*b*. Modules 912*a* and/or 912*b* may include program instructions that are executable by a computer system to perform some or all of the functionality described herein with regard to server 902. Module 912*a* may include program instructions that are executable by a computer system to perform some or all of the steps of methods 100 and 350. Module 912*a* may include program instructions that are executable by a computer system to perform some or all of the steps of methods 500, 700 and/or 750. In some embodiments, server 902 includes a computer system similar to that of computer system 1000 described below with regard to at least FIG. 10. Although server 902 is represented by a single box, server 902 may include a single server (or similar system), or a plurality of servers (and/or similar systems). For example, server 902 may include a plurality of different servers (and/or similar systems) that are employed individually or in combination to perform some or all of the functionality described herein with regard to server 902.

In some embodiments environment 900 is used to employ techniques described herein (e.g., the steps of method 100). For example, page 200 may be served by module 912*a* of server 902 and displayed to user 914 via user interface 907 of user device 904. User (e.g., an agent) 914 may submit policy parameters 914 to premium module 912*a* via fields 202 of page 200. Premium module 912*a* may process policy parameters 914 to determine premium 402, and serve page 400 (including premium 402), to user device 904 for display to user 914 via user interface 907.

In some embodiments environment 900 is used to employ techniques described herein (e.g., the steps of method 500). For example, page 600 may be served by module 912*b* of server 902 and displayed to user 914 via user interface 907 of user device 904. User (e.g., an agent) 914 may submit loss parameters 916 to indemnity module 912*b* via fields 602 of page 600. Indemnity module 912*b* may process loss parameters 916 to determine estimated indemnity (for loss under a supplemental policy) 802, and serve page 800 (including estimated indemnity 802) to user device 904 for display to user 914 via user interface 907.

Although module 912*a* is illustrated as being employed by server 912, embodiments may include implementing some or all of the functionality of module 912*a* and/or an application 908 on any suitable device. For example, some or all of the functionality of module 912*a* may be provided on user device 904 (e.g., in place of or in conjunction with an application 908) such that some or all of the associated processes can be completed by user device 904. Although module 912*b* is illustrated as being employed by server 902, embodiments may include implementing some or all of the functionality of module 912*b* and/or an application 908 on any suitable device. For example, some or all of the functionality of module 912*b* may be provided on user device 904 (e.g., in place of or in conjunction with an application 908) such that some or all of the associated processes can be completed by a user device 904.

Accordingly, in some embodiments, provided is a supplemental crop insurance revenue protection coverage that gives producers greater control over their covered financial risk, and thereby the value of their crop. In some embodiments, the coverage has no impact on the liability or indemnity associated with the underlying policies (such as the MPCI policies), producers are afforded greater independence to choose the pricing guarantee time period when they believe the underlying price discovery process does not reflect their potential financial outcome. Such liberty of price discovery period election may provide producers greater opportunity to ensure price coverage comfort.

In some embodiments, the supplemental crop insurance revenue protection coverage provides producers expanded flexibility in revenue risk transfer, for example, by allowing them the opportunity to choose multiple pricing discovery points throughout the year. For example, producers may add one or more price discovery periods for their underlying MPCI policy and the highest actual price from those selections may be used to establish the revenue guarantee for loss purposes if that price exceeds the projected and harvest prices released by RMA. Accordingly, perceptive producers may now cover the price risks not captured by the narrow range of prices selected by the RMA. In some embodiments, the supplemental crop insurance revenue protection coverage provides producers with the freedom to select the marketing time period when the producers believe their market price revenue risk is of concern. For example, the supplemental crop insurance revenue protection coverage enables these perceptive business owners the opportunity to select coverage for those times when they believe the markets will not be in their best financial interests.

In some embodiments, the supplemental crop insurance revenue protection coverage is a customizable non-reinsured supplemental offering additional coverage for: Revenue Protection (RP) and Group Risk Income Protection-Harvest Revenue Option (GRIP HRO or successor) policies. As additional coverage placed on top of the underlying MPCI product, indemnity payments, like the premium payments under the supplemental crop insurance revenue protection coverage, are separate. A producer may experience a loss that triggers an indemnity payment from the underlying MPCI policy without getting an indemnity from the supplemental crop insurance revenue protection coverage. Alternatively, unfavorable market prices could negatively impact the producer's financial well-being without triggering an indemnity from the underlying MPCI policy, but the supplemental crop insurance revenue protection coverage may pay an indemnity in this instance, helping to offset the financial losses suffered by the producer.

In some embodiments, a producer must select at least one alternative price discovery period when they first purchase the supplemental crop insurance revenue protection coverage. In some embodiments, a producer can add up to nine more price discovery periods to that same policy throughout the crop year. Failure to purchase an RP or GRIP/ARP MPCI product may result in the producer still owing the premium for the supplemental crop insurance revenue protection coverage policy but the policy, and subsequently its coverage, will be cancelled for that crop year.

With the interactive user-interface for providing policy and loss information related to the supplemental crop insurance revenue protection coverage program and its ability to quickly generate premiums for supplemental crop insurance revenue protection coverage polices, agents may provide substantially real-time premium estimates (e.g., provide premium estimates within a matter of minutes) for their clients (e.g., producers) at the time of purchasing the policy and all necessary information can be captured to create a policy while the agent is "at the kitchen table" with the client.

Although certain embodiments are described in the context of supplemental crop insurance, the techniques described herein may be employed in a variety of similar applications, such as Private Area Revenue (PAR) Supplemental Insurance, Nursery Crop Insurance (e.g., Nursery Hurricane Named Peril Supplemental Insurance, Nursery Production Infrastructure Supplemental Insurance, and Nursery Grafted Fruit Stock Supplemental Insurance), PRF Supplemental Insurance, Customized Revenue Supplemental Insurance, Regional Top Up, Personal Yield Assurance Supplemental Insurance, and County Yield Assurance Supplemental Insurance. For example, an agent selling these types of coverage may gather policy parameters from the insured, submit policy parameters 914 to an insurance system via an interactive portal displayed by user device 904 (e.g., using interactive pages/portals similar to at least pages 200-200j described herein), premium module 912a of server 902 may employ financial engineering techniques to generate a quote including the premium for the supplemental policy (e.g., using financial engineering techniques such as simulation techniques described herein), and the quote including the premium for the supplemental policy may be provided in real-time to the agent via the portal displayed by the user device 904 (e.g., using interactive pages/portals similar to at least pages 400-400b described herein). Similarly, an agent may gather loss parameters from the insured for the coverage, submit the loss parameters 916 to an insurance system via an interactive portal displayed by user device 904 (e.g., using interactive pages/portals similar to at least page 600 described herein), the insurance system may determine an estimated indemnity for a loss under the policy 802 (e.g., using financial engineering techniques such as those described herein for calculating an indemnity), and the estimated indemnity for a loss under the policy 802 may be provided in real-time to the agent via the portal displayed by the user device 904 (e.g., using interactive pages/portals similar to at least page 800 described herein).

Figure 12A:
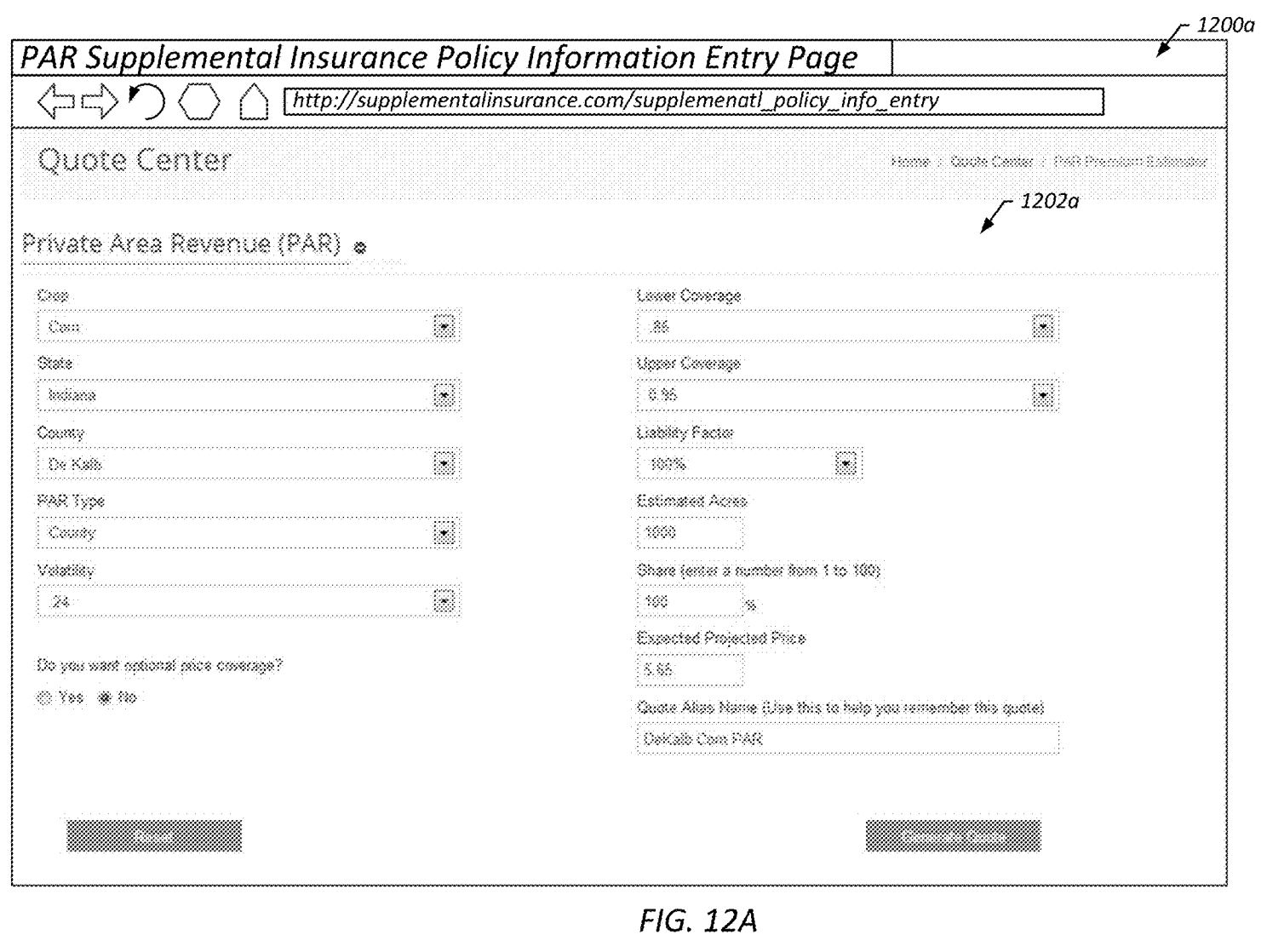
Figure 12B:
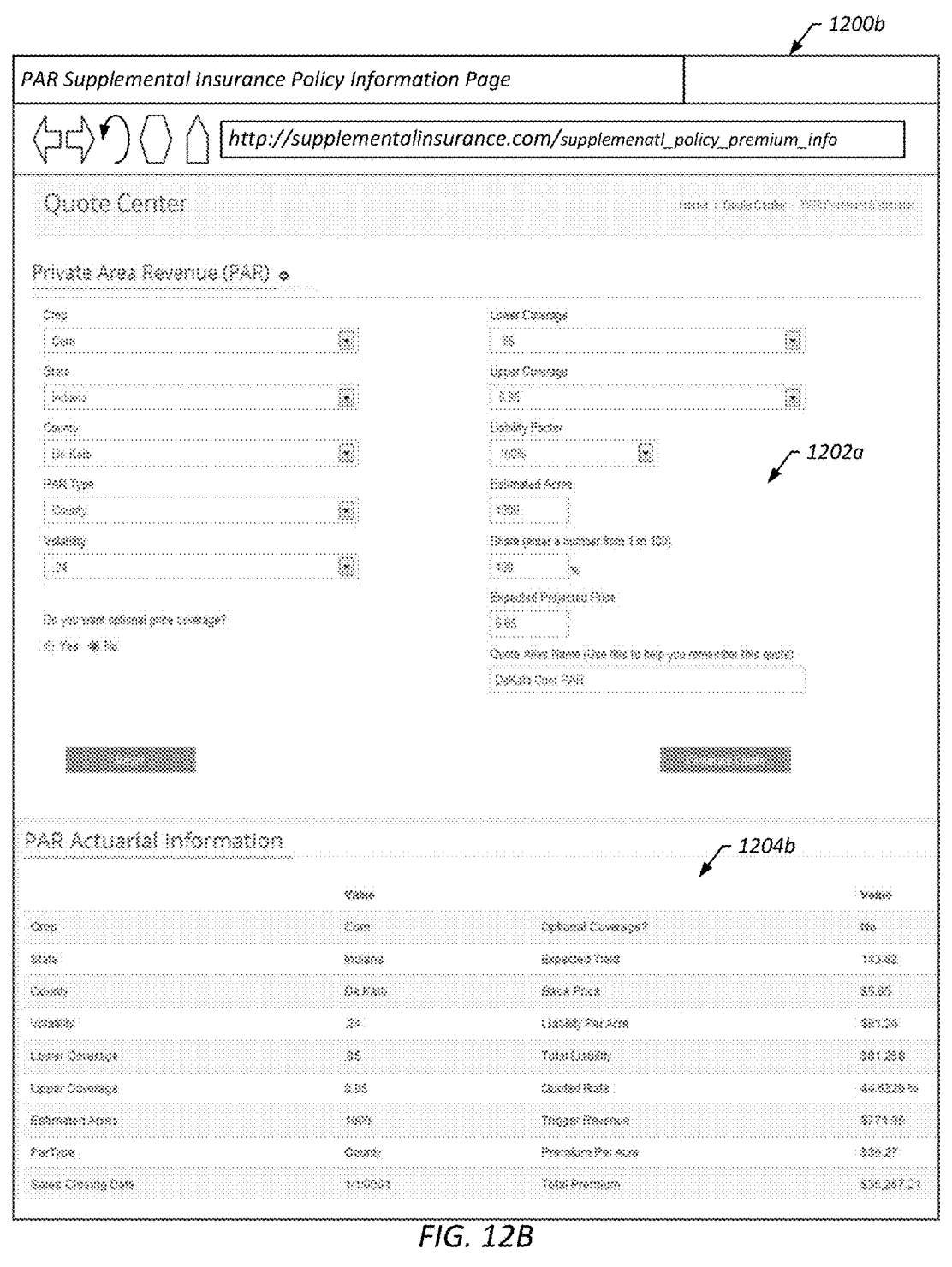

FIG. 12A is an illustration of an exemplary PAR supplemental policy information page 1200a in accordance with one or more embodiments of the present invention. FIG. 12B is an illustration of an exemplary PAR supplemental policy information page 1200b including display of a determined premium for the PAR in accordance with one or more embodiments of the present invention. Page 1200a may include an interactive page including policy parameter fields 1202a that allow an agent to enter and submit PAR policy parameters. Page 1200b may include an interactive page that displays the submitted PAR policy parameters along with quote information 1204b, including a premium quote (e.g., $35,267.21) corresponding to policy parameters 1202a.

Figure 13C:
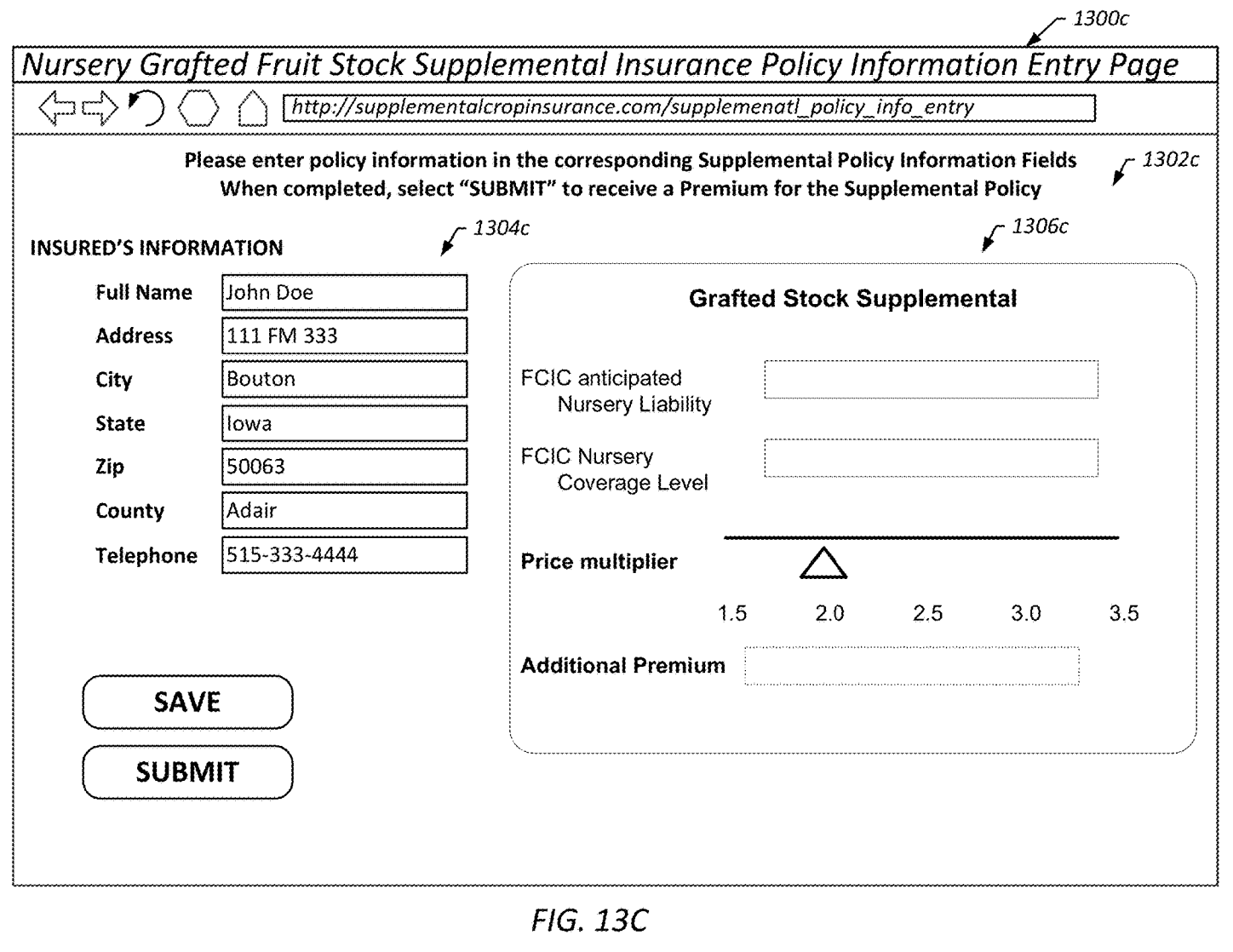

FIGS. 13A-13C are illustrations of exemplary nursery supplemental policy information pages 1300a, 1300b and 1300c, respectively, in accordance with one or more embodiments of the present invention.

Page 1300a of FIG. 13A includes policy parameter fields 1302a for a nursery hurricane named peril supplemental insurance policy, including personal information fields 1304a and policy information fields 1306a for the entry of information relating to the nursery hurricane named peril supplemental insurance policy terms. An agent may use page 1300a to submit policy parameters in a manner similar to that discussed above with regard to at least supplemental policy information page 200. Upon submission of the policy parameters via page 1300a, the insurance system may determine a corresponding premium amount based on the policy parameters, and provide for display of a premium amount for the nursery hurricane named peril supplemental insurance policy via a policy premium page in a manner similar to that discussed herein for at least supplemental policy information page 400.

Page 1300b of FIG. 13B includes policy parameter fields 1302b for a nursery production infrastructure supplemental insurance policy, including personal information fields 1304b and policy information fields 1306b for the entry of information relating to the nursery production infrastructure supplemental insurance policy terms. An agent may use page 1300b to submit policy parameters in a manner similar to that discussed above with regard to at least supplemental policy information page 200. Upon submission of the policy parameters via page 1300b, the insurance system may determine a corresponding premium amount based on the policy parameters, and provide for display of the premium amount for the nursery production infrastructure supplemental insurance policy via a policy premium page in a manner similar to that discussed herein for at least supplemental policy information page 400.

Page 1300c of FIG. 13C includes policy parameter fields 1302c for a nursery grafted fruit stock supplemental insurance policy, including personal information fields 1304c and policy information fields 1306c for the entry of information relating to the nursery grafted fruit stock supplemental insurance policy terms. An agent may use page 1300c to submit policy parameters in a manner similar to that discussed above with regard to at least supplemental policy information page 200. Upon submission of the policy parameters via page 1300c, the insurance system may determine a corresponding premium amount based on the policy parameters, and provide for display of the premium amount for the nursery grafted fruit stock supplemental insurance policy via a policy premium page in a manner similar to that discussed herein for at least supplemental policy information page 400.

In some embodiments, submission for a supplemental policy may be subject to a pre-acceptance process. For example, in the context of nursery insurance, a set of preliminary parameters may be used to score the insured and the process may not proceed to the process for collecting full set of policy parameters unless the score satisfies a threshold. In some embodiments, a nursery pre-acceptance may consider categories that can be used to identify sophisticated producers (e.g., size of operation (regional specific), type of irrigation, product turnover, nature of line-out stock, mechanization of protection, sophistication of production records, and/or the like).

Figure 14:
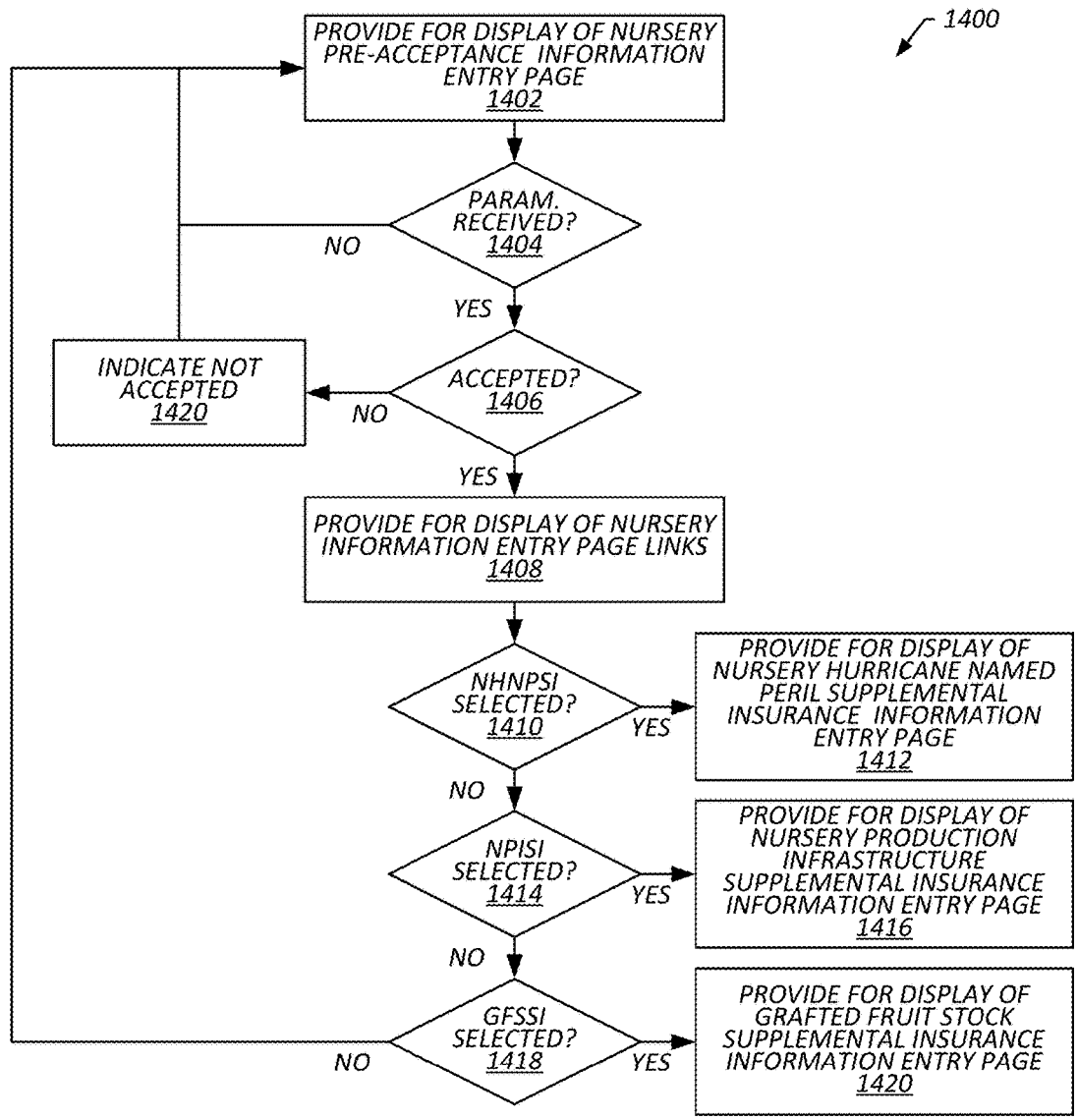
FIG. 14 is a flowchart that illustrates a method of pre-acceptance for quoting nursery supplemental insurance in accordance with one or more embodiments of the present invention.

FIG. 14 is a flowchart that illustrates a method 1400 of pre-acceptance quoting nursery supplemental insurance in accordance with one or more embodiments of the present invention. Method 1400 may generally include providing for display of a nursery pre-acceptance information entry page (block 1402), and upon determining that parameters have been received via the nursery pre-acceptance information entry page (block 1404), determining whether the submission is accepted (block 1406). It may be determined that a submission is accepted based upon a score (e.g., a score based upon the parameters received via the nursery pre-acceptance information entry page) exceeding a threshold score. If the submission is accepted, the process may proceed to providing for display of nursery information entry page links (block 1408). Upon determining that one of the links is selected (block 1410, 1414 or 1418), a corresponding page (e.g., a nursery hurricane named peril supplemental insurance information entry page, a nursery production infrastructure supplemental insurance information entry page, or a grafted fruit stock supplemental insurance information entry page) may be displayed (blocks 1412, 1416 or 1420). If the submission is not accepted (block 1406), the process may proceed to providing an indication that the submission was not accepted (block 1420) and returning to display of the nursery pre-acceptance information entry page (block 1402). If the submission is accepted (block 1406), but no link is selected (e.g., due to a time-out) (blocks 1410, 1414 or 1418), the process may return to display of the nursery pre-acceptance information entry page (block 1402).

Figure 15A:
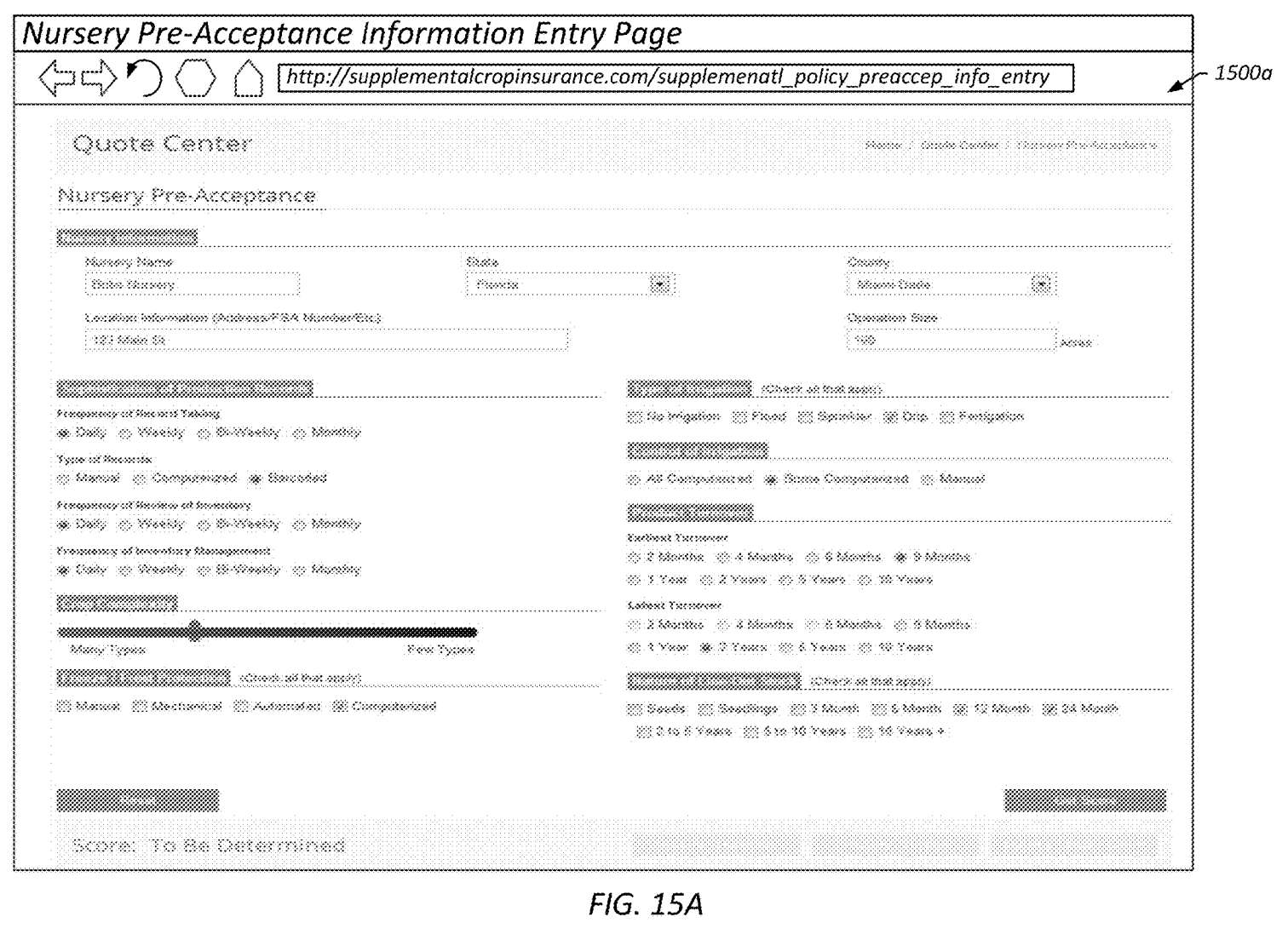
Figure 15B:
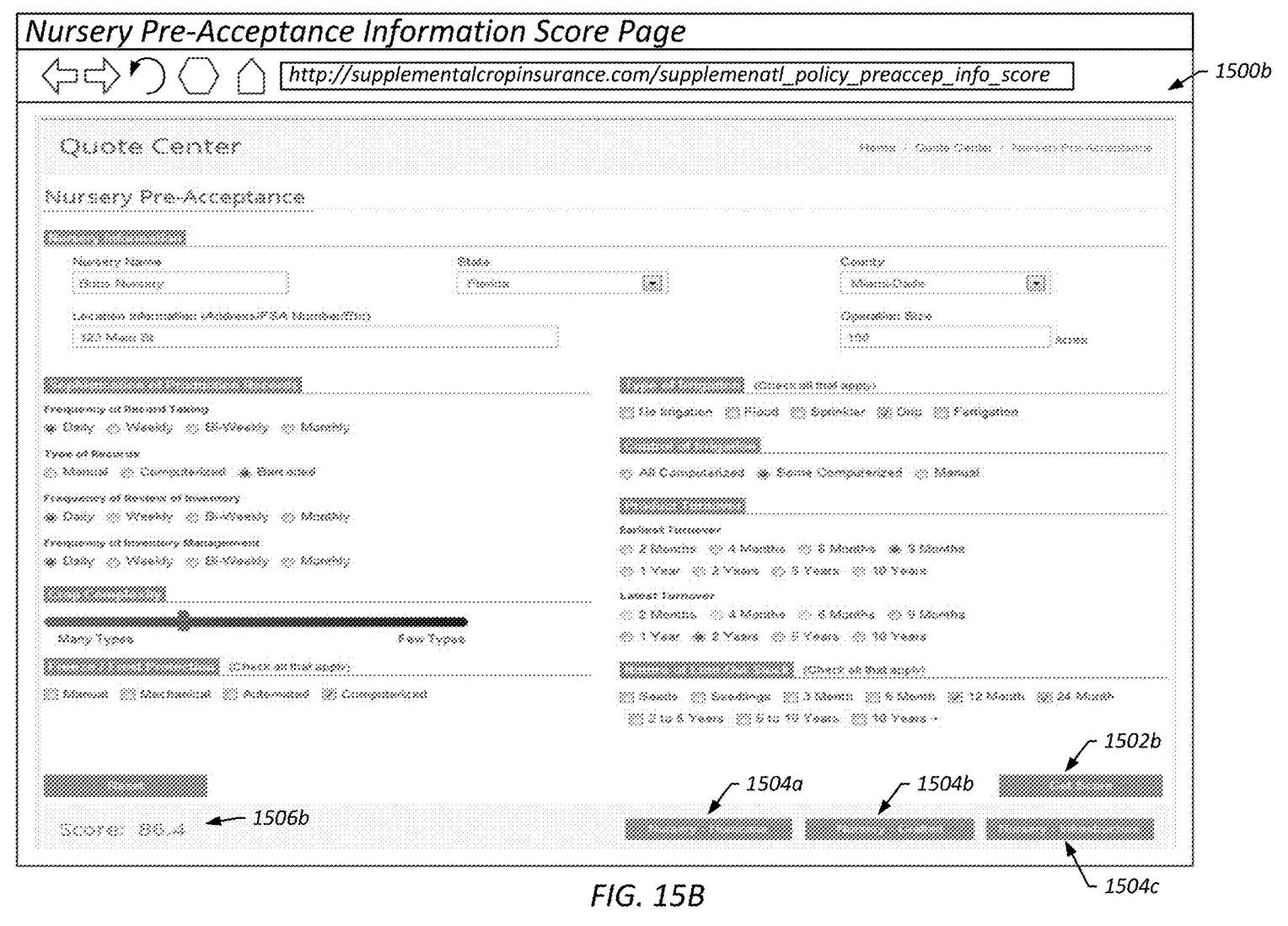

FIG. 15A is an illustration of an exemplary a nursery pre-acceptance information entry page 1500a in accordance with one or more embodiments of the present invention. FIG. 15B is an illustration of an exemplary a nursery information entry links page 1500b displaying nursery information entry page links 1502b (e.g., links 1504a-1504c) and a score 1506b in accordance with one or more embodiments of the present invention. It may be determined that a submission is accepted based upon score 1506b exceeding a threshold score (e.g., a threshold score of seventy-five). Upon selection of link 1504a by a user, a nursery hurricane named peril supplemental insurance information entry page similar to that of page 1300a of FIG. 13A may be displayed. Upon selection of link 1504b by a user, a nursery production infrastructure supplemental insurance information entry page similar to that of page 1300b of FIG. 13B may be displayed. Upon selection of link 1504c by a user, a grafted fruit stock supplemental insurance information entry page similar to that of page 1300c of FIG. 13C may be displayed.

Figure 11:
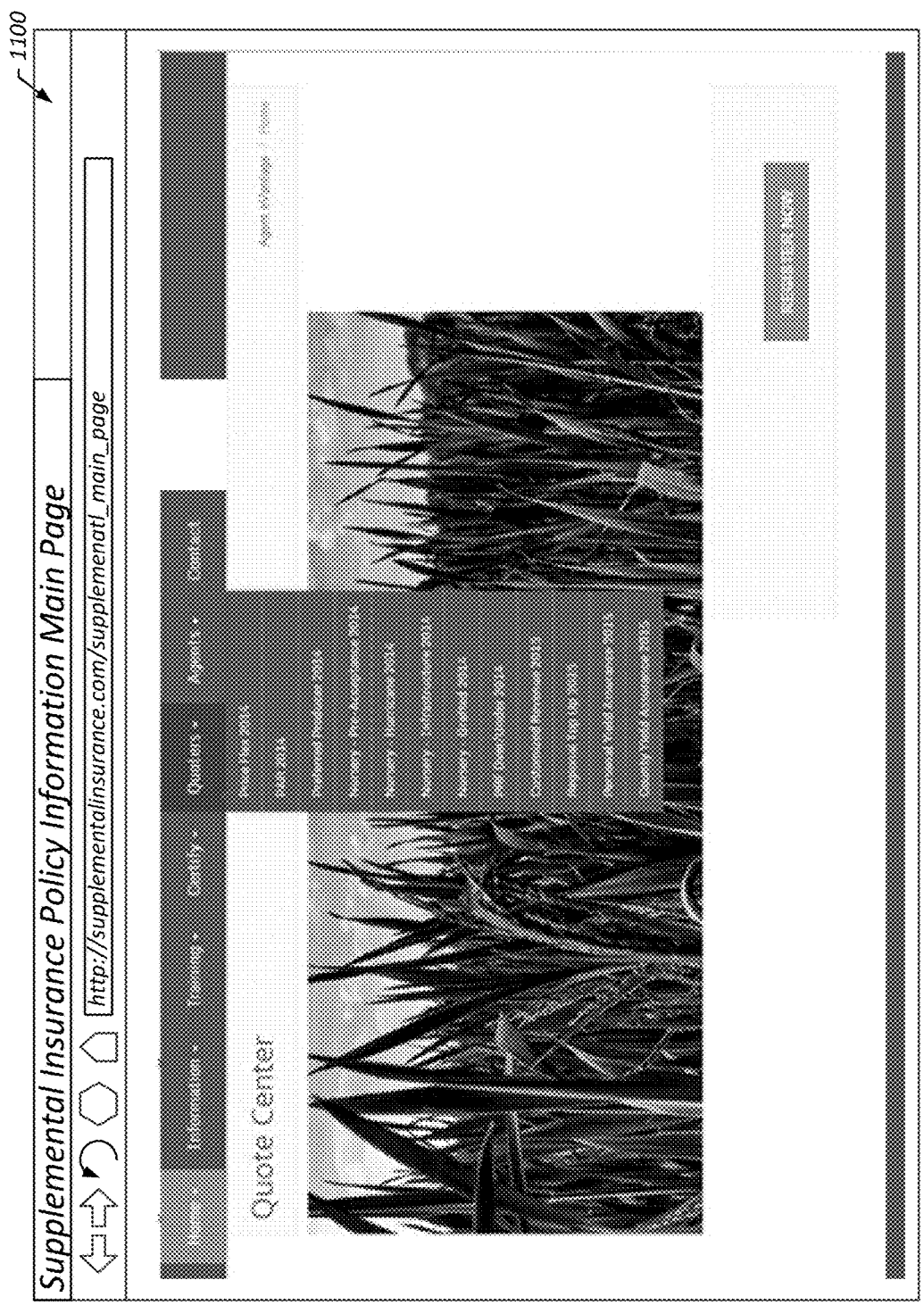
FIG. 11 is an illustration of an exemplary supplemental policy information main page in accordance with one or more embodiments of the present invention.
Figure 16:
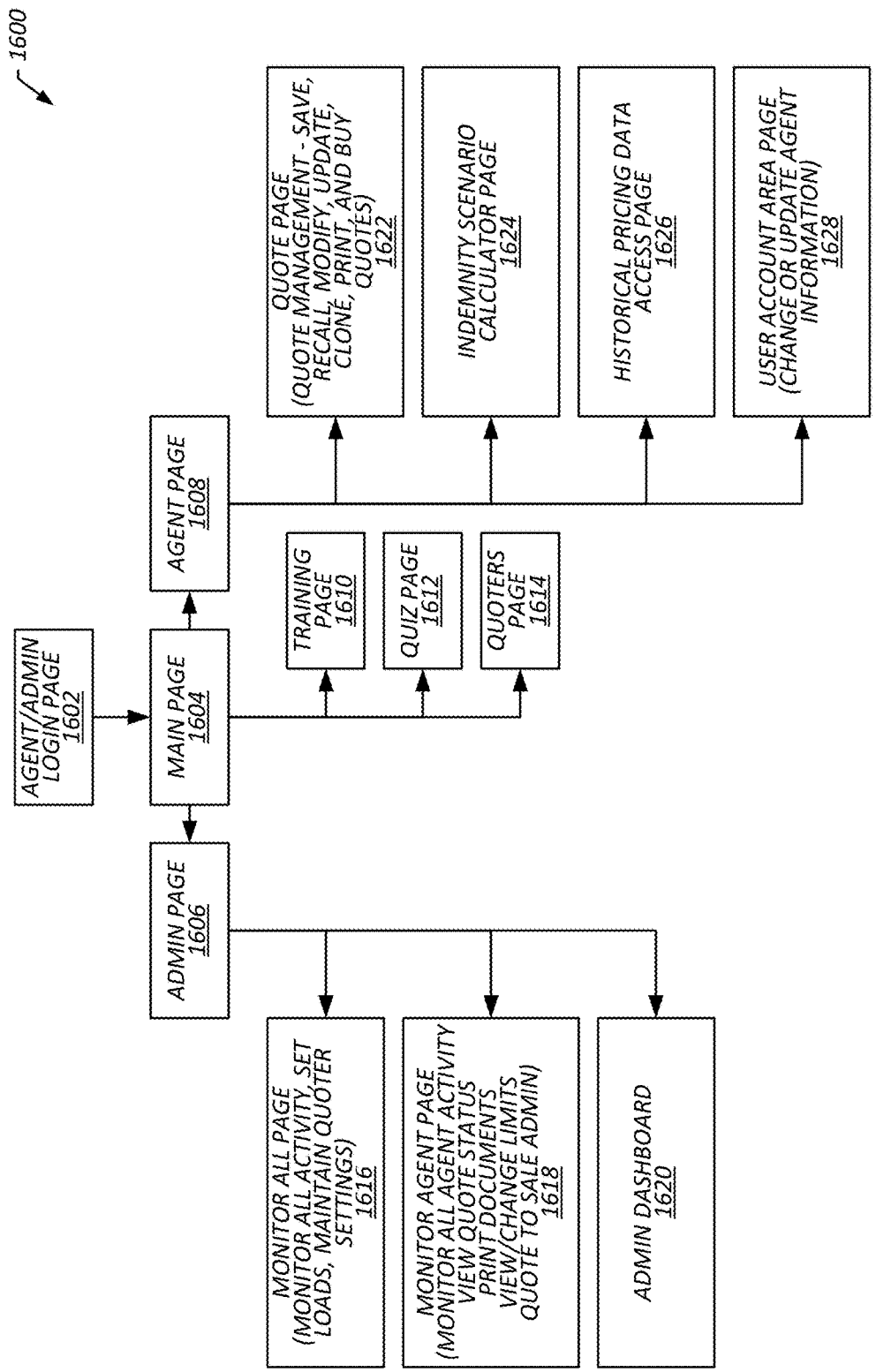
FIG. 16 is a block diagram that illustrates a page hierarchy for a supplemental insurance content site in accordance with one or more embodiments of the present invention.

FIG. 16 is a block diagram that illustrates a page hierarchy 1600 for a supplemental insurance content site in accordance with one or more embodiments of the present invention. As depicted a top-level page may include an agent/admin login page 1602. Upon successfully logging in via agent/admin login page 1602, a user may be directed to a main page 1604 (e.g., a page similar to that of a portal main page 1100 depicted in FIG. 11). Main page 1604 may include links to an administration page 1606 and/or an agent page 1608. Main page 1604 may include links to a training page 1610, a quiz page 1612 and/or a quoters page 1614. Access to a page may be based on privileges associated the user account used to login. For example, if an agent logs in and does not have administrator privileges, the main page 1604 may include a link to the agent page 1608, but not a link to the administration page 1606. Similarly, if an administrator logs in and does have administrator privileges and agent privileges, the main page 1604 may include a link to the agent page 1608 and the administration page 1606.

Administrator page 1606 may include links to a monitor all page 1616, a monitor agent page 1618 and/or an administrator dashboard 1620. Agent page 1608 may include links to a quote page 1622, an indemnity scenario calculator page 1624, a historical pricing data access page 1626 and/or a user account area page 1628.

It will be appreciated that methods 100, 300, 350, 500, 700, 750 and 1400 are exemplary embodiments of methods that may be employed in accordance with the techniques described herein. Methods 100, 300, 350, 500, 700, 750 and 1400 may be modified to facilitate variations of its implementations and uses. Methods 100, 300, 500, 700, 750 and 1400 may be implemented in software, hardware, or a combination thereof. Some or all of methods 100, 300, 350, 500, 700, 750 and 1400 may be implemented by one or more of the modules/applications described herein, such module 712a, 712b and/or application 708 depicted and described in more detail below with regard to FIG. 5. The order of the steps of methods 100, 300, 350, 500, 700, 750 and 1400 may be changed, and various elements may be added, reordered, combined, omitted, modified, etc.

Exemplary Computer System

Figure 10:
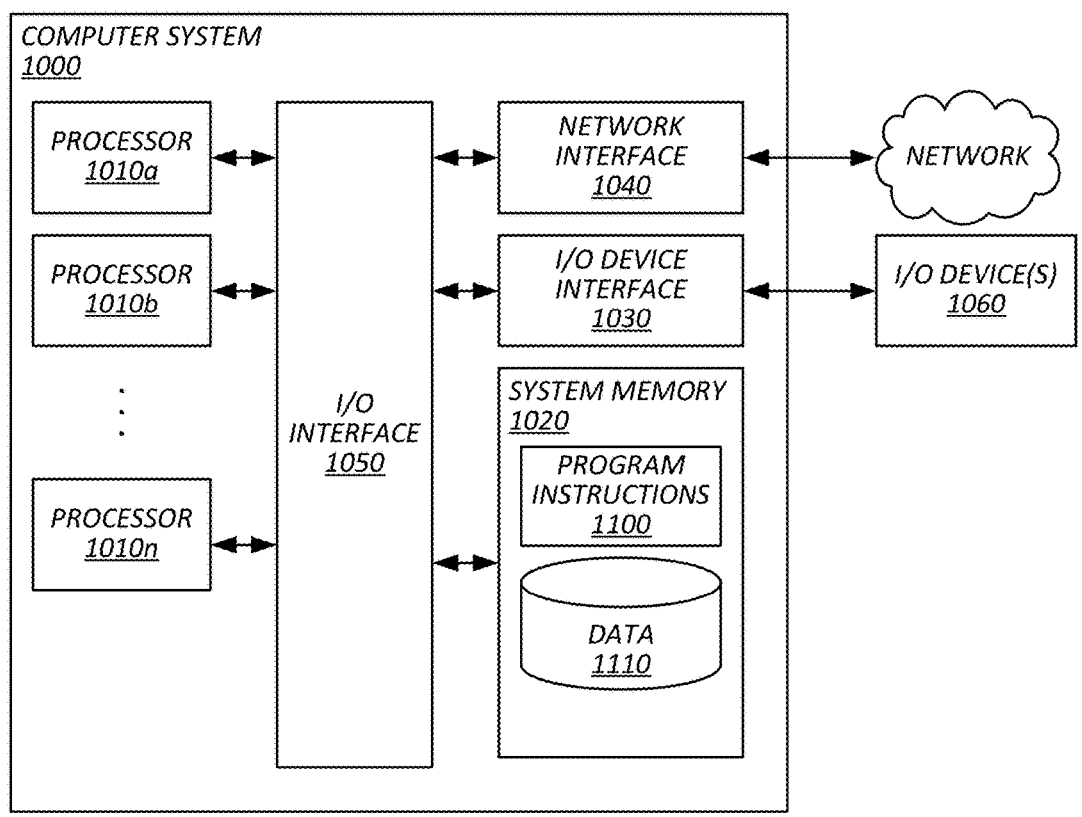
FIG. 10 is a block diagram that illustrates an exemplary computer system in accordance with one or more embodiments of the present invention.

FIG. 10 is a block diagram that illustrates an exemplary computer system 1000. Various portions of systems and methods described herein, may include or be executed on one or more computer systems similar to system 1000. For example, server 902 and/or user device 904 may include a configuration similar to at least a portion of computer system 1000. Further, methods/processes/modules described herein (e.g., module 912a, module 912b and/or application 908) may be executed by one or more processing systems similar to that of computer system 1000.

Computer system 1000 may include one or more processors (e.g., processors 1010a-1010n) coupled to system memory 1020, an input/output I/O device interface 1030 and a network interface 1040 via an input/output (I/O) interface 1050. A processor may include a single processor device and/or a plurality of processor devices (e.g., distributed processors). A processor may be any suitable processor capable of executing/performing instructions. A processor may include a central processing unit (CPU) that carries out program instructions to perform the basic arithmetical, logical, and input/output operations of computer system 1000. A processor may include code (e.g., processor firmware, a protocol stack, a database management system, an operating system, or a combination thereof) that creates an execution environment for program instructions. A processor may include a programmable processor. A processor may include general and/or special purpose microprocessors. A processor may receive instructions and data from a memory (e.g., system memory 1020). Computer system 1000 may be a uni-processor system including one processor (e.g., processor 1010a), or a multi-processor system including any number of suitable processors (e.g., 1010a-1010n). Multiple processors may be employed to provide for parallel and/or sequential execution of one or more portions of the techniques described herein. Processes and logic flows described herein may be performed by one or more programmable processors executing one or more computer programs to perform functions by operating on input data and generating corresponding output. Processes and logic flows described herein may be performed by, and apparatus can also be implemented as, special purpose logic circuitry, e.g., an FPGA (field programmable gate array) or an ASIC (application specific integrated circuit). Computer system 1000 may include a computer system employing a plurality of computer systems (e.g., distributed computer systems) to implement various processing functions.

I/O device interface 1030 may provide an interface for connection of one or more I/O devices 1060 to computer system 1000. I/O devices may include any device that provides for receiving input (e.g., from a user) and/or providing output (e.g., to a user). I/O devices 1060 may include, for example, graphical user interface displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computer system 1000 through a wired or wireless connection. I/O devices 1060 may be connected to computer system 1000 from a remote location. I/O devices 1060 located on remote computer system, for example, may be connected to computer system 1000 via a network and network interface 1040.

Network interface 1040 may include a network adapter that provides for connection of computer system 1000 to a network. Network interface may 1040 may facilitate data exchange between computer system 1000 and other devices connected to the network. Network interface 1040 may support wired or wireless communication. The network may include an electronic communication network, such as the Internet, a local area network (LAN), a wide area network (WAN), a cellular communications network or the like.

System memory 1020 may be configured to store program instructions 1100 and/or data 1110. Program instructions 1100 may be executable by a processor (e.g., one or more of processors 1010a-1010n) to implement one or more embodiments of the present technique. Instructions 1100 may include modules of computer program instructions for implementing one or more techniques described herein with regard to various processing modules. Program instructions may include a computer program (also known as a program, software, software application, script, or code). A computer program may be written in any form of programming language, including compiled or interpreted languages, or declarative/procedural languages. A computer program may include a unit suitable for use in a computing environment, including as a stand-alone program, a module, a component, a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a non-transitory computer readable storage medium, such as a machine readable storage device, a machine readable storage substrate, a memory device, or any combination thereof, or the like. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1020 may include a non-transitory computer readable storage medium having program instructions stored thereon that are executable by a computer processor (e.g., one or more of processors 1010a-1010n) to cause some or all of the subject matter and the functional operations described herein. A memory (e.g., system memory 1020) may include a single memory device and/or a plurality of memory devices (e.g., distributed memory devices).

I/O interface 1050 may be configured to coordinate I/O traffic between processors 1010a-1010n, system memory 1020, network interface 1040, I/O devices 1060 and/or other peripheral devices. I/O interface 1050 may perform protocol, timing or other data transformations to convert data signals from one component (e.g., system memory 1020) into a format suitable for use by another component (e.g., processors 1010a-1010n). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1000, or multiple computer systems 1000 configured to host different portions or instances of embodiments. Multiple computer systems 1000 may provide for parallel or sequential processing/execution of one or more portions of the techniques described herein.

Those skilled in the art will appreciate that computer system 1000 is merely illustrative and is not intended to limit the scope of the techniques described herein. Computer system 1000 may include any combination of devices and/or software that may perform or otherwise provide for the performance of the techniques described herein. For example, computer system 1000 may include a desktop computer, a laptop computer, a tablet computer, a server device, a client device, a mobile telephone, a personal digital assistant (PDA), a mobile audio or video player, a game console, a Global Positioning System (GPS), or the like. Computer system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

It should be understood that the description and the drawings are not intended to limit the invention to the particular form disclosed, but to the contrary, the intention is to cover all modifications, equivalents, and alternatives falling within the spirit and scope of the present invention as defined by the appended claims. Further modifications and alternative embodiments of various aspects of the invention will be apparent to those skilled in the art in view of this description. Accordingly, this description and the drawings are to be construed as illustrative only and are for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed or omitted, and certain features of the invention may be utilized independently, all as would be apparent to one skilled in the art after having the benefit of this description of the invention. Changes may be made in the elements described herein without departing from the spirit and scope of the invention as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" mean including, but not limited to. As used throughout this application, the singular forms "a", "an" and "the" include plural referents unless the content clearly indicates otherwise. Thus, for example, reference to "an element" may include a combination of two or more elements. Unless specifically stated otherwise, as apparent from the discussion, it is appreciated that throughout this specification discussions utilizing terms such as "processing", "computing", "calculating", "determining" or the like refer to actions or processes of a specific apparatus, such as a special purpose computer or a similar special purpose electronic processing/computing device. In the context of this specification, a special purpose computer or a similar special purpose electronic processing/computing device is capable of manipulating or transforming signals, typically represented as physical electronic or magnetic quantities within memories, registers, or other information storage devices, transmission devices, or display devices of the special purpose computer or similar special purpose electronic processing/computing device.

The techniques described herein may include or otherwise be used in conjunction with techniques described in U.S. Non-Provisional application Ser. No. 14/020,119, filed on Sep. 6, 2013, and titled "SYSTEMS, COMPUTER-IMPLEMENTED METHODS, AND COMPUTER MEDIUM TO DETERMINE PREMIUMS AND INDEMNITIES FOR SUPPLEMENTAL CROP INSURANCE"; U.S. Non-Provisional application Ser. No. 14/016,961, filed on Sep. 3, 2013, and titled "SYSTEMS, COMPUTER-IMPLEMENTED METHODS, AND COMPUTER MEDIUM TO DETERMINE PREMIUMS AND INDEMNITIES FOR SUPPLEMENTAL CROP INSURANCE"; U.S. Provisional Patent Application No. 61/824,732, filed on May 17, 2013, and titled "SYSTEMS, COMPUTER MEDIUM AND COMPUTER-IMPLEMENTED METHODS FOR MANAGING SUPPLEMENTAL CROP INSURANCE POLICIES"; U.S. Provisional Patent Application No. 61/834,753, filed on Jun. 13, 2013, and titled "SYSTEMS, COMPUTER MEDIUM AND COMPUTER-IMPLEMENTED METHODS FOR MANAGING SUPPLEMENTAL CROP INSURANCE POLICIES"; U.S. Provisional Patent Application No. 61/845,132, filed on Jul. 11, 2013, and titled "SYSTEMS, COMPUTER MEDIUM AND COMPUTER-IMPLEMENTED METHODS FOR MANAGING SUPPLEMENTAL CROP INSURANCE POLICIES"; U.S. Provisional Patent Application No. 61/856,425, filed on Jul. 19, 2013, and titled "SYSTEMS, COMPUTER MEDIUM AND COMPUTER-IMPLEMENTED METHODS FOR MANAGING SUPPLEMENTAL CROP INSURANCE POLICIES"; and U.S. Provisional Patent Application No. 61/871,726, filed on Aug. 29, 2013, and titled "SYSTEMS, COMPUTER MEDIUM AND COMPUTER-IMPLEMENTED METHODS FOR MANAGING SUPPLEMENTAL INSURANCE POLICIES", the disclosures of which are each hereby incorporated by reference in their entireties.

In the drawings and specification, there have been disclosed embodiments of methods, systems, electronic interfaces, and non-transitory computer-readable medium having computer program stored therein of the present invention, and although specific terms are employed, the terms are used in a descriptive sense only and not for purposes of limitation. The embodiments of methods, systems, electronic interfaces, and non-transitory computer-readable medium having computer program stored therein of the present invention have been described in considerable detail with specific reference to these illustrated embodiments. It will be apparent, however, that various modifications and changes can be made within the spirit and scope of the embodiments of methods, systems, electronic interfaces, and non-transitory computer-readable medium having computer program stored therein of the present invention as described in the foregoing specification, and such modifications and changes are to be considered equivalents and part of this disclosure.

What is claimed is:
1. A supplemental crop insurance machine comprising:
a supplemental insurance server including one or more processors, being in communication with one or more databases, being positioned to communicate through an electronic communications network to one or more user devices positioned remote from the supplemental insurance server, and being configured to:
serve, to the one or more user devices through the electronic communications network, a supplemental crop insurance policy information content page comprising one or more policy parameter fields adapted to be populated by a user with a corresponding set of supplemental crop insurance policy parameters;
receive input of the set of supplemental crop insurance policy parameters to populate the one or more policy parameter fields, the set of supplemental crop insurance policy parameters including: (1) one or more of coverage level, insurance plan elected, expected yield, approved yield, acres, type, practice, county, share, and liability adjustment factor, and (2) one or more of risk adjusted revenue probability and premium rate, the determination of the premium configured to include summing the premium amount per acre for a potential insured's selected coverage level for all alternative price discovery periods elected, multiplying the sum by a selected liability adjustment factor to obtain a result, and multiplying the result by the number of insured acres and by the potential insured's share of such acres;
use vectorized code to simulate a plurality of potential price trajectories spanning a time period, the time period including a plurality of months, potential price trajectories simulated by:
  determining one or more stochastic up-down price movement multipliers, wherein a stochastic up price movement multiplier is determined by the equation $u = e^{\sigma_P \sqrt{\Delta t}}$ and a stochastic down price movement multiplier is determined by the equation $d = e^{-\sigma_P \sqrt{\Delta t}}$ in which $\sigma_P$ represents a futures price annualized implied volatility associated with the set of supplemental crop insurance loss parameters and $\Delta t$ represents an inverse of a determined number of trading days per year, determining one or more risk-adjusted price movement probabilities, and generating greater than 10,000 potential price trajectories based at least in part upon the one or more up-down price movement multipliers and the one or more risk-adjusted price movement probabilities;
  determine a premium for a non-reinsured supplemental crop insurance policy responsive to the set of supplemental crop insurance policy parameters and the plurality of potential price trajectories;
  transmit via the supplemental insurance server, data representing the premium for the non-reinsured supplemental crop insurance policy over the electronic communications network to one or more user devices; and
  serve, to the one or more user devices, a supplemental crop insurance policy information content including the premium for the non-reinsured supplemental crop insurance policy to one or more users.

2. A supplemental crop insurance machine as defined in claim 1, wherein the one or more processors include one or more simulation processors, and wherein the determination of the premium includes determining the premium by one or more preselected algorithms, calculations, or historical interpolations to determine policy premium by use of one or more of current market price, Risk Management Agency (RMA) premium rates, implied volatility from options based on sales of puts and calls for the crop commodity being insured, the number of days prior to the discovery of projected price, harvest price, likelihood that prices may exceed an given additional month's price as selected by grower being insured, likelihood that any outcome may reach or exceed price movement limits, and likelihood that any outcome may result in an indemnity.

3. A supplemental crop insurance machine as defined in claim 2, wherein the determination of the premium further includes performing one or more calculations of a plurality of estimated indemnity losses, and wherein pure risk supplemental policy loss cost is a function of a calculated mean of a plurality of simulated supplemental policy payments responsive to the one or more simulation processors.

4. A supplemental crop insurance machine as defined in claim 1, wherein contents of the one or more databases includes futures data corresponding to the set of supplemental crop insurance policy parameters, and wherein a rating algorithm is applied to the futures data to determine the premium for the non-reinsured supplemental crop insurance policy.

5. A supplemental crop insurance machine as defined in claim 1, wherein the one or more policy parameter fields comprise fields for one or more of the following: crop to be insured, an estimate of a number of acres to be planted by type and practice for a crop year, production databases for an insured crop, an estimate of anticipated actual yield by unit type and practice for a current crop year, a coverage level elected for a supplemental policy, an insurance plan elected, a liability adjustment factor, an alternative price discovery period, and a maximum price movement limit.

6. A supplemental crop insurance machine as defined in claim 1, wherein the determination of the premium further includes calculating risk associated with allowance of an insured to customize supplemental coverage from a range of options on top of an existing crop insurance coverage and subject to review by a Risk Management Agency (RMA).

7. A supplemental crop insurance machine as defined in claim 1, where the determination of the premium further includes determining premium in real-time by use of one or more predetermined pricing functions and providing the real-time premium determinations and quotes to the one or more user devices thereby to allow customization supplemental crop insurance policies insured.

8. A supplemental crop insurance machine as defined in claim 1, wherein the set of policy parameters includes one or more of the following: a crop to be insured, an estimate of the number of acres to be planted by type and practice for a crop year, each production database for the insured crop, an estimate of the anticipated yield by unit, type, and practice for a current crop year, a coverage level elected for the supplemental policy, an insurance plan elected for determining the right to an indemnity, a liability adjustment factor, one or more alternate price discovery periods, and maximum price movement limit.

9. A supplemental crop insurance machine as defined in claim 1, wherein the determination of the premium includes an insured's expected payments or indemnities from one or more of the following: the Agriculture Risk Coverage (ARC), Price Loss Coverage (PLC), Revenue Protection (RP), Yield Protection (YP), Area Risk Protection Insurance (ARPI), Supplemental Coverage Option (SCO), Stacked Income Protection for Producers of Upland Cotton (STAX), or successor programs offered by USDA Agencies including the Farm Service Agency (FSA), Risk Management Agency (RMA), or the Federal Crop Insurance Corporation (FCIC), individually and collectively defining federal agricultural programs.

10. A supplemental crop insurance machine as defined in claim 9, wherein the determination of the premium includes an insured's expected payments or indemnities from one or more of the following: interactions of the federal agricultural programs with each other and the resulting payments and indemnities from such interactions, fluctuations in market price, expected yields, and realized yields.

11. A supplemental crop insurance machine comprising:
  a supplemental insurance server including one or more processors, being in communication with one or more databases, being positioned to communicate through an electronic communications network to one or more user devices positioned remote from the supplemental insurance server, and being configured to:
    serve, to the one or more user devices through the electronic communications network, a supplemental crop insurance policy information content page comprising one or more policy parameter fields adapted to be populated by a user with a corresponding set of supplemental crop insurance policy parameters;
    receive input of the set of supplemental crop insurance policy parameters to populate the one or more policy parameter fields, the set of supplemental crop insurance policy parameters including: (1) one or more of coverage level, insurance plan elected, expected yield, approved yield, acres, type, practice, county, share, and liability adjustment factor, (2) one or more of risk adjusted revenue probability, and premium rate, and (3) a liability based on one or more of expected yield, approved yield, coverage level, deductible, co-pay, acres, share, inventory value, and liability adjustment factor, the determination of the premium configured to include summing the premium amount per acre for a potential insured's selected coverage level for all alternative price discovery periods elected, multiplying the sum by a selected liability adjustment factor to obtain a result, and multiplying the result by the number of insured acres and by the potential insured's share of such acres;

use vectorized code to simulate a plurality of potential price trajectories spanning a time period, the time period including a plurality of months, potential price trajectories simulated by:

determining one or more stochastic up-down price movement multipliers, wherein a stochastic up price movement multiplier is determined by the equation $$u = e^{\sigma_P \sqrt{2\Delta t}}$$

and a stochastic down price movement multiplier is determined by the equation $$d = e^{-\sigma_P \sqrt{2\Delta t}}$$

in which $\sigma_P$ represents a futures price annualized implied volatility associated with the set of supplemental crop insurance loss parameters and $\Delta t$ represents an inverse of a determined number of trading days per year, determining one or more risk-adjusted price movement probabilities, and generating greater than 10,000 potential price trajectories based at least in part upon the one or more up-down price movement multipliers and the one or more risk-adjusted price movement probabilities;

determine a premium for a non-reinsured supplemental crop insurance policy responsive to the set of supplemental crop insurance policy parameters and the plurality of potential price trajectories;

transmit via the supplemental insurance server, data representing the premium for the non-reinsured supplemental crop insurance policy over the electronic communications network to one or more user devices; and serve, to the one or more user devices, supplemental crop insurance policy information content including the premium for the non-reinsured supplemental crop insurance policy to one or more users.

12. A supplemental crop insurance machine as defined in claim 11, wherein the one or more processors include one or more simulation processors, and wherein the determination of the premium includes determining the premium by one or more preselected algorithms, calculations, or historical interpolations to determine policy premium by use of one or more of market price, Risk Management Agency (RMA) premium rates, implied volatility from options based on sales of puts and calls for the crop commodity being insured, the number of days prior to the discovery of projected price, harvest price, likelihood that prices may exceed an given additional month's price as selected by grower being insured, likelihood that any outcome may reach or exceed price movement limits, and likelihood that any outcome may result in an indemnity.

13. A supplemental crop insurance machine as defined in claim 12, wherein the determination of the premium further includes performing one or more calculations of a plurality of estimated indemnity losses, and wherein pure risk supplemental policy loss cost is a function of a calculated mean of a plurality of simulated supplemental policy payments responsive to the one or more simulation processors.

14. A supplemental crop insurance machine as defined in claim 11, wherein contents of the one or more databases includes futures data corresponding to the set of supplemental crop insurance policy parameters, and wherein a rating algorithm is applied to the futures data to determine the premium for the non-reinsured supplemental crop insurance policy.

15. A supplemental crop insurance machine as defined in claim 11, wherein the one or more policy parameter fields comprise fields for one or more of the following: crop to be insured, an estimate of a number of acres to be planted by type and practice for a crop year, production databases for an insured crop, an estimate of anticipated actual yield by unit type and practice for a current crop year, a coverage level elected for a supplemental policy, an insurance plan elected, an inventory value, a liability adjustment factor, an alternative price discovery period, and a maximum price movement limit.

16. A supplemental crop insurance machine as defined in claim 11, wherein the determination of the premium further includes calculating risk associated with allowance of an insured to customize supplemental coverage from a range of options on top of an existing crop insurance coverage, and subject to review by the USDA Risk Management Agency (RMA).

17. A supplemental crop insurance machine as defined in claim 11, where the determination of the premium further includes determining premium in real-time by use of one or more predetermined pricing functions and providing the real-time premium determinations and quotes to the one or more user devices thereby to allow customization supplemental crop insurance policies insured.

18. A supplemental crop insurance machine as defined in claim 11, wherein the set of policy parameters includes one or more of the following: a crop to be insured, an estimate of the number of acres to be planted by type and practice for a crop year, one or more production databases for the insured crop, an estimate of the anticipated yield by unit, type, and practice for a current crop year, a coverage level elected for the supplemental policy, an inventory value, a deductible, a co-pay, an insurance plan elected for determining the right to an indemnity, a liability adjustment factor, one or more alternate price discovery periods, and maximum price movement limit.

19. A supplemental crop insurance machine as defined in claim 11, wherein the determination of the premium includes one or more of the following: historical area yield information, historical commodity pricing information, trend analysis, interpolation of historical trends, decomposition of trend deviants, and assessment of risk based on empirical or parametric analysis of historical trend deviants.

20. A supplemental crop insurance machine as defined in claim 11, wherein the determination of the premium includes an insured's expected payments or indemnities from one or more of the following: the Agriculture Risk Coverage (ARC), Price Loss Coverage (PLC), Revenue Protection (RP), Yield Protection (YP), Area Risk Protection Insurance (ARPI), Supplemental Coverage Option (SCO), Stacked Income Protection for Producers of Upland Cotton (STAX), or successor programs offered by USDA Agencies including the Farm Service Agency (FSA), Risk Management Agency (RMA), or the Federal Crop Insurance Corporation (FCIC), individually and collectively defining federal agricultural programs.

21. A supplemental crop insurance machine as defined in claim 20, wherein the determination of the premium includes an insured's expected payments or indemnities from one or more of the following: interactions of the federal agricultural programs with each other and the resulting payments and indemnities from such interactions, fluctuations in market price, expected yields, and realized yields.

* * * * *